Dec. 23, 1952  R. B. STANLEY  2,622,374
WHEEL TRUING DEVICE
Filed April 24, 1950  34 Sheets-Sheet 1
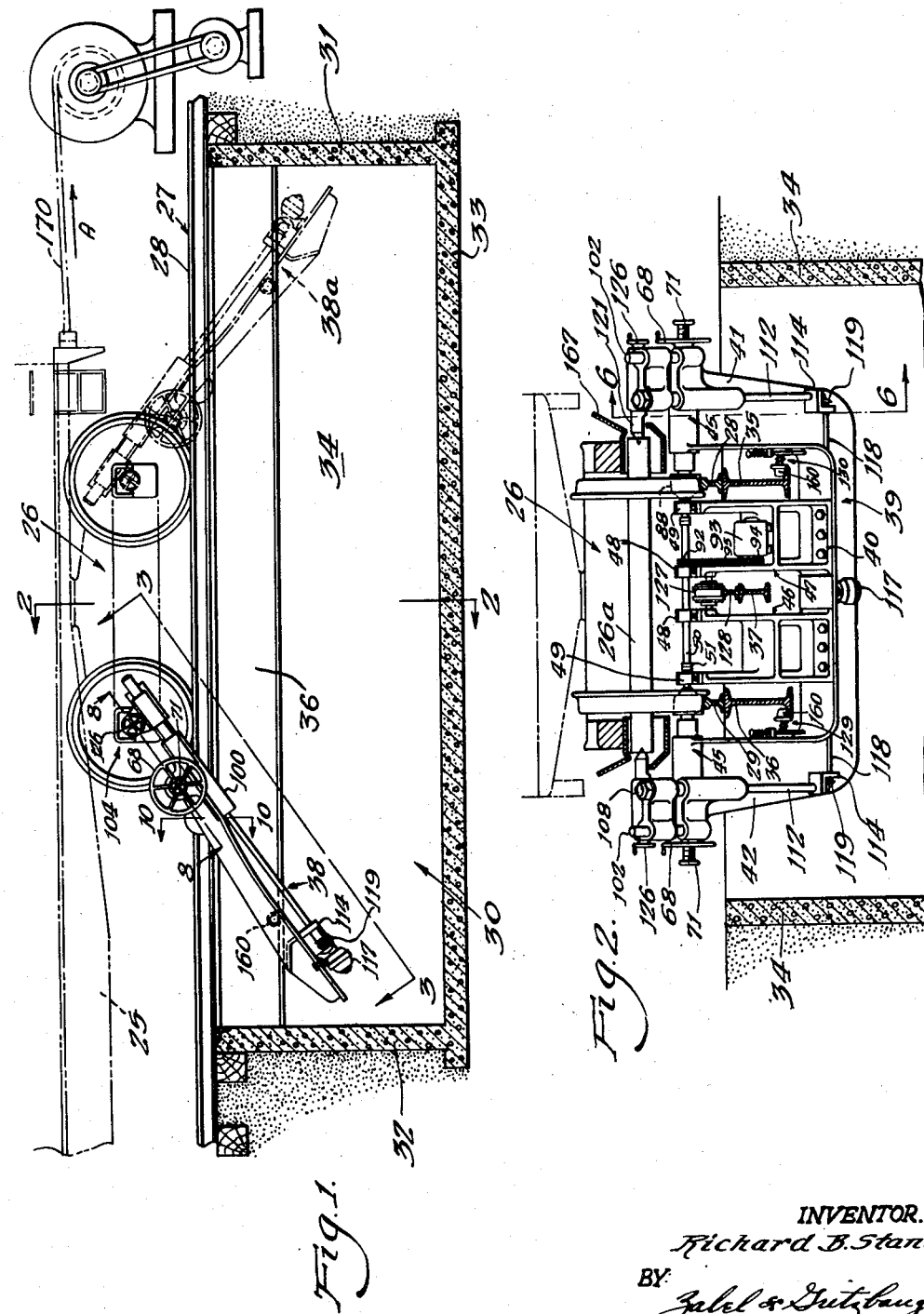
INVENTOR.
Richard B. Stanley
BY
Zabel & Gutzbaugh
Attorneys

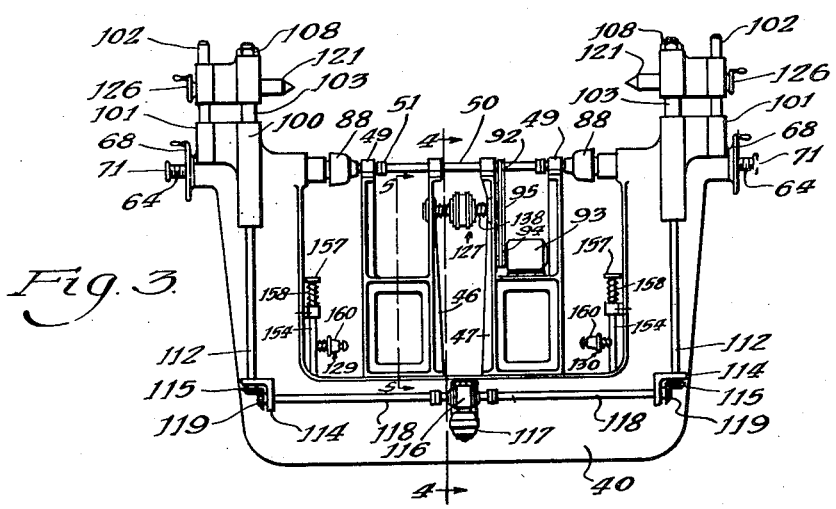
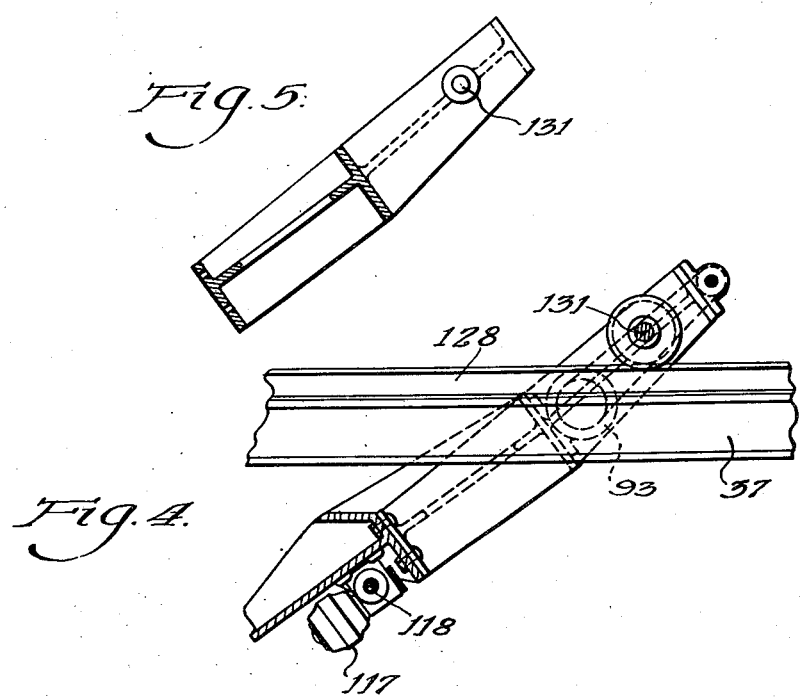

Dec. 23, 1952     R. B. STANLEY     2,622,374
WHEEL TRUING DEVICE
Filed April 24, 1950     34 Sheets-Sheet 3
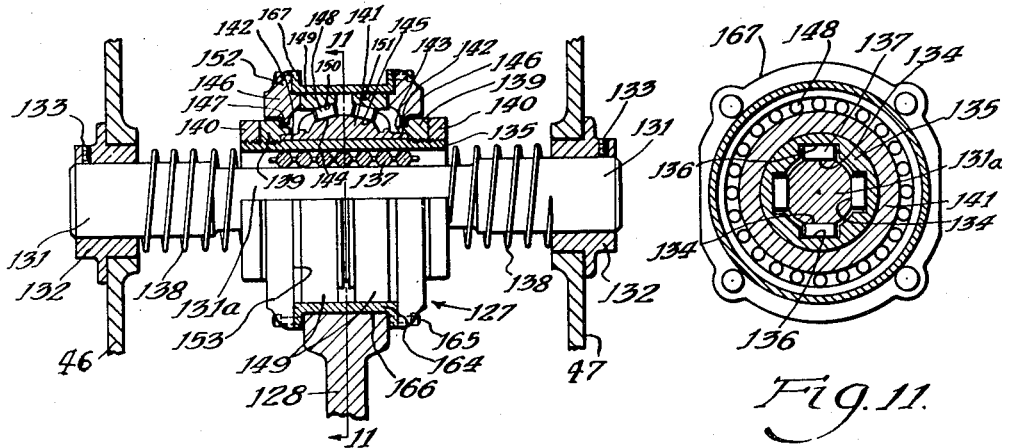
INVENTOR.
Richard B. Stanley
BY Zabel & Gritzbaugh
Attorneys Dec. 23, 1952     R. B. STANLEY     2,622,374
WHEEL TRUING DEVICE
Filed April 24, 1950     34 Sheets-Sheet 4
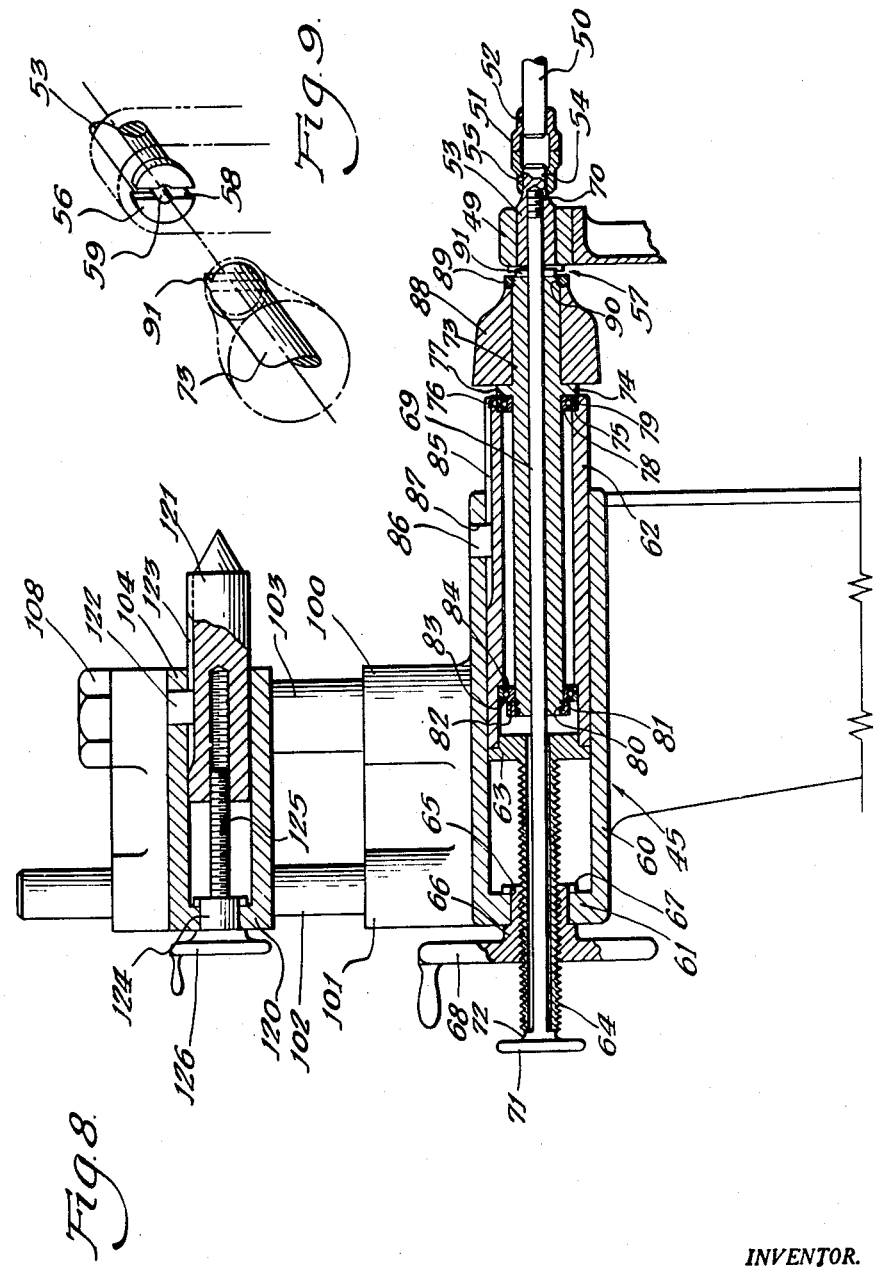
INVENTOR.
Richard B. Stanley
BY
Zabel & Gritzbaugh
Attorneys

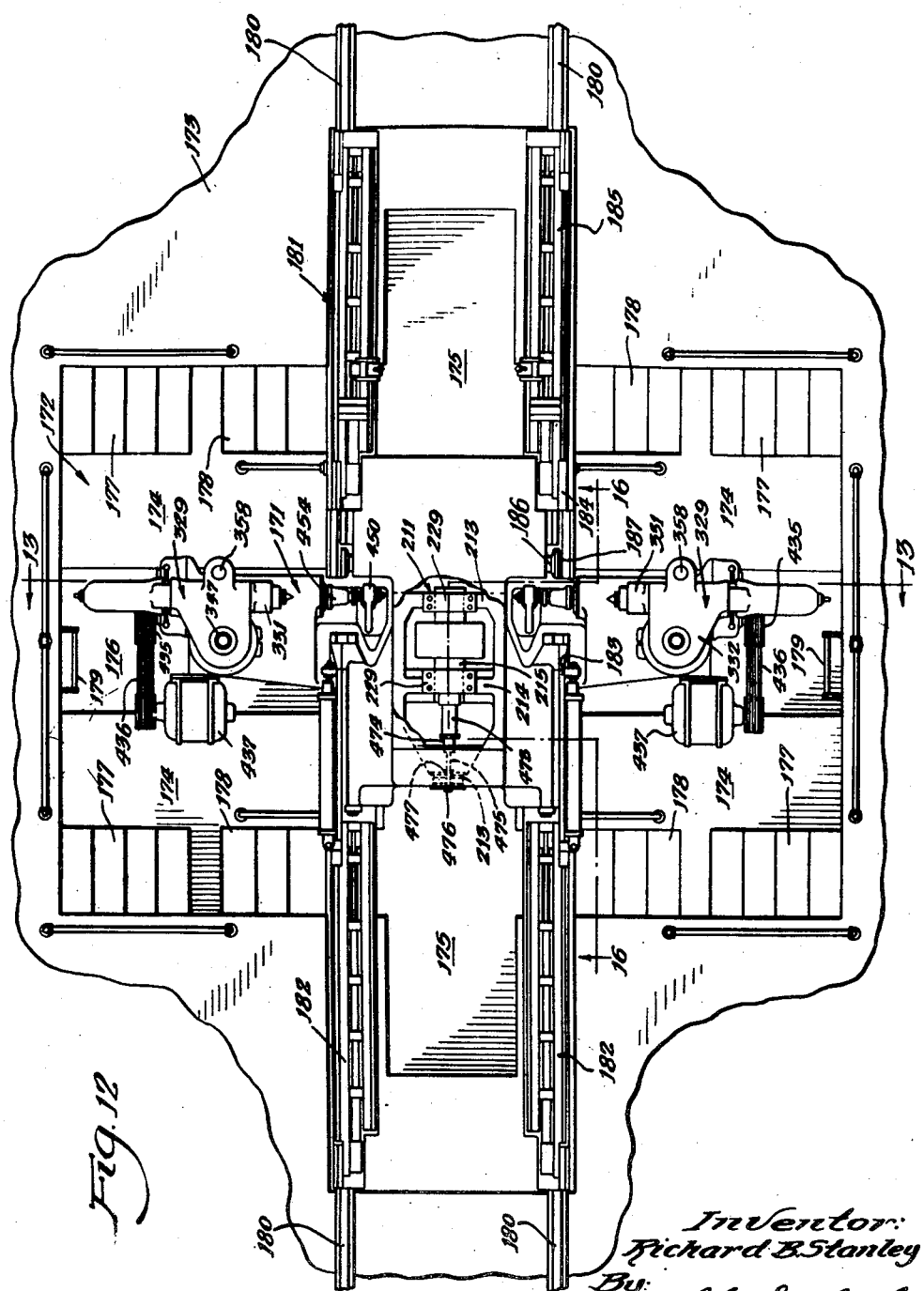

Dec. 23, 1952  R. B. STANLEY  2,622,374
WHEEL TRUING DEVICE
Filed April 24, 1950   34 Sheets-Sheet 6
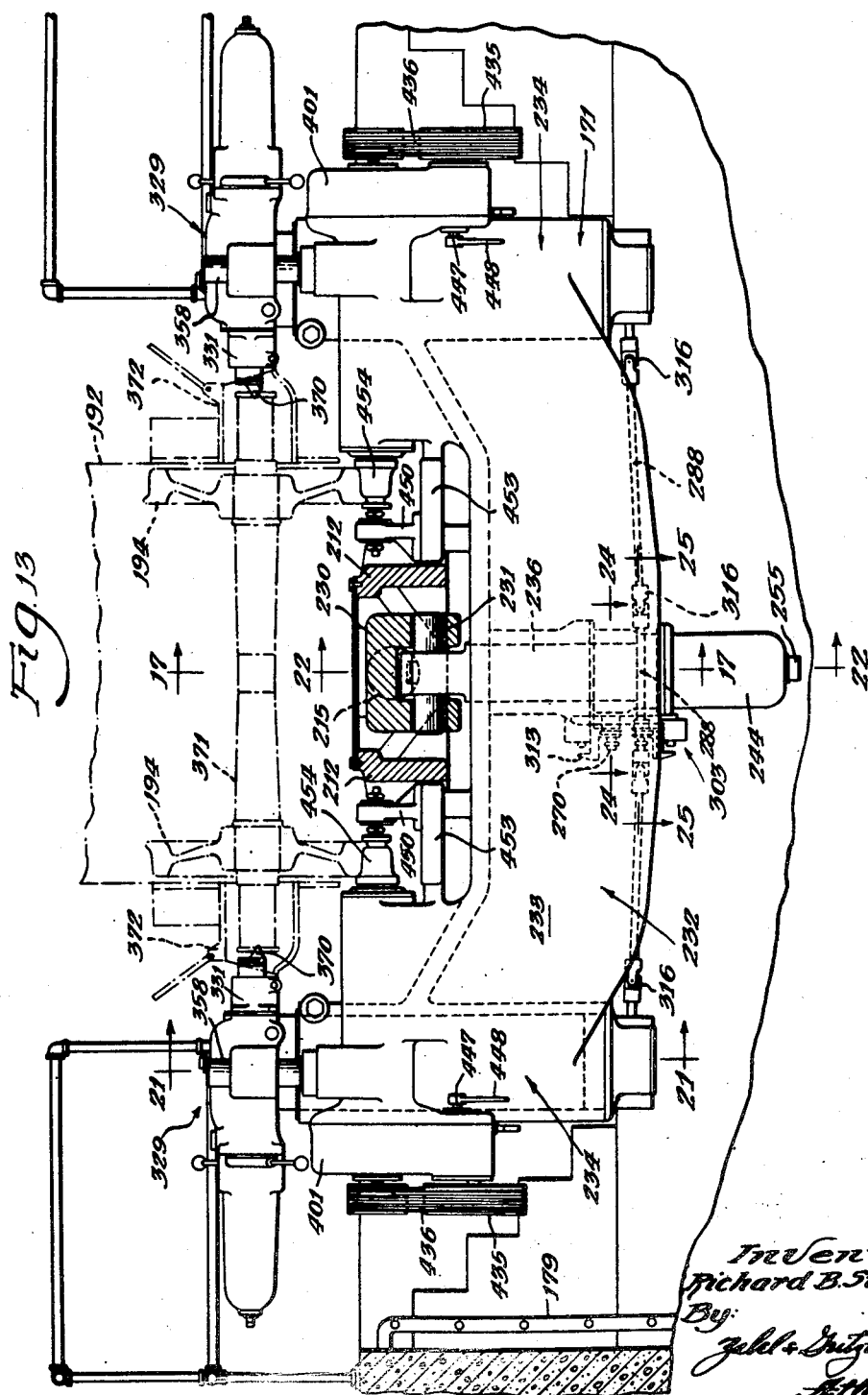
Inventor:
Richard B. Stanley
By:
Zabel & Fritzlaugh
Attorneys

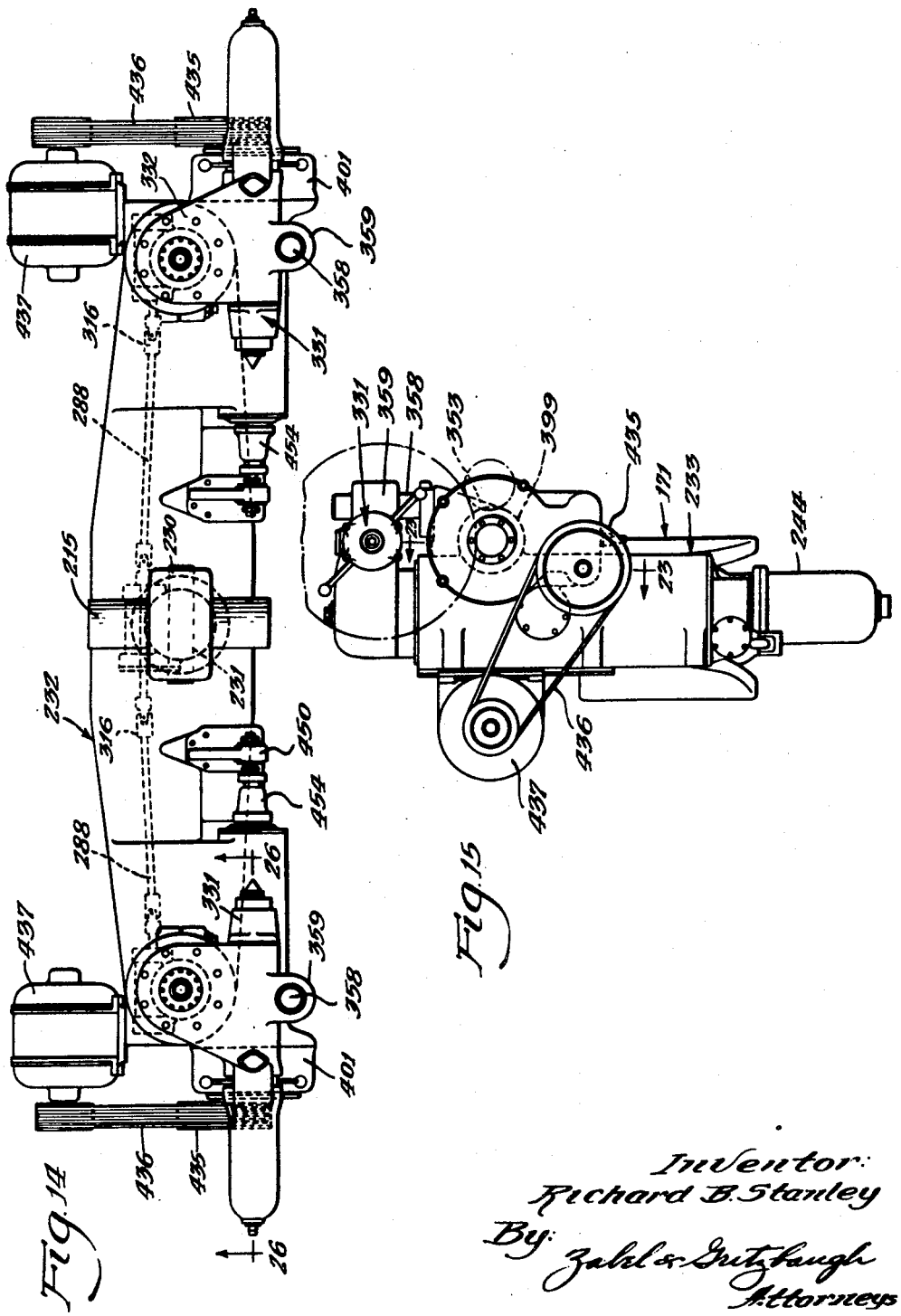

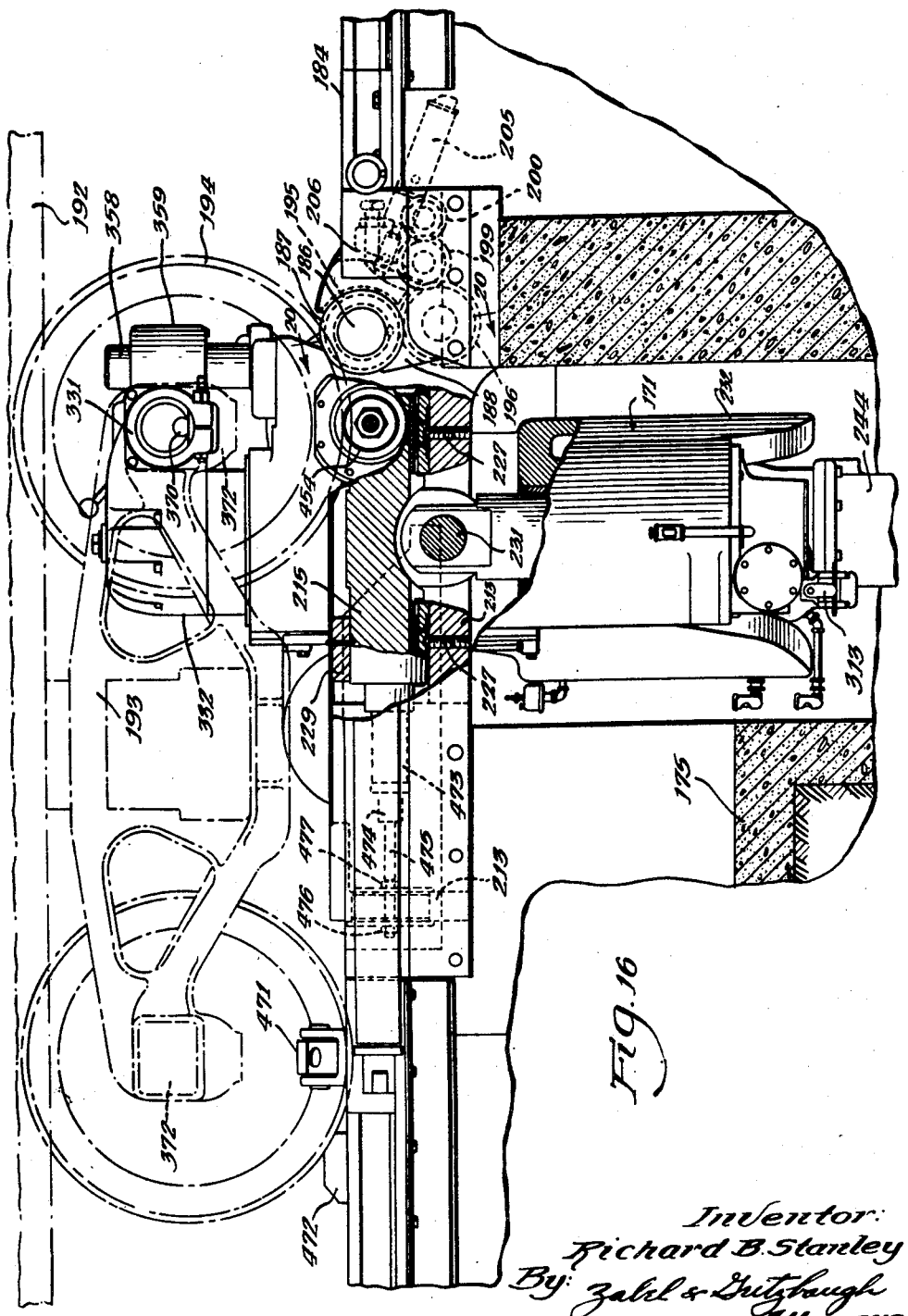

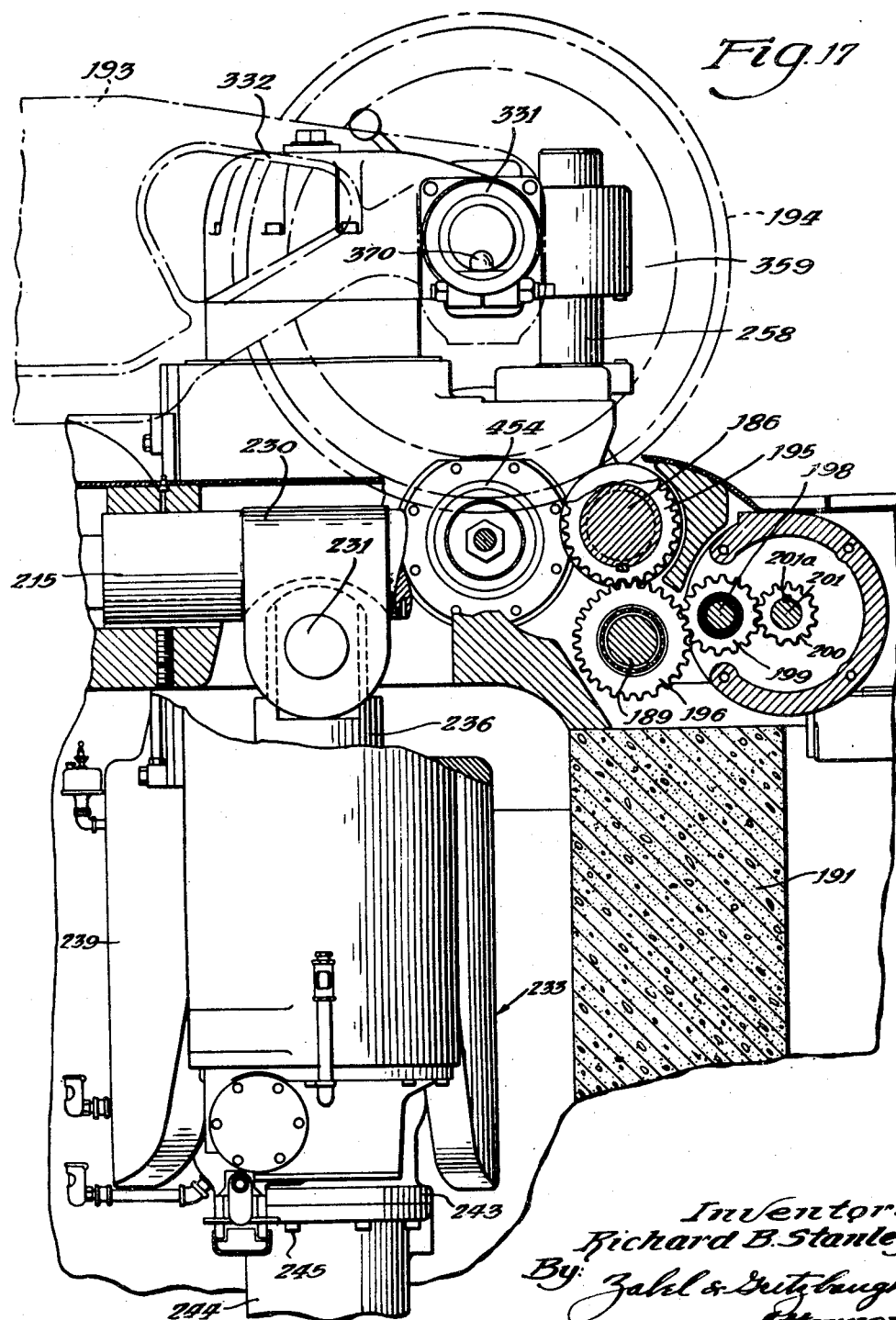

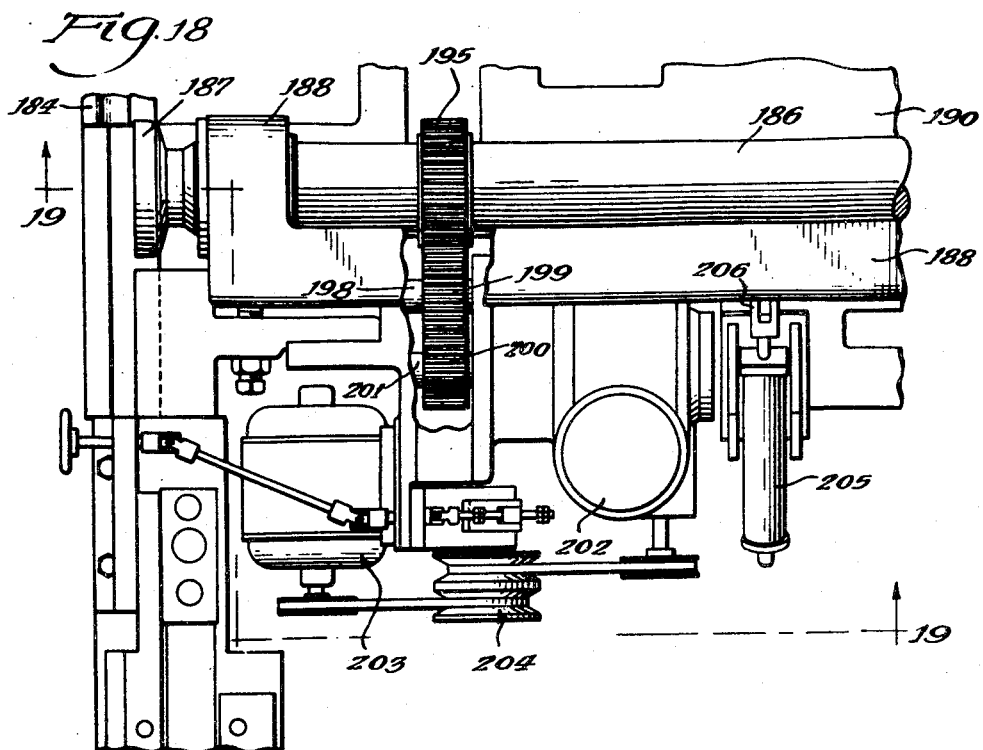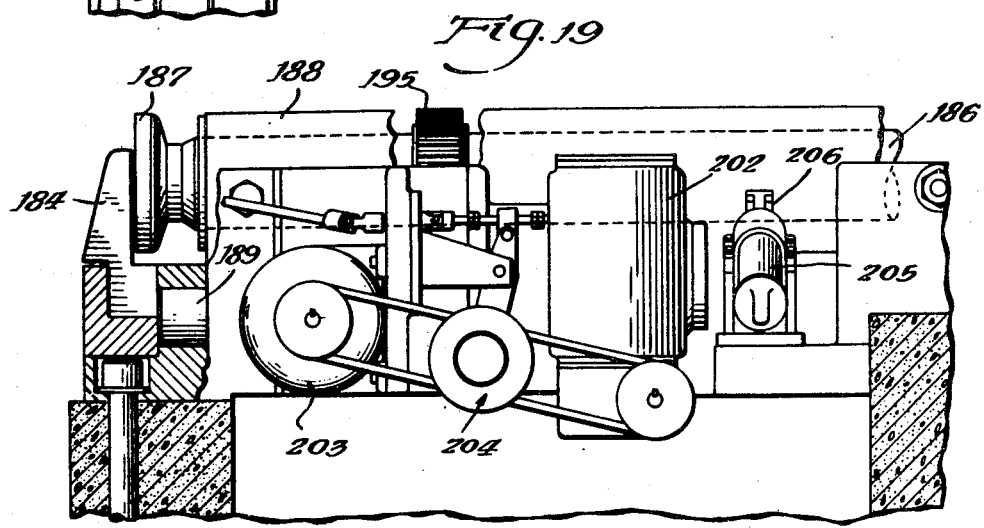

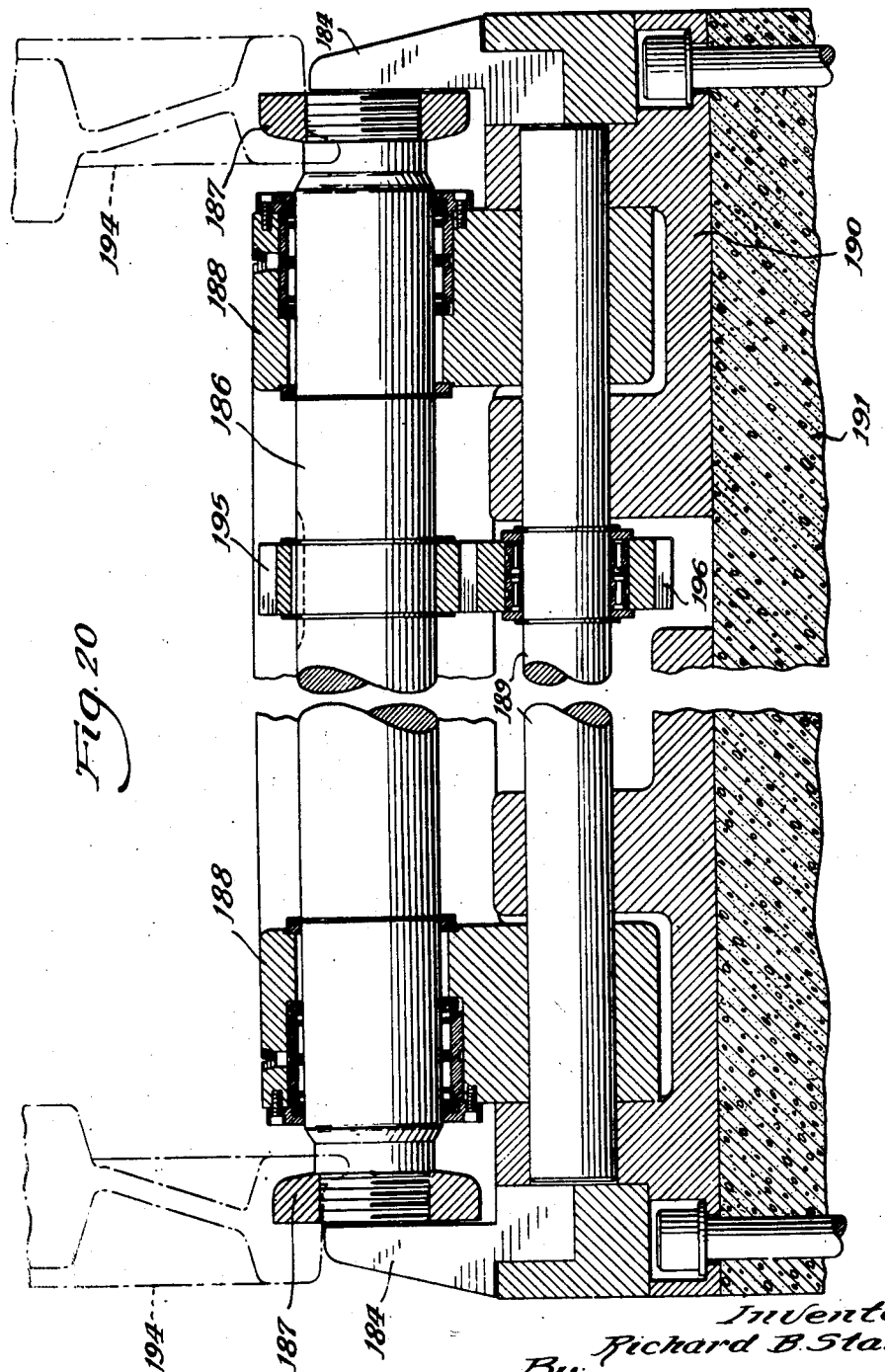

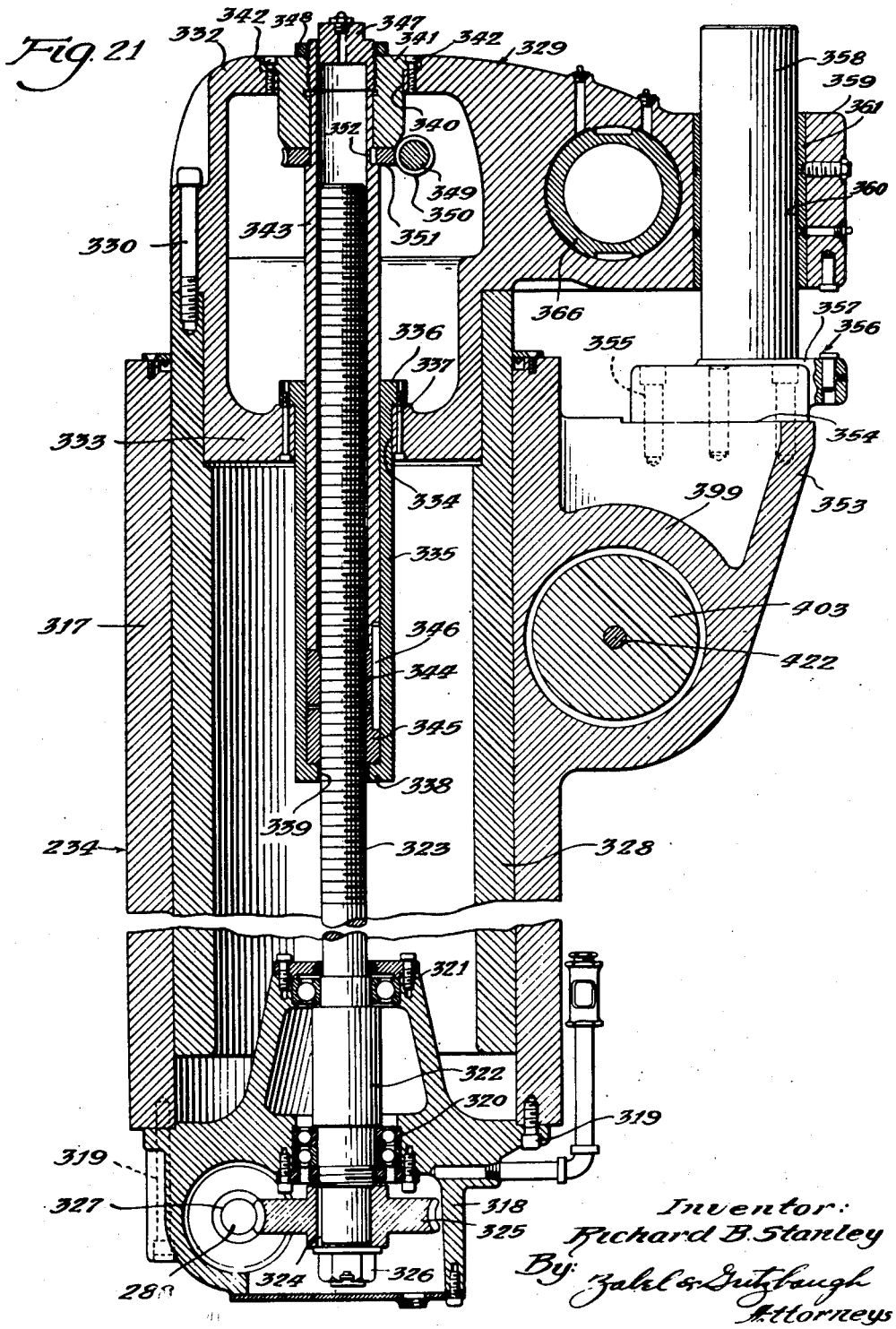

Dec. 23, 1952        R. B. STANLEY        2,622,374
WHEEL TRUING DEVICE

Filed April 24, 1950        34 Sheets-Sheet 13

Inventor:
Richard B. Stanley
By Zahl & Gutzhaugh
Attorneys

Dec. 23, 1952  R. B. STANLEY  2,622,374
WHEEL TRUING DEVICE
Filed April 24, 1950  34 Sheets-Sheet 14
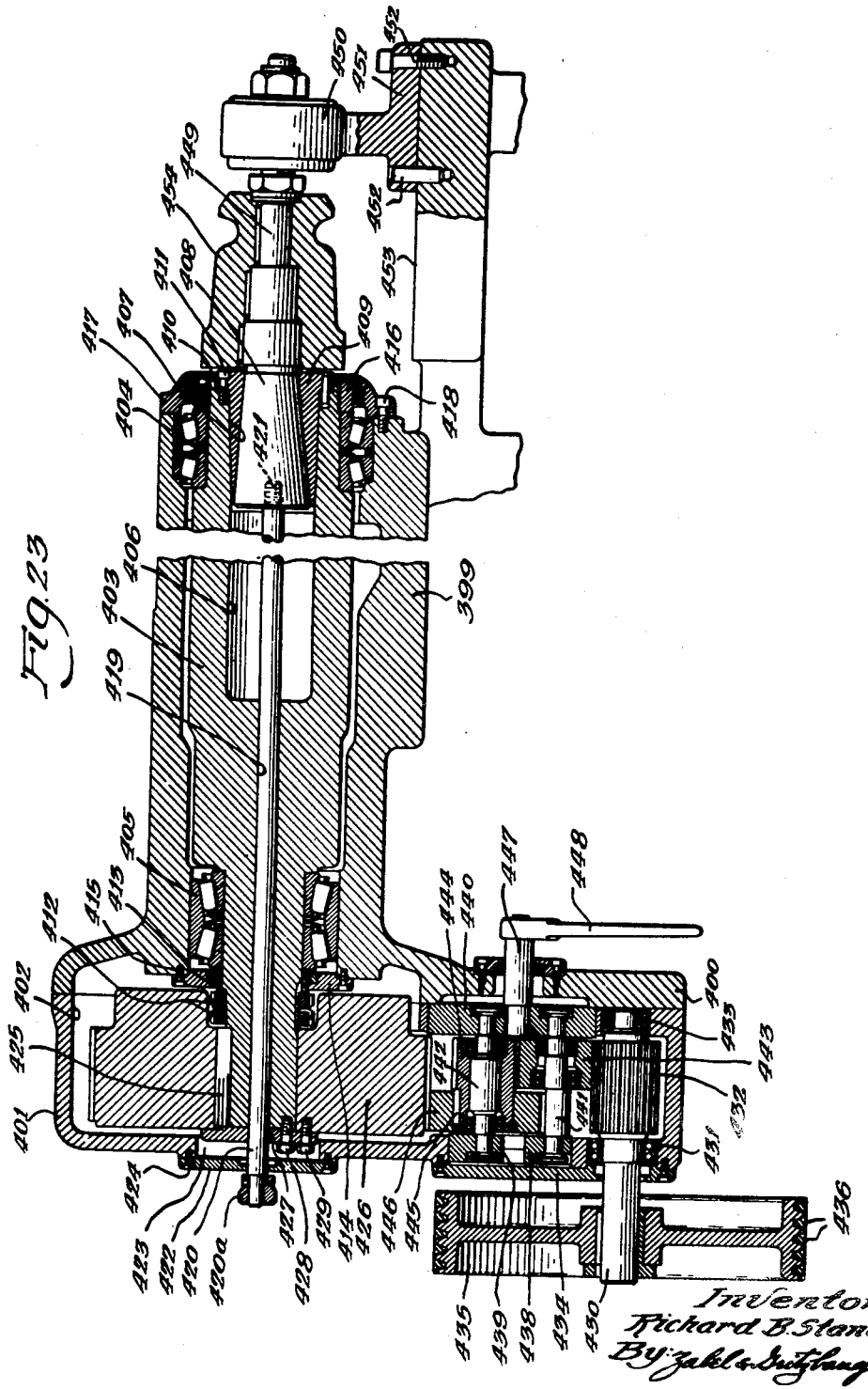

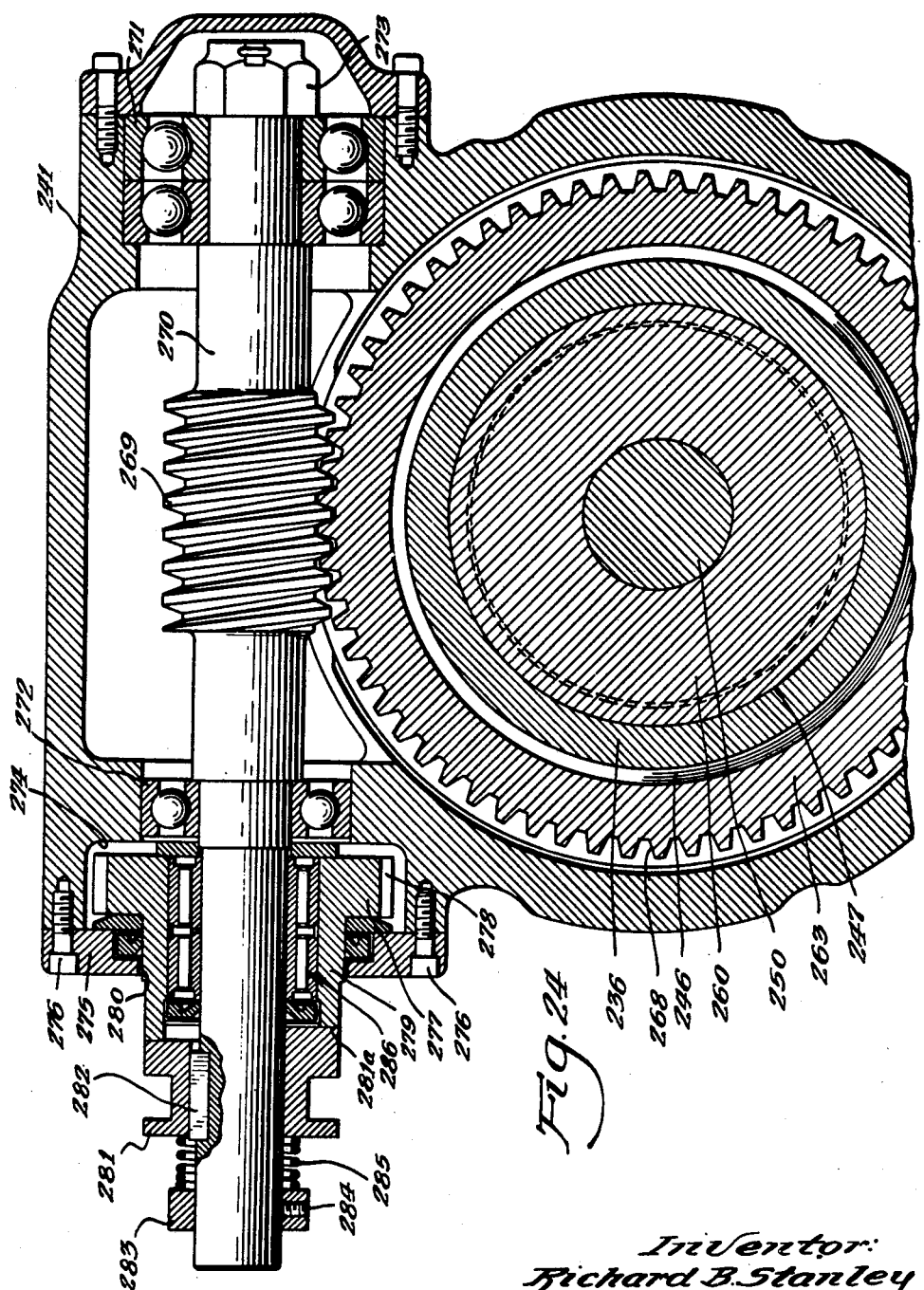

Dec. 23, 1952 R. B. STANLEY 2,622,374
WHEEL TRUING DEVICE
Filed April 24, 1950 34 Sheets-Sheet 16
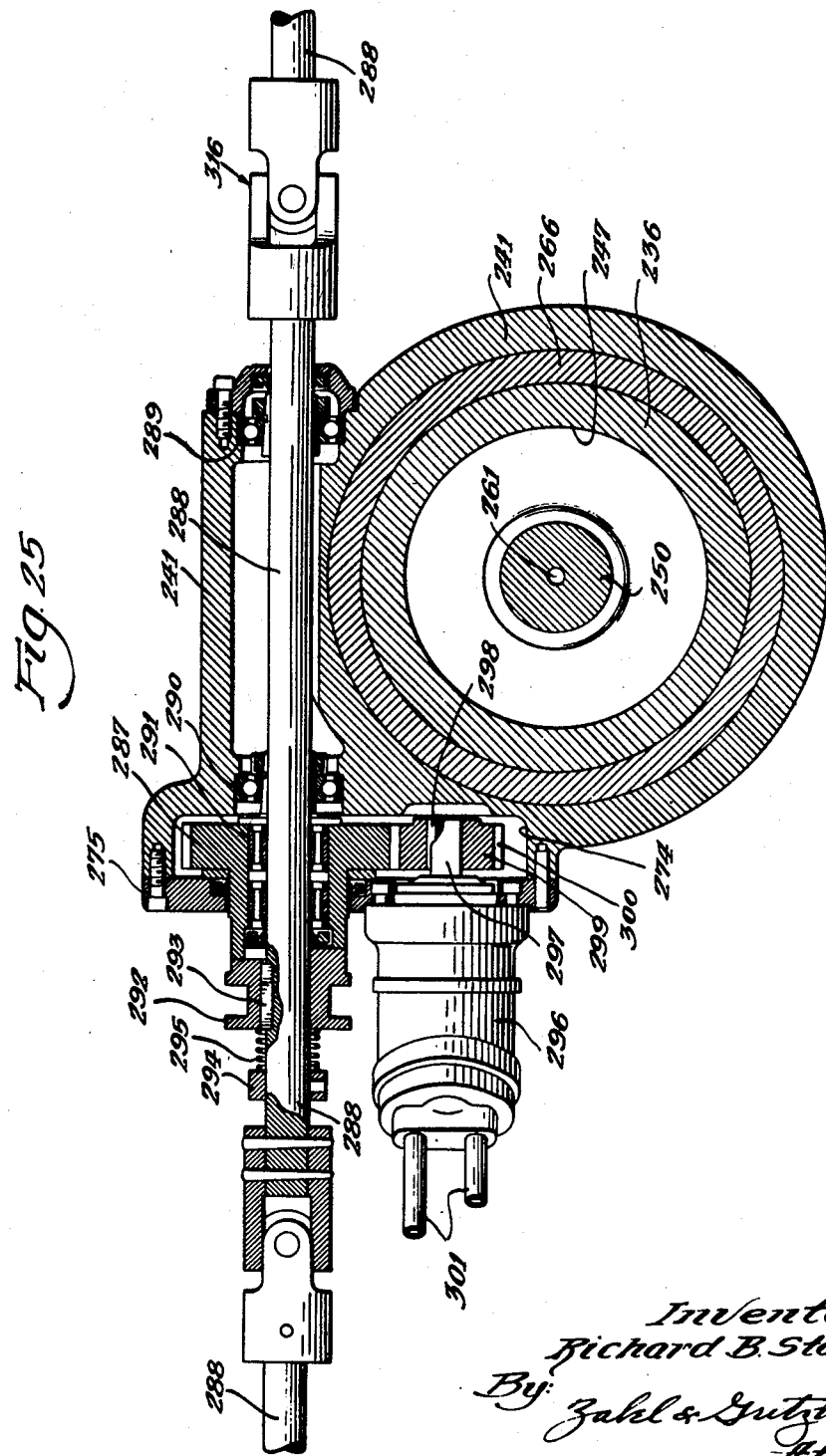
Inventor:
Richard B. Stanley
By Zahel & Gutzbaugh
Attorneys

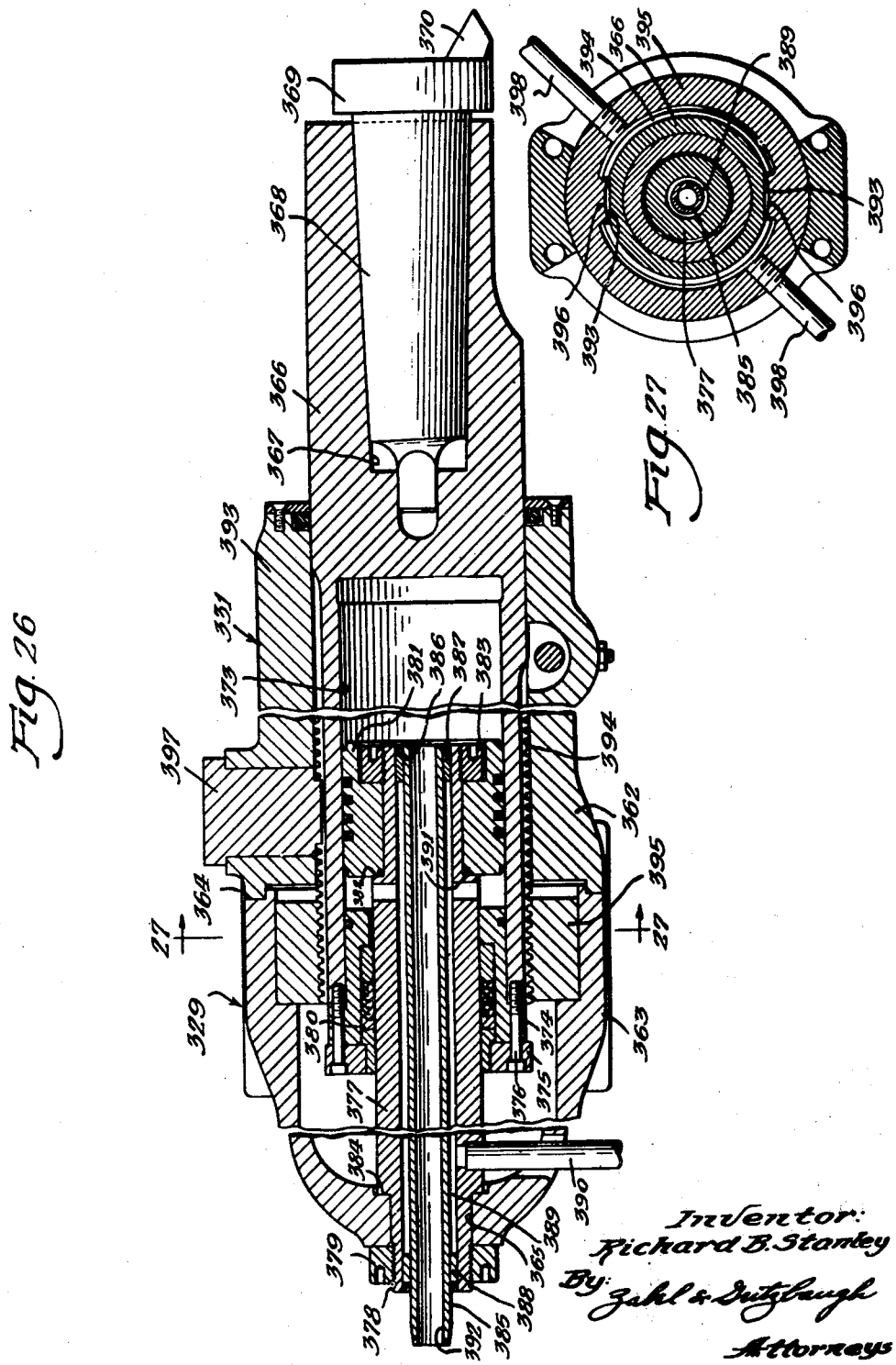

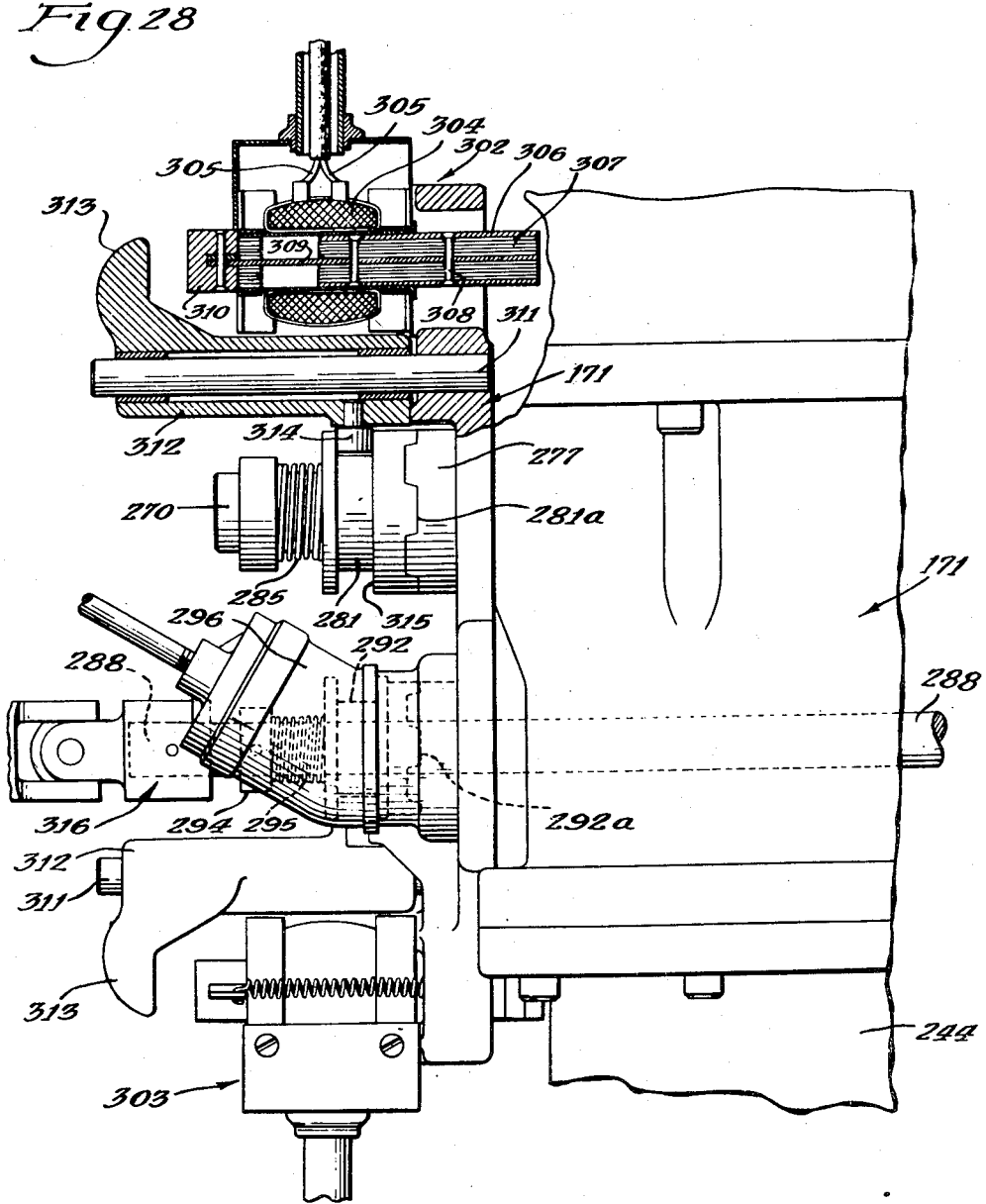

Dec. 23, 1952 R. B. STANLEY 2,622,374
WHEEL TRUING DEVICE
Filed April 24, 1950 34 Sheets-Sheet 19
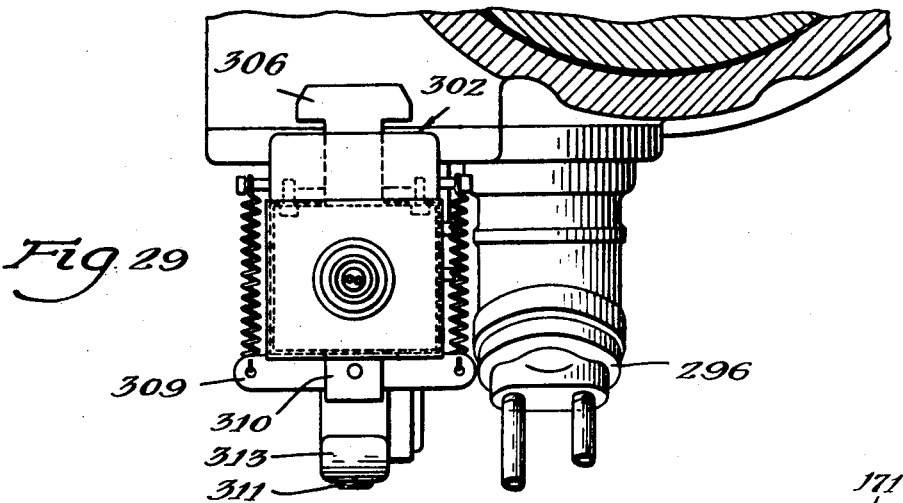
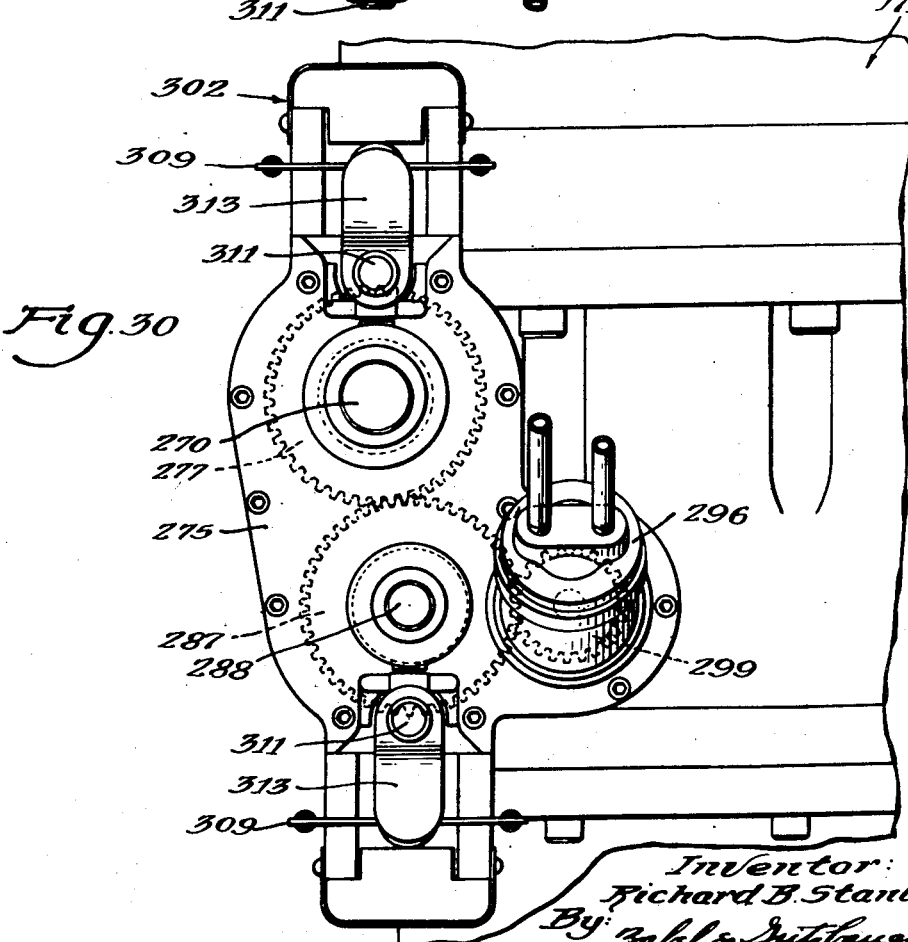
Inventor:
Richard B. Stanley
By Zahl & Dietzbaugh
Attorneys Dec. 23, 1952     R. B. STANLEY     2,622,374
WHEEL TRUING DEVICE
Filed April 24, 1950     34 Sheets-Sheet 20

Inventor:
Richard B. Stanley
By: Zabel & Fitzhugh
Attorneys

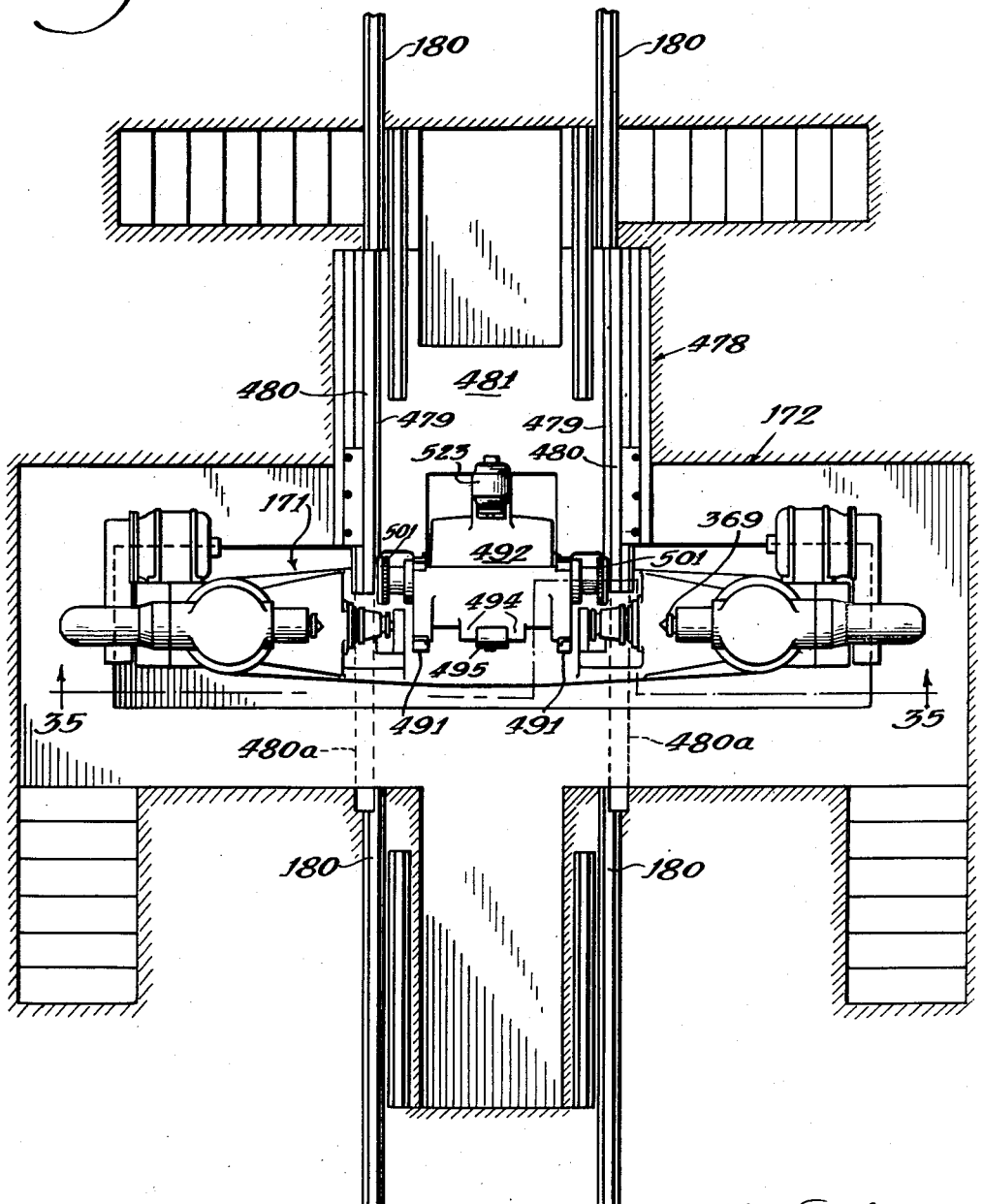

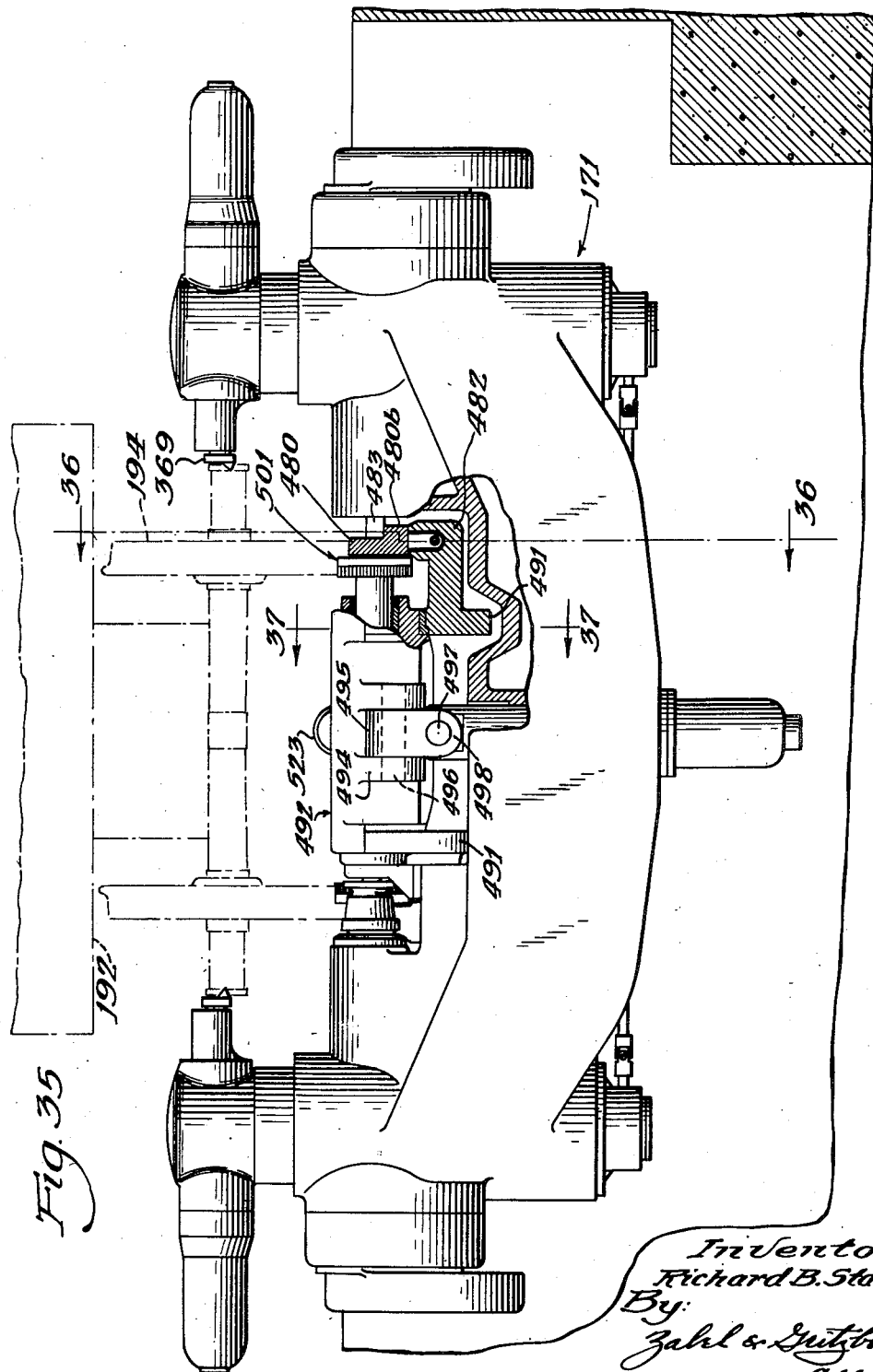

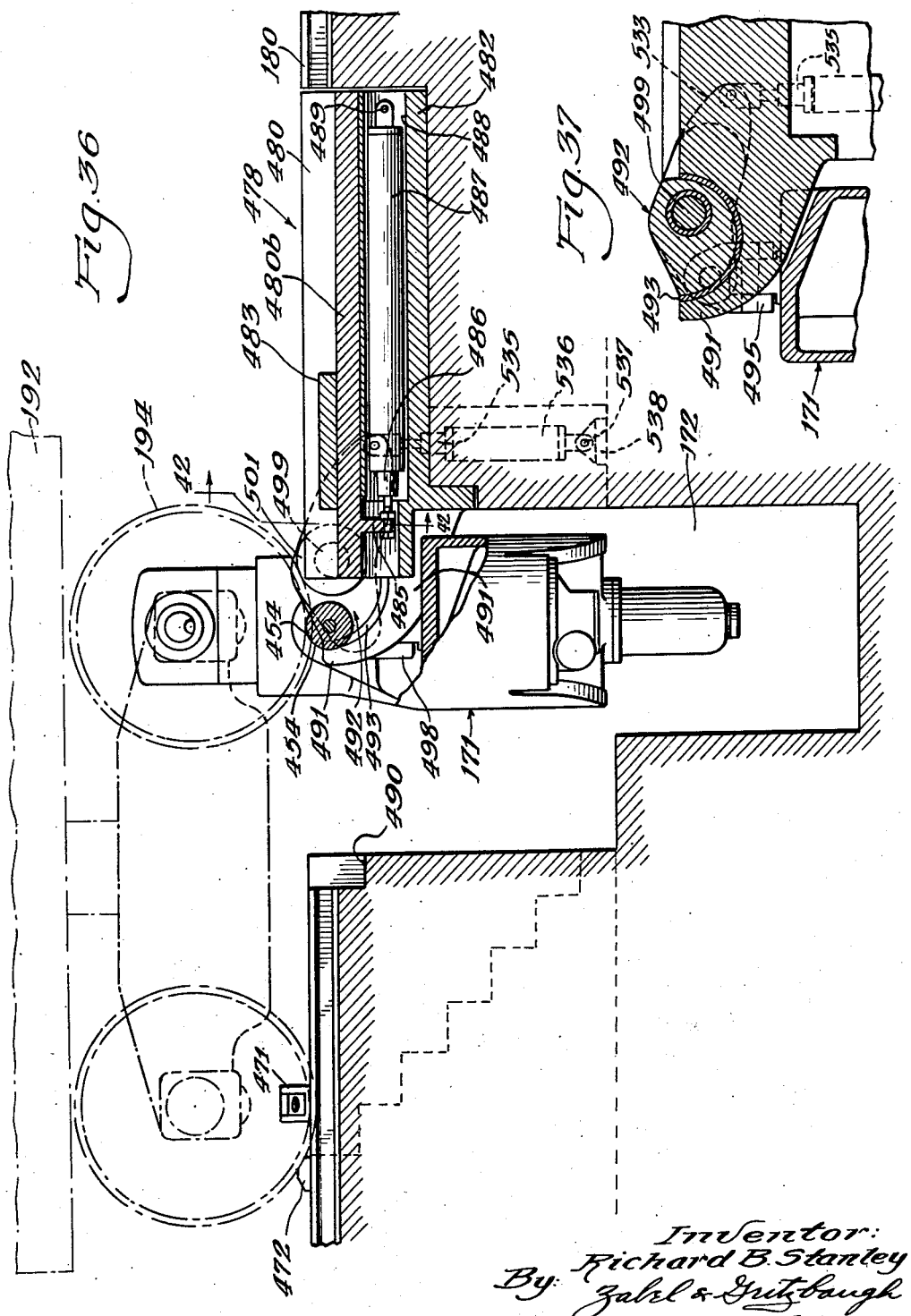

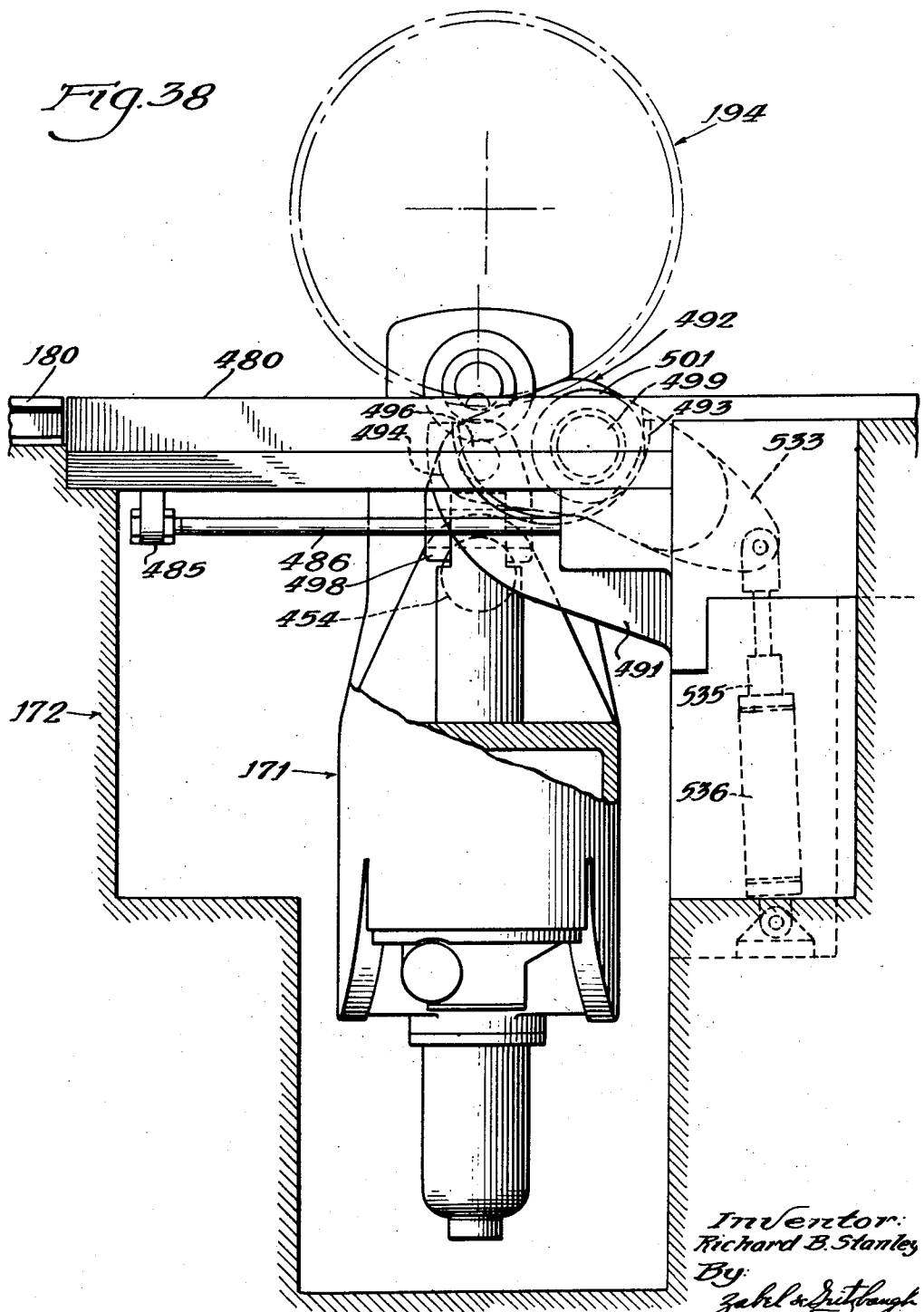

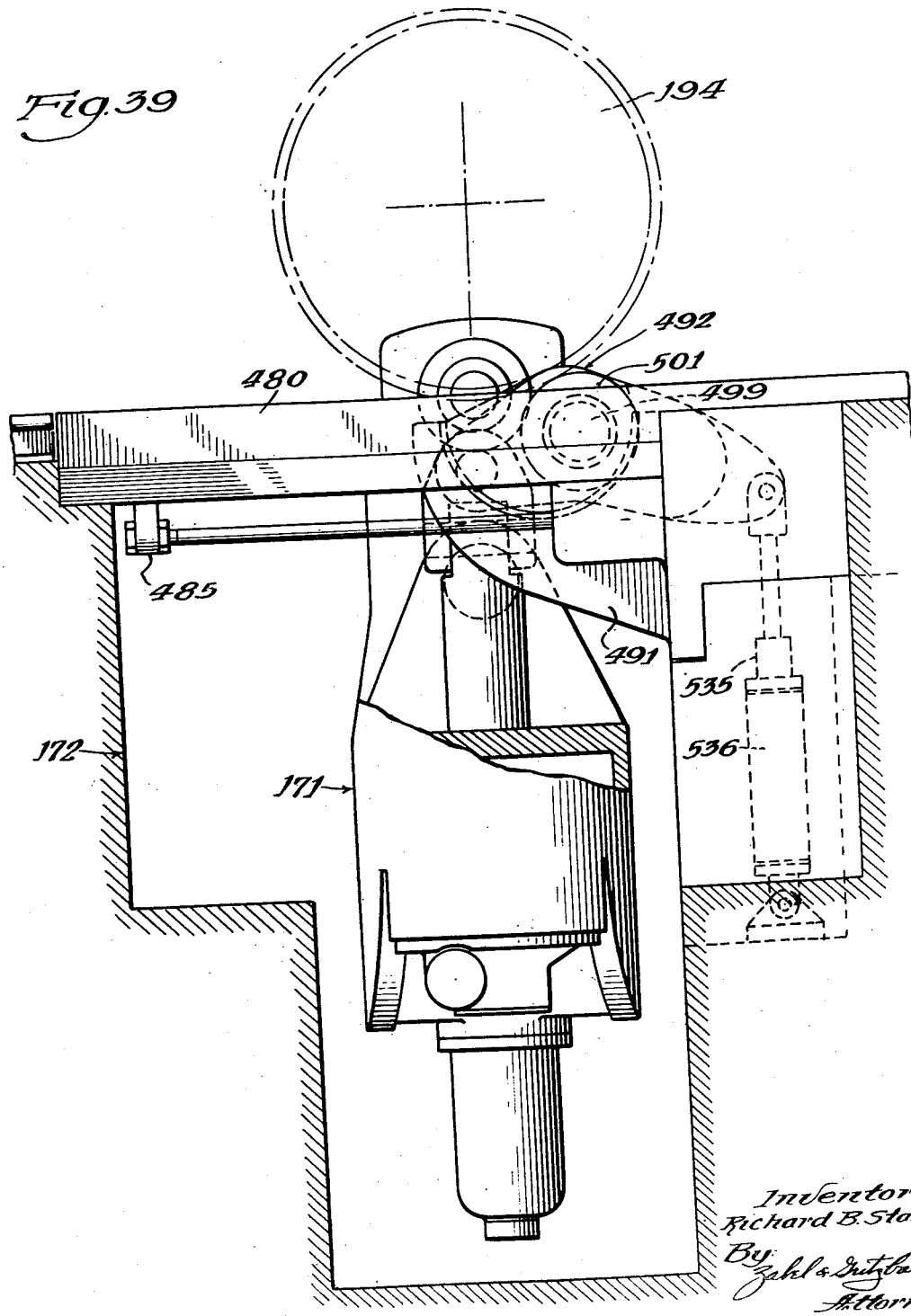

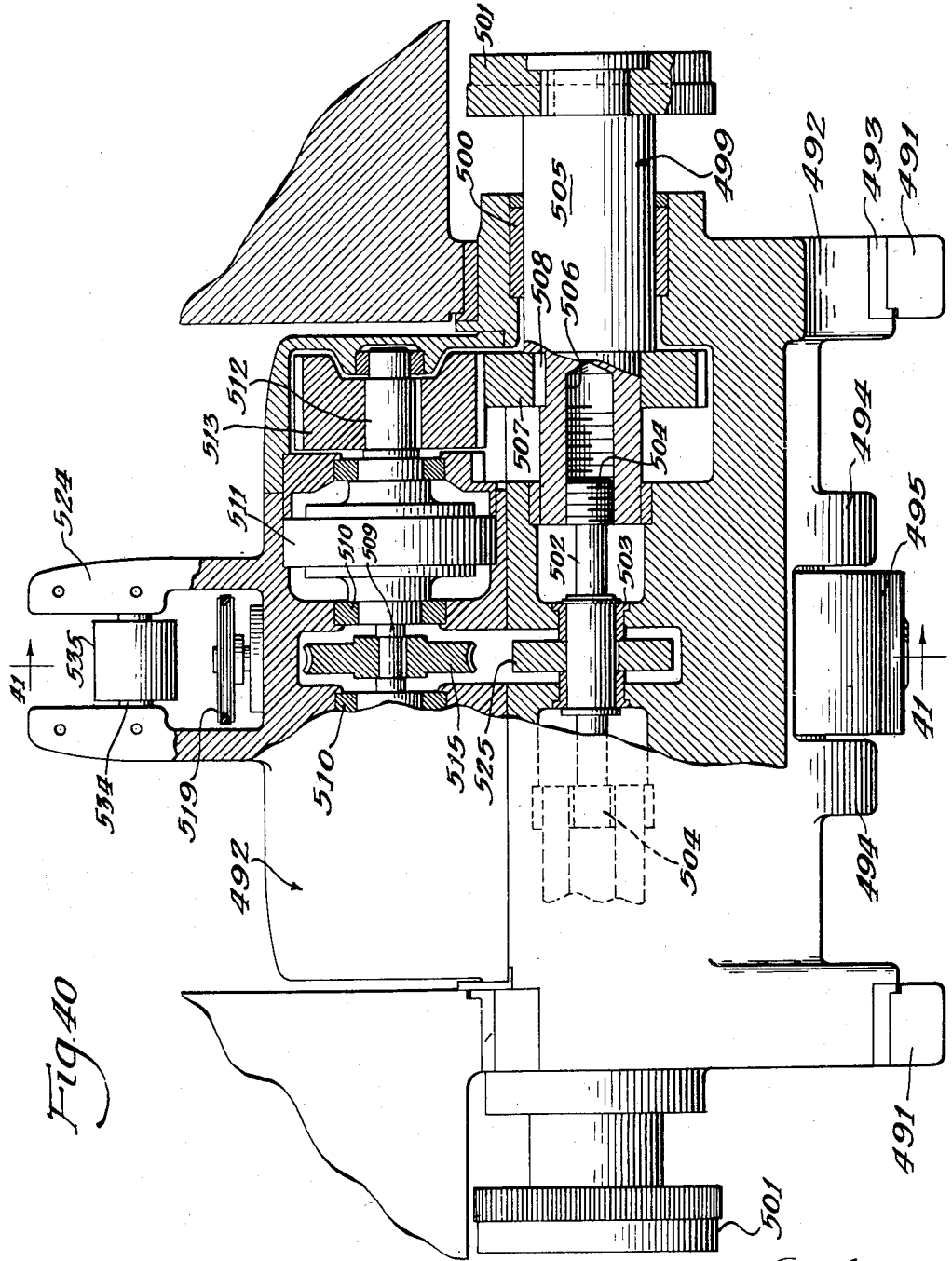

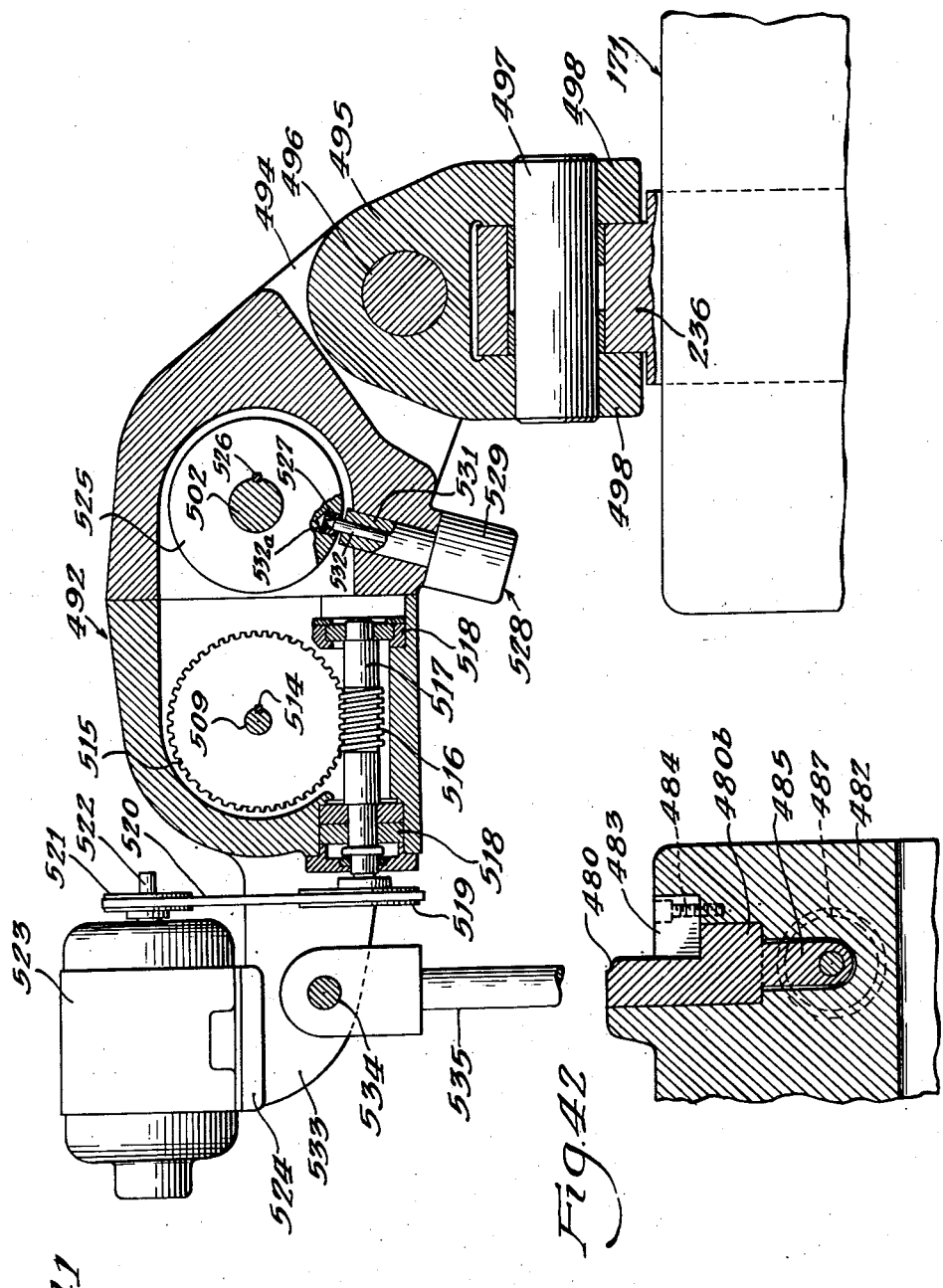

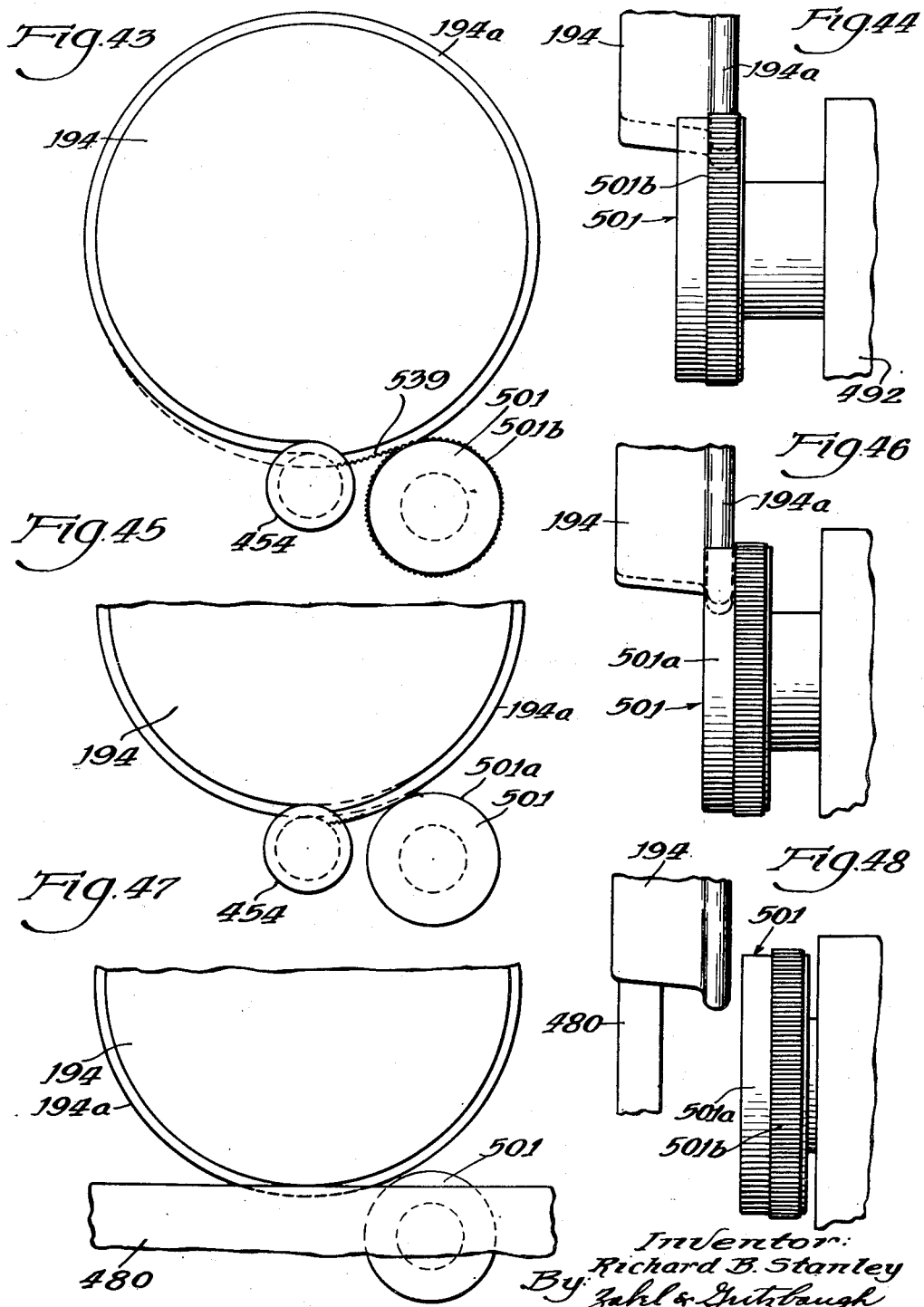

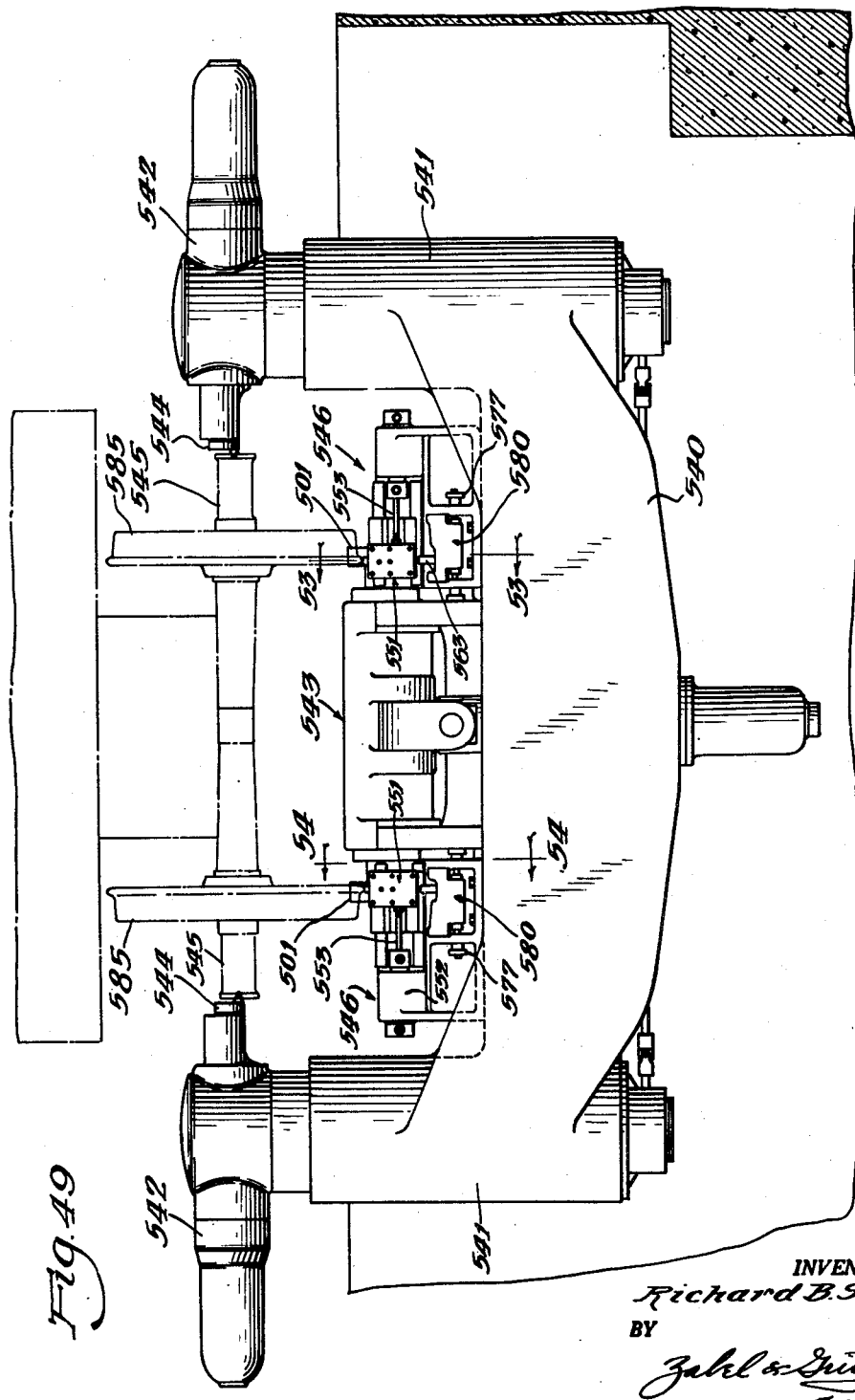

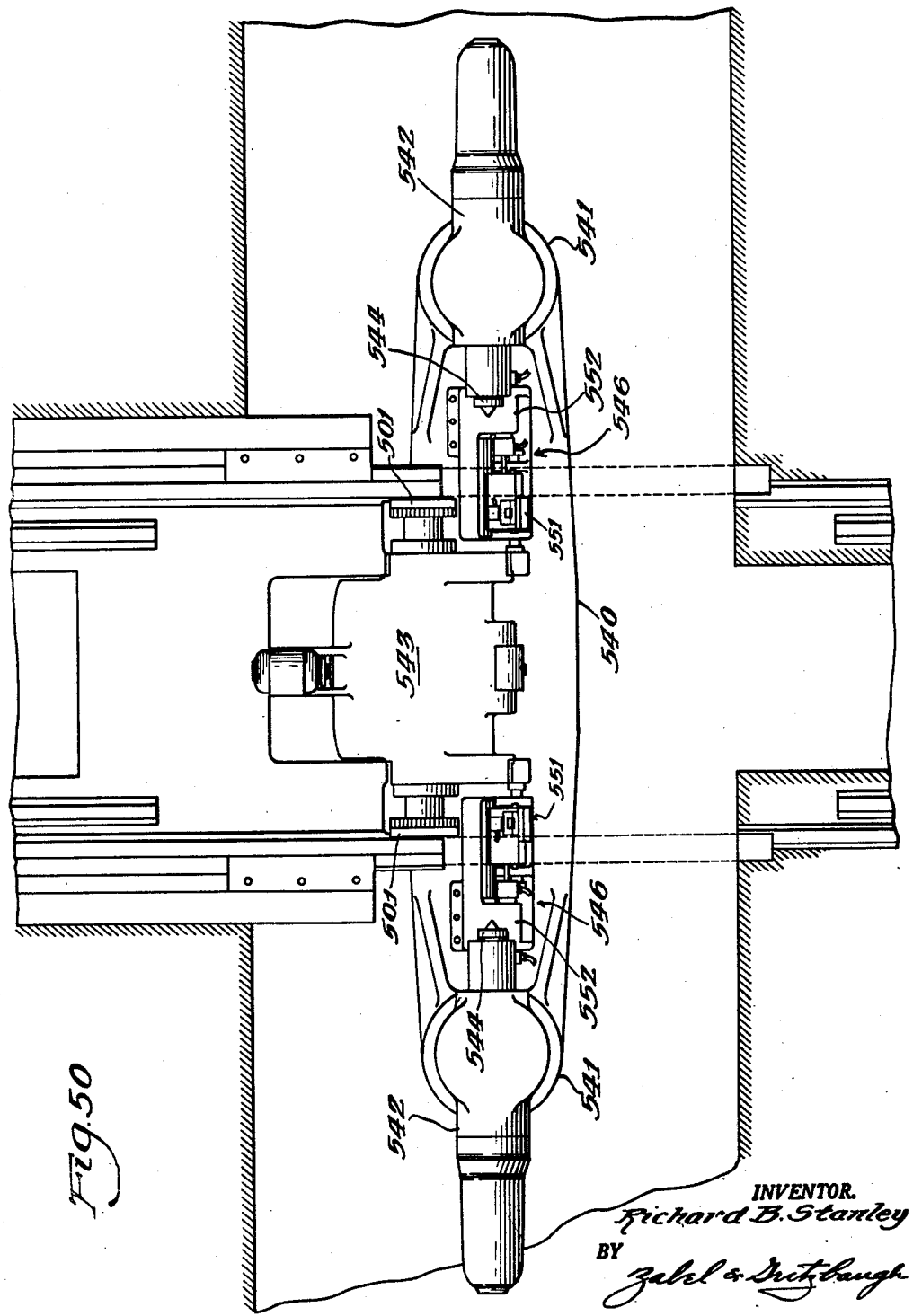

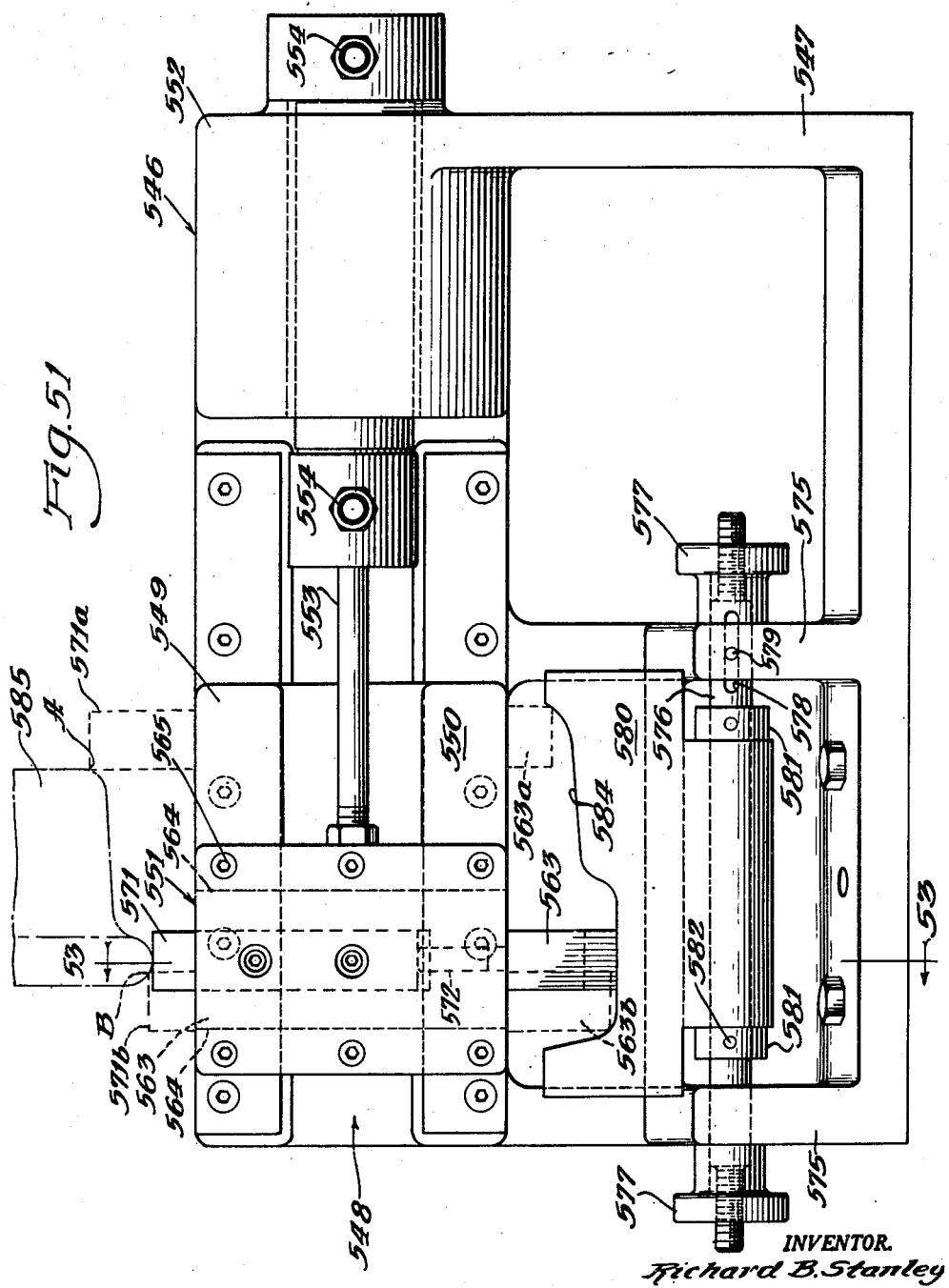

Dec. 23, 1952     R. B. STANLEY     2,622,374
WHEEL TRUING DEVICE
Filed April 24, 1950     34 Sheets-Sheet 32
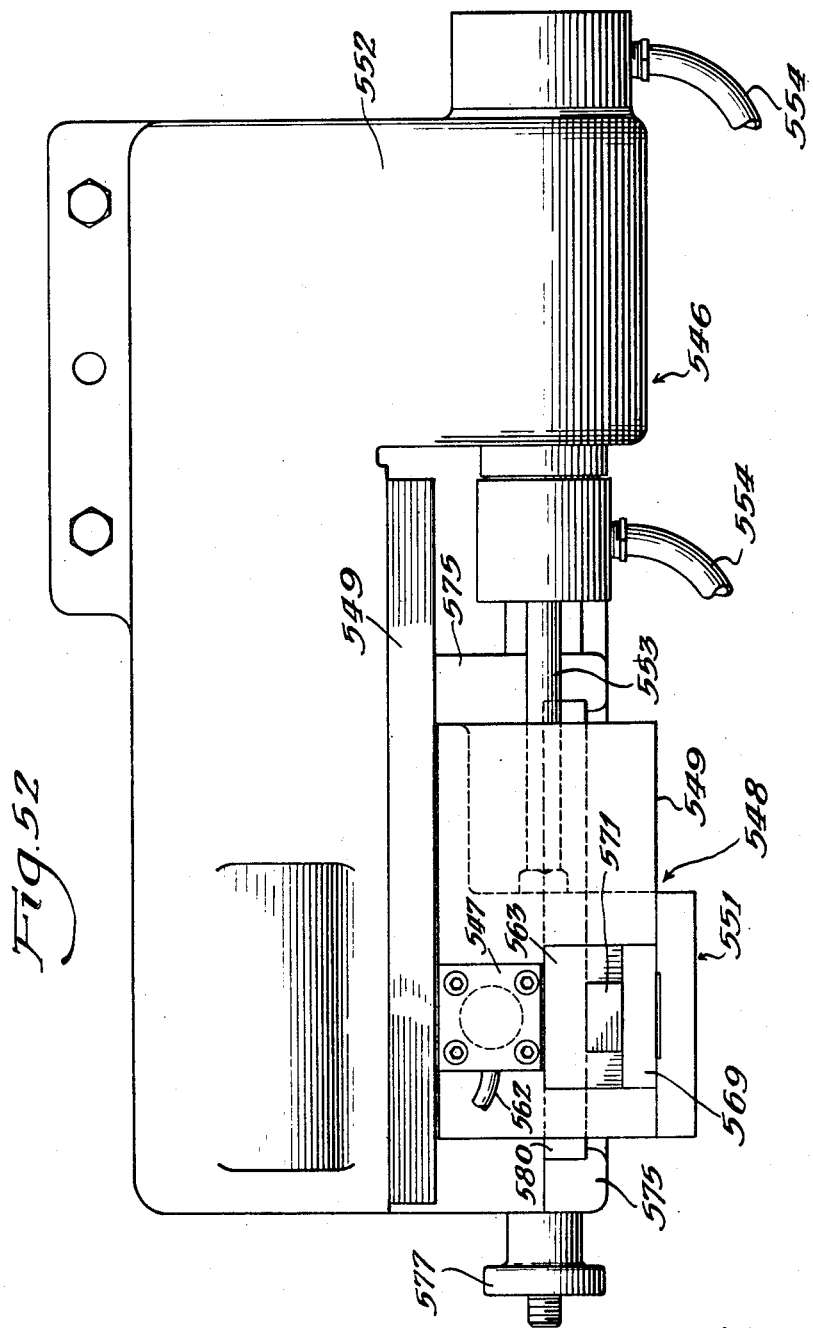
INVENTOR.
Richard B. Stanley
BY
Zahl & Gritzbaugh
Attorneys Dec. 23, 1952  R. B. STANLEY  2,622,374
WHEEL TRUING DEVICE
Filed April 24, 1950  34 Sheets-Sheet 33

INVENTOR.
Richard B. Stanley
BY
Zabel & Gritzbaugh
Attorneys.

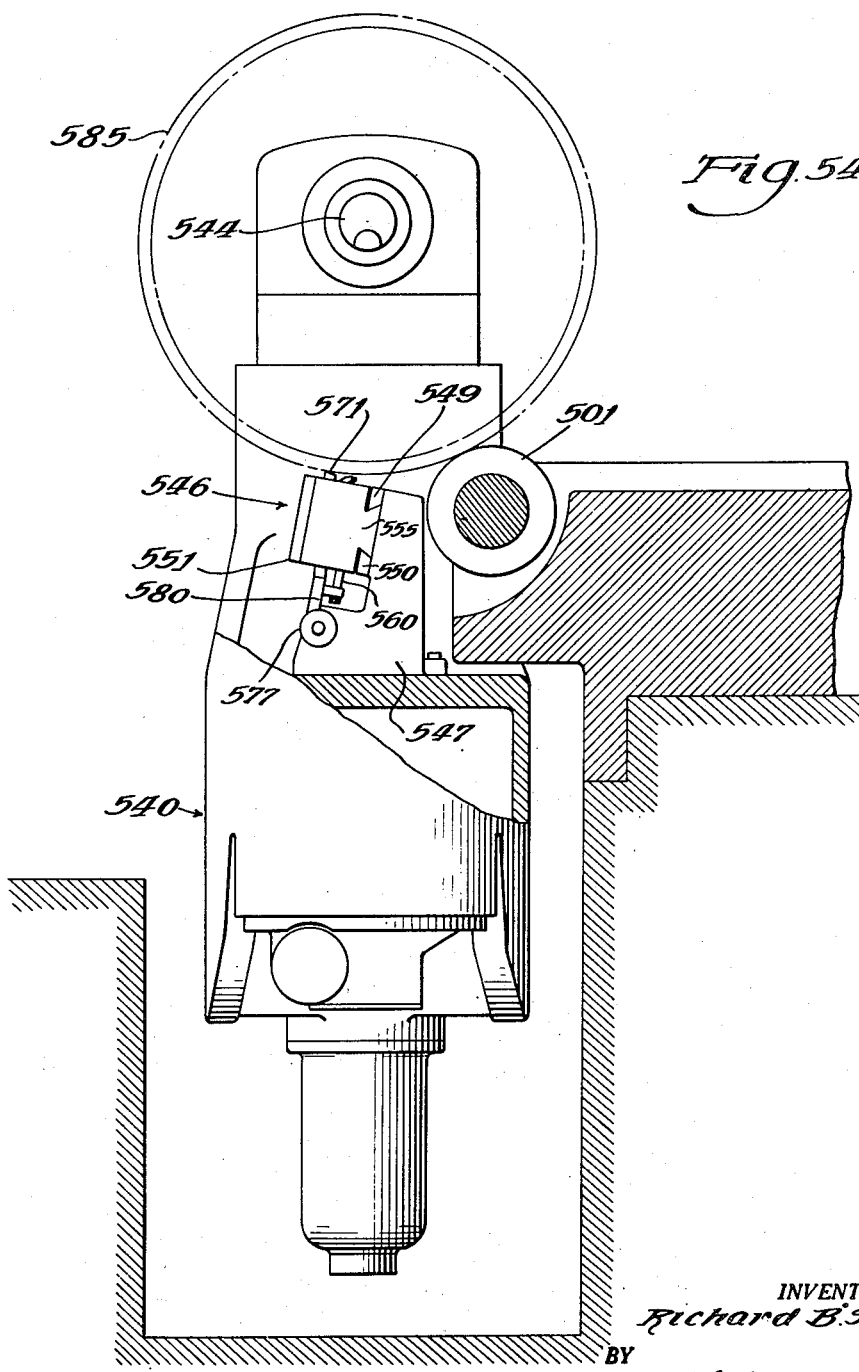

Patented Dec. 23, 1952

2,622,374

UNITED STATES PATENT OFFICE 2,622,374

WHEEL TRUING DEVICE

Richard B. Stanley, Park Ridge, Ill., assignor to Alpha Engineering & Machine Works, Inc., Chicago, Ill., a corporation of Illinois Application April 24, 1950, Serial No. 159,735

47 Claims. (Cl. 51—104)

The present invention is concerned with truing machines for use in refinishing wheels of railroad equipment including passenger and freight cars, street cars and the like.

Railroad car wheels are subject to much abuse during normal use due to wear, to spalling resulting from the alternate heating and cooling caused by braking applications and to the skidding of the wheels along the tracks when cars are brought to an emergency stop while operating at high rates of speed. Frequently due to emergency stops, a wheel or wheels are locked so that they are slid along the rails resulting in the formation of flat spots known as "flats" on the wheel tread. Such a condition practically cripples the car requiring prompt repair or replacement of the wheel before the car can again be placed in regular service. In some instances it is possible for the car to proceed on its scheduled run, but normally it must proceed, if at all, at greatly reduced speeds until the wheel has been repaired or replaced. It is not at all uncommon for a large number, if not all, of the wheels on a train of cars to have "flats" develop as a result of an emergency stop.

The present invention is intended to provide a practical and effective device for truing car wheels which may be deformed from their rotund shape as a result of the presence of flats or like defects. This is accomplished in a relatively short time without requiring the wheels to be removed from the car. Thus the operation of truing wheels may be performed in the railroad yards without requiring the wheel to be shipped to a distant repair shop. This is not true with the more conventional prior devices. The equipment normally must be withdrawn from service for sufficient time to permit the defective wheel to be removed from the car and replaced with a new or refinished wheel. The faulty wheel thus removed is then usually sent to a distant repair shop where it is placed in a lathe for refinishing.

In addition to the foregoing the present invention guarantees the attainment of a truly round wheel even though it was initially somewhat egg-shape or otherwise distorted before the refinishing operation is performed. This is made possible because in the device forming the present invention the machine tool is positively set at a true radius from the center of the wheel so that the machining is done on the circumference of a circle whose center corresponds with the true center of the wheel. The wheel is not removed from the car while this is being done.

The wheel truing device forming the subject matter of the present invention may be mounted in a pit located beneath a pair of track rails and in order to perform the truing operation the railroad car is brought over the pit with the pair of wheels to be trued disposed directly above the machine. In order to perform the truing operation on the pair of wheels it is necessary to rotate the car wheels slowly and this can be done in the manner shown in one embodiment of the invention by slowly moving the entire car along the length of the pit and having the truing machine so mounted with respect to the wheels to be trued that the machine moves lengthwise in the pit with the car.

In a second embodiment of the invention, however, the truing machine is mounted in a stationary position in the pit and supporting and rotating wheels or rollers are provided to support off the track rails the wheels to be trued and rotate them during the truing operation. In this second embodiment of the invention these supporting and rotating wheels are mounted independently of the means for supporting the truing machine, whereas in a third embodiment of the invention these supporting and rotating wheels are mounted in members that also form parts of the supporting means for the machine itself.

In the case of all embodiments the vehicle whose wheels are to be trued is brought as a unit to the machine, but in the second and third embodiments when the wheels are in proper position for effecting the truing operation, the vehicle is brought to rest directly over the supporting and rotating wheels. By means of suitable mechanisms the supporting and rotating wheels are raised so as to lift the car wheels with respect to the track rails and after the necessary adjustments have been made in the truing machine the truing operation is accomplished in a relatively short time.

When this operation has been completed the machine is simply moved out of the way, the wheels are lowered onto the track rails after certain adjustments have been made and the vehicle is moved on its way back into regular service, or the car or train of cars is again advanced over the pit to bring into proper position another pair of wheels to be trued. Any number or all of the wheels of any car or cars in a train can be trued by simply moving the train over the pit and stopping periodically in the proper position for the truing machine to perform its task. The space required for accommodating the machine in the case of the second and third embodiments of the invention is less than required in the case of the first embodiment, but in all instances the space requirement is relatively small and the wheels are trued while remaining in place on the car truck. It is important that each wheel when trued be restored to absolute roundness irrespective of the condition of the wheel prior to commencing the truing operation. It is also important that the wheels on the opposite ends of a car axle be trued to exactly the same diameter.

The objective is to provide a truing machine that can be easily and quickly handled and one that can perform an accurate truing operation with the minimum amount of wear and tear on the machine and cutting tool parts so as to reduce maintenance and replacement thereof to a minimum.

The truing operation can be accomplished with a milling cutter as is shown in the first three embodiments of the invention or it may be done with a lathe tool illustrated in a fourth embodiment of the invention. But once again, the results are accomplished without removing the wheels from the car truck.

All of these objectives are accomplished with the various embodiments of the truing machine forming the subject matter of the present invention.

The foregoing objectives are attained in a relatively simple but very effective manner requiring a minimum of time, and constitute some of the principal objects and advantages of the present invention, others of which will become apparent from the following description and the drawings, in which Fig. 1 is a more or less diagrammatic side elevational view of a truing device mounted on a set of car wheels that are disposed over a pit and illustrating one embodiment of the invention;

Fig. 2 is a vertical transverse sectional view through the car truck, track and pit shown in Fig. 1; the view being taken on the line 2—2 of Fig. 1 and showing the truing device in more or less end elevation;

Fig. 3 is a front view of the wheel truing device, per se, the view being taken in the direction of arrows 3—3 of Fig. 1;

Fig. 4 is a vertical sectional view through the device on the line 4—4 of Fig. 3, the view including a portion of the central rail and supporting I-beam;

Fig. 5 is an enlarged sectional view through the truing device taken on the line 5—5 of Fig. 3;

Fig. 6 is an enlarged sectional view through one arm of the truing device, the view being taken on the line 6—6 of Fig. 2, a portion of the device being shown in elevation;

Fig. 7 is a fragmentary view of one of the supporting rollers for the truing device, the view being taken in the direction of the arrows 7—7 of Fig. 6;

Fig. 8 is an enlarged sectional view through a portion of the truing device, the view being taken on the line 8—8 of Fig. 1;

Fig. 9 is a more or less diagrammatic, enlarged perspective view illustrating the clutch for engaging and disengaging the power drive for the machine tool;

Fig. 10 is an enlarged vertical sectional view through a portion of the truing device, the view being taken on the line 10—10 of Fig. 1;

Fig. 11 is a transverse sectional view through the central wheel supporting the truing device, the view being taken on the line 11—11 of Fig. 10, the rail being omitted for purposes of clarity;

Fig. 12 is a plan view of a pit and railroad track assembly with the truing machine installed therein;

Fig. 13 is an enlarged, transverse sectional view taken through the pit showing in side elevation the truing machine, the view being taken along the line 13—13 of Fig. 12;

Fig. 14 is an enlarged plan view of the truing machine illustrated in Figs. 12 and 13;

Fig. 15 is an end elevational view of the machine illustrated in Fig. 14, the view being taken from the left hand side of Fig. 14 looking toward the right;

Fig. 16 is an enlarged, longitudinal, sectional view taken through the pit and truing machine, with portions being illustrated in elevation and other portions broken away and shown in section, the view being taken along the line 16—16 of Fig. 12 and further illustrating in broken lines a railway car mounted with one of its trucks in proper place for wheel truing;

Fig. 17 is an enlarged, fragmentary, longitudinal, sectional view taken through the pit illustrating a car wheel supporting and rotating drive mechanism used in conjunction with the truing device, the view being taken along the line 17—17 of Fig. 13;

Fig. 18 is a fragmentary plan view of the car wheel supporting and rotating mechanism illustrated in Fig. 17;

Fig. 19 is a vertical, transverse, sectional view taken through the portion of the wheel supporting and rotating mechanism illustrated in Fig. 18, the view being taken along the line 19—19 of Fig. 18;

Fig. 20 is an enlarged, vertical, sectional view taken through the car wheel supporting and rotating wheel assembly, the view being taken along the line 20—20 of Fig. 16;

Fig. 21 is an enlarged, vertical, sectional view taken through one side of the wheel truing device, the view being taken along the line 21—21 of Fig. 13;

Fig. 23 is an enlarged, vertical, sectional view taken through the truing machine, the view being taken along the line 23—23 of Fig. 15;

Fig. 24 is an enlarged, horizontal, sectional view taken through a portion of the truing machine along the line 24—24 of Fig. 13;

Fig. 25 is an enlarged, horizontal, sectional view taken through a portion of the truing machine, the view being taken along the line 25—25 of Fig. 13;

Fig. 26 is an enlarged, horizontal, sectional view taken through a portion of the truing machine, the view being taken along the line 26—26 of Fig. 14;

Fig. 27 is a reduced, transverse sectional view taken through one of the center assemblies of the truing machine, the view being taken along the line 27—27 of Fig. 26;

Fig. 28 is an enlarged, fragmentary, side elevational view of the truing machine showing the clutch mechanisms for operating the machine and center elevating mechanisms with a portion broken away and illustrated in section;

Fig. 29 is a fragmentary plan view of the mechanism shown in Fig. 28;

Fig. 30 is a front elevational view of the mechanism illustrated in Fig. 29;

Fig. 34 is a plan view of a pit and truing machine but illustrating still another embodiment of the present invention;

Fig. 35 is a side elevational view of the truing machine and wheel supporting and rotating assembly illustrating this additional embodiment of the invention, a portion of the machine and the wheel supporting and rotating assembly being broken away and illustrated in section on line 35—35, Fig. 34;

Fig. 36 is a longitudinal sectional view taken through the pit and track assembly, the view being taken through the pit and track assembly, the view being taken along the line 36—36 of Fig. 35 but showing the truing machine substantially in end elevation, with a portion of the machine removed;

Fig. 37 is an enlarged, vertical sectional view taken through the cradle assembly that supports the wheel truing machine and the wheel supporting and rotating mechanism, the view being taken along the line 37—37 of Fig. 35;

Figure 53:
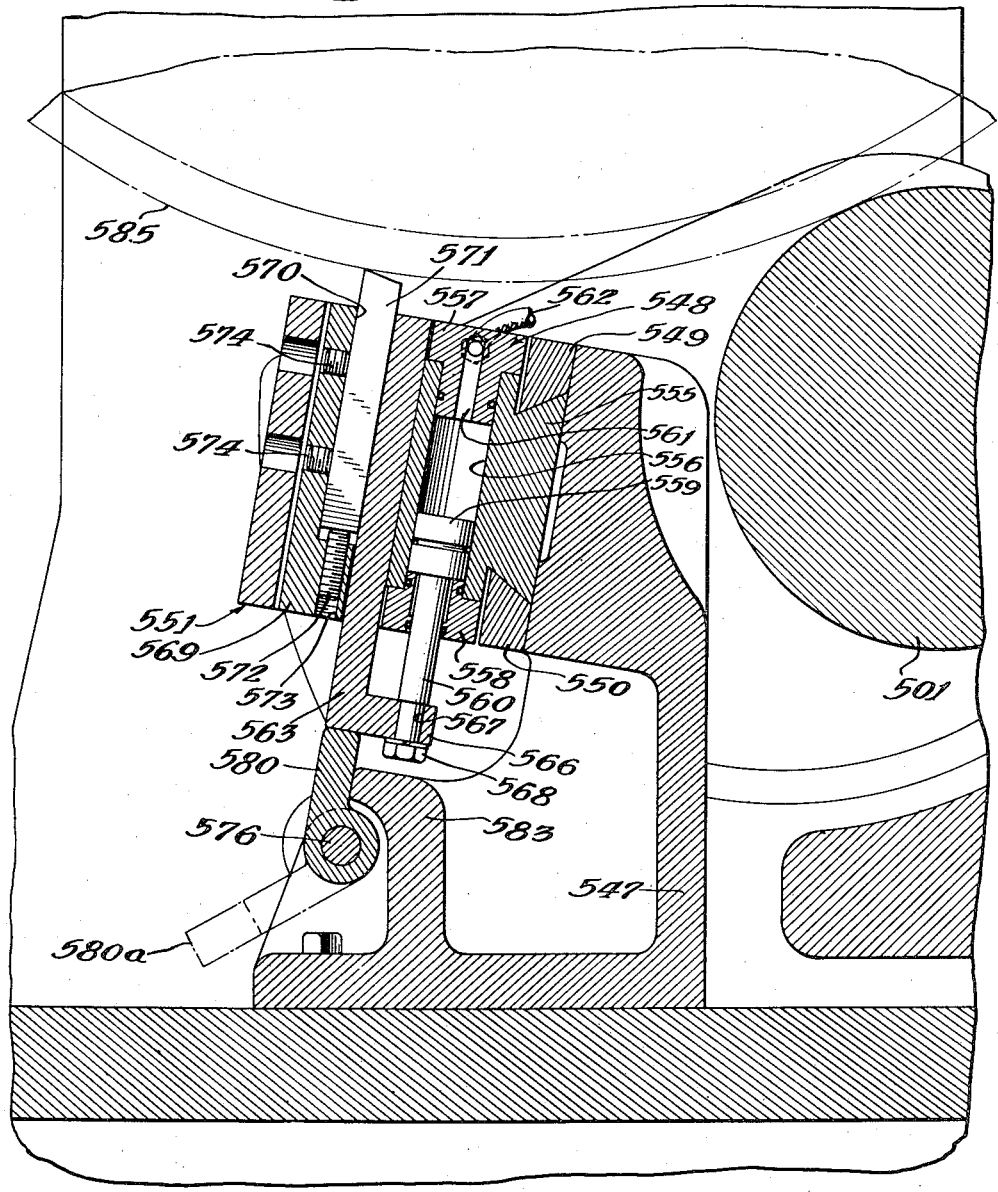

Fig. 38 is an enlarged, vertical sectional view corresponding substantially with Fig. 36 but illustrating the sliding rail in side elevation and in its closed position as distinguished from the open position shown in Fig. 36, and also illustrating the supporting and rotating wheel disposed in its retracted position with respect to the vehicle wheel upon which the truing operation is to be performed;

Fig. 39 is a view corresponding to Fig. 38 but illustrating the supporting and rotating wheel in its raised position supporting the vehicle wheel off the track rail;

Fig. 40 is an enlarged plan view shown partially in section of the cradle assembly that supports the wheel truing machine and the supporting and rotating wheel and drive mechanism therefor;

Fig. 41 is a vertical sectional view through the cradle assembly, the view being taken along the line 41—41 of Fig. 40, the motor and motor support being shown in elevation;

Fig. 42 is an enlarged, transverse sectional view taken through one of the track assemblies, the view being taken along the line 42—42 of Fig. 36;

Fig. 43 is a diagrammatic side elevational view of a vehicle wheel that is being trued, the view illustrating the condition of the wheel after the cutter has first reached its ultimate depth of cut;

Fig. 44 is an end elevational view of the assembly shown in Fig. 43, the view being taken in the direction looking from right to left in Fig. 43 and showing the vehicle wheel mounted on the knurled portion of the supporting and rotating wheel;

Fig. 45 is a view corresponding to Fig. 43 but illustrating the condition of the wheel being trued during the last portion of the truing operation when the wheel is riding on the smooth portion of the supporting and rotating wheel;

Fig. 46 is a view corresponding to Fig. 44 but illustrating the relative position of the supporting and rotating wheel under the car wheel during the operation of the portion illustrated in Fig. 45;

Fig. 47 is a view corresponding to Figs. 43 and 45 but showing the vehicle wheel mounted on the closed rail with the supporting and rotating wheel in its retracted position so as to permit the vehicle to move along the track;

Fig. 48 is a view corresponding to Figs. 44 and 46 but illustrating the relative position of the supporting and rotating wheel under the conditions illustrated in Fig. 47;

Fig. 49 is a front elevational view of a wheel truing device illustrating still another embodiment of the invention, the device being shown in a pit that is indicated in section;

Fig. 50 is a plan view of the wheel truing device shown in Fig. 49 mounted in the pit;

Fig. 51 is an enlarged, front, elevational view of the lathe tool assembly forming part of the embodiment of the invention shown in Fig. 49;

Fig. 52 is a plan view of the lathe tool assembly illustrated in Fig. 51;

Fig. 53 is an enlarged, vertical sectional view taken through the lathe tool assembly, the view being taken along the line 53—53 of Fig. 49; and Fig. 54 is an end elevational view of the wheel truing device illustrated in Fig. 49 with a portion of the truing device shown in section, the section being taken at the position indicated by the line 54—54 of Fig. 49.

It is readily understandable that railroad car wheels must be as nearly completely round as possible in order to insure a high degree of travel comfort. Vibrations and car motion can be reduced to a minimum only if the wheels are truly round and free of tread and flange irregularities. It has been the practice for many years to true worn wheels on shop lathes and the wheels thus trued are truly round and have given very satisfactory results in service. It has been necessary in the past, however, to remove worn wheels from the vehicle or car and to ship these wheels to the shop where the truing lathes are located. This, of course, has necessitated jacking up the car for removal of the worn or damaged wheels and in order to reduce the time the car is out of service, it has been the practice to install immediately new or previously trued wheels to replace those removed. This necessarily involves maintaining a stock of good wheels on hand and, of course, entails making provisions for transporting wheels back and forth from the repair track to the shops where the truing operations are performed.

With the present invention the entire car or train of cars is brought directly to the truing machine. There is no need to remove the worn or damaged wheels from the car truck. The finished wheels are truly round because the cutting tool is maintained at a constant distance from the center of the wheel during the cutting operation. This saves not only the services of men and facilities previously needed for transporting wheels between the repair tracks and the shops but also greatly reduces the time required to complete the operation. Obviously this represents important savings to the railroad.

This is a continuation-in-part of applicant's copending applications Serial No. 678,138, filed June 20, 1946 now abandoned and Serial No. 88,076, filed April 18, 1949 now abandoned.

For purposes of illustration four specific embodiments of the present invention have been selected and will be described hereinafter, it being realized, however, that many modifications will occur to the man skilled in the art and it is intended that such modifications may be made within the intended scope of the invention.

Referring now to the drawings and particularly to Figs. 1 and 2 the first embodiment of the invention is illustrated in conjunction with a railroad car indicated at 25 in Fig. 1 which is mounted on conventional wheeled trucks, one of which is indicated generally at 26. As shown the car is mounted on the usual railroad tracks indicated at 27 which comprise a pair of spaced rails 28 and 29 (see Fig. 2). These rails 28 and 29 span a pit generally indicated at 30 comprising spaced end walls 31 and 32, a floor 33 and side walls 34. A pair of I-beams 35 and 36 extend the full length of the pit 30 and are suitably supported by the end walls 31 and 32 in a manner not shown. These I-beams 35 and 36 are mounted directly beneath the rails 28 and 29 respectively and serve as supporting members for these rails. Between the I-beams 35 and 36 and disposed parallel thereto is a central I-beam 37 that likewise extends the full length of the pit 30 and is supported by the end walls 31 and 32 of the pit.

Mounted in pit 30 is a wheel truing device generally indicated at 38 which comprises generally a C-frame 39 having a lower substantially horizontal portion 40 with generally upstanding arms 41 and 42 disposed at the opposite ends of the central portion 40. Mounted on the upper free end of each of the upstanding arms 41 and 42 is an arbor supporting and adjusting member generally indicated at 45.

Extending upwardly from the lower central portion 40 of the C-frame 39 are a pair of upstanding supports 46 and 47, each provided at its upper end with a bearing member 48 and a spindle support 49 spaced apart as best shown in Figs. 2 and 3. The arbor supports 45, spindle supports 49 and the bearings 48 are all disposed on a common axis.

Journalled in the bearings 48 is a rotatable shaft 50 at each of the opposite ends of which is fastened one end of a coupling 51 by a machine screw or the like indicated at 52 in Fig. 8. This shaft 50 is free to rotate in the bearings 48.

Again referring to Fig. 8 each of the spindle supports 49 has journalled therein a spindle 53 that is provided with a projection 54 to which is attached the other end of the corresponding coupling 51 by means of a suitable machine screw 55. Each of the spindles 53 is free to rotate in its respective spindle support 49, and has projecting on the opposite side thereof one portion 56 of a clutch that is generally indicated in Fig. 8 at 57. This portion 56 has a female slot 58 therein together with a pilot hole 59 that extends well into the spindle 53 as best shown in Fig. 9.

Referring now to Fig. 8 each of the arbor supporting and adjusting members 45 comprises a hollow cylindrical portion 60 having an end wall 61 substantially closing one end thereof. A movable sleeve 62 is mounted in the cylindrical portion 60, one end of the sleeve 62 being closed by an end closure member 63. Projecting outwardly from the end closure member 63 is an exteriorly threaded hollow screw 64 that passes through an opening 65 in the end wall 61 of the cylindrical portion 60. An internally threaded bushing-like member 66 surrounds the screw 64 and projects through the opening 65 into the interior of the cylindrical portion 60. A flange 67 locks the bushing 66 in the opening 65. Integral with the bushing 66 is a turning handle 68.

Projecting through the hollow screw 64, through the end wall 63 of the sleeve 62, is a pilot bar 69 that is threaded on one end as at 70 and is provided with a turning handle 71 at the other end thereof. This pilot bar 69 is adapted to enter the pilot hole 59 (Fig. 9) in the spindle 53 and is secured therein by means of the threads 70. A shoulder 72 on the inner end of the turning handle 71 engages the free end of the hollow screw 64 so that the pilot bar 69 can be drawn up tight against the end of the screw 64.

Mounted on the pilot bar 69 is a cutter mandrel 73 that is mostly contained within the sleeve 62 but has an annular shoulder member 74 disposed adjacent to the outer end of the sleeve 62. On the inner surface of the sleeve 62 is provided an annular shoulder 75 and between this last mentioned shoulder 75 and the shoulder 74 is sandwiched a ball bearing race member generally indicated at 76 that comprises an outer ring 77 and an inner ring 78, between which rings are spaced a plurality of ball bearings 79. The opposite end of the mandrel 73 is threaded as at 80 to receive a nut 81 that provides a shoulder 82. Adjacent to this shoulder is a second shoulder 83 that is formed on the inside surface of the sleeve 62 and between these last two mentioned shoulders is provided a second ball bearing race member generally indicated at 84. This second ball bearing race member 84 is identical with that indicated at 76. Thus the mandrel 73 is journalled on ball bearings and is free to rotate about the ball bearing 69 while the sleeve 62 and the arbor support member 45 remains stationary. The sleeve 62 is grooved at 85 and a lock member 86 passes through an opening 87 in the sleeve 62 and enters this slot 85 so as to prevent the sleeve from rotating.

Mounted on the free end of the mandrel 73 against the opposite face of the shoulder member 74 is a cutter or grinding tool 88 that is locked onto the free end of the mandrel 73 by means of a lock nut 89 that is threaded in place as indicated at 90.

As shown in Figs. 8 and 9 the mandrel 73 is provided at the free end thereof with an outwardly extending male clutch member 91 that cooperates with the slot 58 on the spindle 53 so as to complete the clutch member indicated at 57 in Fig. 8.

The sleeve 62 carrying the mandrel 73 with the male projection 91 of the clutch and the cutting tool 88 are free to slide back and forth in a horizontal direction in the cylindrical portion 60 of the arbor support 45. This backward and forward movement is effected by rotating the turning handle 68, the rotation of the handle effectively feeding the threaded screw member 64 in and out through the end wall 61 of the cylindrical portion 60.

Referring to Figs. 2 and 3 a pulley wheel 92 is mounted on the shaft 50 and directly below this shaft is a motor 93 mounted on the vertical supporting member 47. This motor 93 is provided on its shaft with a pulley 94, and this last mentioned pulley 94 is rotatably connected with the pulley 92 by means of a belt indicated at 95. Thus the shaft 50 is rotated by the motor 93 and through the couplings 51 and 52 this rotation is imparted to the spindles 53 and the female portions of the clutch 57. Each of the mandrels 73 may be rotated by coupling the male and female portions of the corresponding clutch 57.

As shown in Figs. 2, 3 and 8, disposed adjacent to and integral with each arbor supporting member 45 is a pair of vertically disposed cylinders 100 and 101. Fixed with respect to cylinders 101 and projecting upwardly therefrom is a guide shaft 102 (see Figs. 3 and 8). Mounted in the cylinder 100 and projecting upwardly therefrom is a slidable extension shaft 103. On the upper end of the extension shaft 103 is a horizontally disposed centering cylinder 104, which as best shown in Fig. 6, includes a sleeve-like portion 105 that is adapted to telescope over the end of the extension portion 103 and rest against a shoulder 106 on said extension portion. The end of the extension portion 103 is threaded as at 107 to receive a lock nut 108. The centering cylinder 104 is apertured so that it is adapted to be telescoped over the guide shaft 102. Thus the centering cylinder 104 is slidable upon and down with respect to the cylinders 100 and 101, the extension shaft 103 sliding in and out of the cylinder 100 while the centering cylinder 104 moves up and down on the stationary guide shaft 102.

The extension shaft 103 as shown in Fig. 6 is hollow throughout the greater portion of its length and is provided with a relatively thick end wall 110 at its lower end. This wall is apertured and threaded to receive the threaded end 111 of a rotatable adjusting shaft 112. This adjusting shaft 112 passes through a wall 113 that closes the lower end of cylinder 100 and projects into the cylinder 100 with its threaded end 111 projecting into the extension shaft 103. An angle supporting bracket 114 (Figs. 1, 2 and 6) secured to the C-frame 39 is disposed at the end of the shaft 112 and is apertured to receive the lower end of the shaft 112 and serves as a bearing therefor. A bevelled gear 115 is mounted on the lower end of shaft 112. Thus shaft 112 may be caused to rotate through the bevelled gear 115 and such rotation, by virtue of the threaded portion 111 cooperating with the threads on the extension shaft 103, produces a linear movement of the extension shaft 103 in and out of the cylinder 100. In this manner the centering cylinder 104 (Fig. 8) is caused to move toward or away from the arbor supporting and adjusting member 45, guided in its movement by the guide shaft 102.

As shown in Fig. 3 a gear box 116 is mounted on the C-frame 39, and as shown is disposed more or less midway between the ends of the central portion 40 thereof. A motor 117 is likewise mounted on the C-frame 39 and is connected to drive the gears in the gear box 116. Supported between the gear box 116 and each of the angle brackets 114 is a horizontally connecting shaft 118 that has provided on the end thereof a bevelled gear 119 that is adapted to mesh with the corresponding bevelled gear 115 that is carried by the end of the adjacent adjusting shaft 112 (Figs. 3 and 6). Thus in response to motor 117 (Fig. 3) each of the adjusting shafts 112 is rotated through the gear box 116, the connecting shafts 118 and the bevelled gears 119, 115. Motor 117 is reversible so that it is adapted to rotate the adjusting shafts 112 in either direction, thereby moving the extension shafts 103 up or down depending upon the direction of the rotation of the motor.

Referring again to Fig. 8 each of the centering cylinders 104 is closed at one end thereof as at 120 and mounted within each cylinder is a slidable center 121 that extends beyond the open end of the cylinder 104 and is adapted to slide back and forth in the cylinder. A key 122 operating in a keyway 123 in the center 121 prevents rotation of the center 121. A rotatable bushing 124 is mounted in an aperture in the end wall 120 of cylinder 104 and projecting inwardly from the bushing 124 is a threaded stud 125. Stud 125 passes into a similarly threaded aperture in the center 121 so that upon rotation of the stud 125 the center 121 is moved in or out of the cylinder 104. A turning handle 126 is secured to the end of the bushing 124 so as to facilitate the turning of the threaded stud 125.

Referring to Figs. 2 and 10 it is to be noted that the C-frame 39 is provided with a centrally disposed wheel 127 that rides along a central rail 128, the rail being mounted on the central I-beam 37. Two other points of suspension for the C-frame 39 are provided at 129 and 130, these last two suspension points being identical and for purposes of illustration, one only will be described hereinafter.

Referring first to Figs. 10 and 11, the central supporting wheel 127 is carried on a stationary axle 131 that is mounted at its opposite ends in fixtures 132. The axle 131 is held in its fixtures 132 by means of machine screws 133.

As shown in Figs. 10 and 11 the axle 131 has a central portion 131a having a cross sectional linear dimension that is less than the diameter of the end portions of the axle. This central portion 131a as shown in Fig. 11 is substantially circular in cross section but providing relatively flat bearing surfaces 134 on four faces thereof. Mounted concentrically about the central portion 131a of the axle 131 is a cylindrical sleeve 135 that is longitudinally grooved so as to provide relatively flat bearing surfaces 136 that are spaced from and aligned with the flat bearing surfaces 134 of the central axle portion 131a. A plurality of roller bearings 137 are held between the bearing surfaces 134 and 136 and are so arranged that the sleeve 135 may be moved back and forth along the central portion 131a of the axle 131 in a direction corresponding to the length of axle 131. Compression springs 138 are disposed between the opposite ends of the sleeve 135 and the adjacent fixture 132 in which fixtures the axle 131 is supported. The compression springs 138 thus serve to center the central supporting wheel 127 and permit relative linear longitudinal movement of the axle 131 with respect to the wheel 127, such movement being resisted by the compression springs 138.

Mounted concentrically on the sleeve 135 is a pair of inner ring members 139 and outer ring members 140. These rings are threaded onto the ends of sleeve 135 as shown in Fig. 10. Each pair of inner and outer ring members 139 and 140 is disposed adjacent to one end of the sleeve 135. Also mounted concentrically on the sleeve 135 and disposed between the spaced inner ring members 139 is a bearing sleeve 141 that is provided with an annular flange portion 142 on each end thereof, each of which flange 142 fits beneath an annular projection 143 on the adjacent inner ring 139. The annular bearing member 141 is provided with a pair of flat bearing surfaces 144 and 145 that are inclined with respect to each other. Mounted concentrically around each inner ring 139 is an annular retaining ring 146 that is provided with a shoulder 147 that is adapted to engage a corresponding shoulder on the inner ring 139 so as to be held in position on said inner ring.

A plurality of self-aligning roller bearings 148 are mounted on the bearing surfaces 144 and 145 on the bearing sleeve 141 and mounted on each set of roller bearings 148 is a ring 149. Each of the rings 149 is provided with a relatively flat bearing surface 150 on its inner face, which surface is disposed at an angle corresponding to the angle of inclination of the surface 144 or 145, these two surfaces serving as races for the roller bearings 148, and permitting self-alignment within approximately three degrees variation. Thus the combination of bearings 137 and 148 provides limited universal movement of frame 39. Mounted on the outer faces 151 of the rings 149 is a tread ring 164 having an outer surface 166 that engages the top of rail 128. As shown each ring 146 has an outwardly extending annular projection 152 providing straight faces 153 against which flanges 167 of the tread ring 164 rest. Bolts 165 fasten the tread ring 164 to the retaining rings 146.

Referring now to Figs. 1, 2, 3, 6 and 7, the points of suspension 129 and 130 are each identical. Each comprises a rod 154 that is supported near the top in a bracket 155, that is attached to the C-frame 139, and adjacent to the bottom passes through a flange 156 forming part of the C-frame. An enlarged head 157 is provided at each of the opposite ends of the rod 154 and a compression spring 158 surrounds the rod 154 and is disposed between each enlarged head 157 and the adjacent bracket 155 or flange 156. The rod 154 is prevented from rotating by a key 168 (Fig. 7) fitting into a keyway 169 in the rod.

Extending outwardly from the rod 154 at an intermediate position thereof is a shaft 159 on the end of which is rotatably mounted a wheel 160. Ball bearings or the like 161 may be provided between the wheel 160 and the shaft 159. The wheel 160 as shown is slidable back and forth along the shaft 159 and a retaining nut 162 prevents the wheel from sliding off the end of the shaft. A compression spring 163 surrounds the shaft 159 and is retained between rod 154 and the wheel 160 so as to urge the wheel 160 outwardly away from rod 154. Inward movement of the wheel 160 is thus resisted by the compression spring 163. Thus it is evident that the supporting wheel 160 has relative movement back and forth along the shaft 159 and also has relative movement in a vertical direction with respect to the C-frame 39 by virtue of the fact that the rod 154 is provided with relative movement through the brackets 155 and 156 resisted by the compression springs 158.

The operation of the first embodiment of the invention will now be described.

The wheel truing device 38 is normally located in a pit such as the one shown at 34 in Fig. 1 and it is normally supported by its central bearing or wheel 127 on the center track 128 and by its lower spring loaded wheels 160 supported on the lower flanges of I-beams 35 and 36. A car having wheels to be trued is moved over the pit as illustrated in Fig. 1 and the truing device 38 is then brought up into a position adjacent to a wheeled axle upon which the device is to be mounted. Initially the centers 121 are moved back into their cylinders 104 and the cutter mandrels 73 are moved back into their cylinders 60 so that both the centers 121 and the cutting tools 88 are disposed out of the way to clear the car truck indicated at 26 in Figs. 1 and 2. During this time the electric motor 93 that drives shaft 50 may or may not be in motion. The truing device 38 is then adjusted so that the centers 121 are brought in alignment with the centers of the wheeled axle indicated at 26a in Fig. 2. The journal box covers indicated at 167 are opened as shown in Fig. 2 and then the centers 121 are moved, by rotating the turning handles 126, into engagement with the centers of the axle.

During this manipulation of the truing device the angle of the C-frame 39 with respect to the tracks is altered, the main load of the device resting on the center track 128 through the bearing wheel 127 and the spring loaded supporting wheels 160 automatically adjusting themselves to support their share of the load. At first the spring loaded wheels 160 carry a large share of the load but the load is shifted to three points including the central bearing wheel 127 on rail 128 and the centers 121 that are suspended from the ends of the axle. The weight has been thus lifted from the wheels 160. The truing device 38 is now centered with respect to the center of the wheeled axle 26.

At this stage each of the cutting tools 88 is disposed to one side of the car wheel on which it is to operate and at a radius from the center of the wheel sufficient to permit the cutting tool to be brought into the plane of the wheel without obstruction. Each mandrel 73 is then moved toward its respective spindle 53 until clutches 57 are closed, and in this condition each cutting tool 88 is caused to rotate their rotating spindles 53. The depth of cut is now adjusted. The motor 117 is operated to adjust the spacing of both cutter tools 88 with respect to the centers 121, this operation being effected through the adjusting mechanism including shafts 118, and the adjsuting shafts 112 connected by their respective bevelled gear sets. Thus this operation of adjusting the initial positions of the cutting tools 88 with respect to the centers 121 is synchronized so that the depth of the cut in both wheels is identical. The depth of the cut, of course, will depend upon the depth required to eliminate the imperfection in the faulty wheel. This initial adjustment of the cutting tools 88 while the cutting tools are rotating effects the initial cut in the wheel and then the car on which the faulty wheel is mounted is pulled bodily in the direction of the arrow indicated at A in Fig. 1 so as to cause the wheels to rotate. The pulling force may be applied through a cable 170 that may be fastened to the end of the car and the rate of movement of the car will be governed by the required rate of feed of the wheels with respect to the rotating cutting tools 88. During the turning of the wheels the cutting tools 88 are removing metal from the tread of each pair of the wheels on which the truing device 38 is mounted and one complete turn of the wheels is required to complete the refinishing operation. Thus the car is pulled a distance corresponding at least to the circumference of the wheel.

The truing device is then removed from the wheel truck by simply lowering and withdrawing the cutting tools 88 and withdrawing the centers 121 so as to clear the car truck. As soon as the centers 121 are withdrawn from the ends of the axle the weight of the truing device returns to the lower spring loaded wheels 160 supported on I-beams 35 and 36 and the center wheel 127 supported on rail 128. The truing device may then be applied to the second set of wheels on the same truck 26 by simply moving it to the angle indicated at 38a in Fig. 1 and then adjusting it to the second set of wheels in the manner previously described. The cutting operation is performed on this second set of wheels by reversing the direction of movement of the car, but in every other respect the operation is identical with that previously described.

The cutting tool 88 may be a grinder or it may be a milling cutter depending upon the particular needs. Though both cutting tools 88 are shown driven from a single shaft 50, it is, of course, recognized that these tools may be driven separately, in which case separate motors 93 may be used. Cutting fluids may be required, in which event a supply may be stored in the pit 34 with flexible tubing and a pump utilized to convey the fluid directly onto the work.

Thus it is readily apparent that since the truing device is suspended directly from the centers of the wheels on which the machining is to be done, the machine tools are located at a fixed radius and, therefore, machine a true circumference on the wheel. Any irregularity in the roundness of the wheel before machining is positively corrected so that the finished wheel is round.

Referring now to Figs. 12 to 33 of the drawings and particularly to Fig. 12, the second embodiment of the present invention is illustrated in the form of a truing machine generally indicated at 171 that is mounted in a pit generally indicated at 172. This pit 172 is formed below the ground level illustrated at 173 and comprises four upper intermediate platforms 174 and two lower intermediate platforms 175 disposed on two different levels, both of which are below the ground level 173. The base of the pit is shown at 176 and is disposed at the lowermost level below all of the intermediate platforms 174 and 175. Four sets of stairways shown at 177 provide access from the ground level 173 to the upper intermediate platform 174 and four additional stairways 178 provide access from the upper intermediate platforms 174 to the lower intermediate platforms 175. A ladder 179 is disposed on each side of the pit and provides access from the ground level 173 to the bottom or lowermost level 176 of the pit. As best shown in Figs. 12, 13 and 16 the machine 171 projects down into the deepest portion of the pit.

Again referring to Fig. 12 a pair of railroad tracks 180 extend away from both sides of the pit and spanning the distance between the ends of the railroad tracks 180 and extending over the pit is a track assembly generally indicated at 181.

The details of this track assembly 181 form no part of the present invention and a complete description thereof is contained in the copending application of Richard B. Stanley and Bernard Pass, Serial No. 38,156, filed July 10, 1948. For a complete understanding of the present invention it will be merely necessary to explain that this track assembly 181 includes rail members 182, 183, 184, and 185 which together form a continuous track across the pit so that a car or train of cars can be moved over the rails 180 and entirely across the track assembly 181 over the pit. The rail member 183 is movable between two positions, one of which is illustrated in Fig. 12 where it is withdrawn away from rail member 184 so as to leave a break in the continuous track to accommodate the wheel truing machine 171. The other position closes this opening so as to join rail 182 to rail 184, thus effecting the continuous track across the pit.

Referring now to Figs. 12, 16, 17 and 20 there is disposed transversely of the track assembly 181 a rotatable shaft 186 on each end of which is mounted a supporting roller or wheel 187. This shaft 186 is journalled in a pair of spaced arms 188, each of which is pivotally mounted on its other end on a shaft 189. This shaft 189 in turn is mounted on a base member 190 that in turn is supported on a concrete wall 191 forming part of the structure of the pit 172. Each of the supporting wheels 187 is disposed closely adjacent to the inner face of the adjacent rail 184.

As best shown in Fig. 16 when a car illustrated in broken lines at 192 is disposed over the pit in proper position for truing a pair of wheels on its truck illustrated at 193, the wheels to be trued, one of which is illustrated at 194, are supported on the supporting and rotating wheels 187.

Mounted on the shaft 186 as best shown in Figs. 17 and 20, is a gear 195 that meshes with a gear 196 mounted on shaft 189. Disposed in parallel relationship with shaft 189 and spaced therefrom is a shaft 198 (see Figs. 17 and 18) on which is mounted an idler gear 199 that meshes with gear 196 and a driving gear 200 on a shaft 201. Driving gear 200 is keyed as at 201a to shaft 201 and this shaft 201 is driven through a gear box and speed reducing device generally indicated at 202 in Fig. 18 by a motor 203 driving through pulley and belt members generally indicated at 204. The details of this drive are more clearly and completely illustrated and explained in the previously mentioned copending application of Richard B. Stanley and Bernard Pass.

The arms 188 (see Figs. 16 and 20) can be raised and lowered about the shaft 189 so as to assume a position with the wheels 187 entirely below the top level of the track members 184, in which instance the railroad car wheels can clear these wheels 187 while the cars are moving across the pit. In the upper position illustrated in Figs. 16 and 17 the supporting and rotating wheels 187 project above the upper surface of rails 184 to engage the tread of the wheels of the car as illustrated in Fig. 16. To move the arms 188 with their supporting and rotating wheel assemblies there is provided a suitable hydraulic piston and cylinder device generally indicated at 205, (indicated in broken lines in Fig. 16). This piston and cylinder device 205 is secured as at 206 to the supporting and rotating wheel assembly 187. When the car 192 (see Fig. 16) is properly mounted over the pit in position for the truing operation to be effected, the supporting and rotating wheels 187 support the car wheels to be trued at a position to one side of the lowermost position of the wheel. Thus the support for the wheels of the railroad car during the truing operation is not disposed directly below the center of each wheel, but rather to one side of the vertical radius of the wheel.

Supported on the concrete walls of the pit 172 is a stationary central support generally indicated at 211 for the truing machine that includes a pair of side frame members 212 (see Figs. 12 and 13), spaced end frame members 213, and an intermediate transverse frame member 214. Disposed between and journalled in the frame members 213 and 214 is a shaft 215 that is adapted to rotate. The frame members 213 and 214 are cylindrically bored as shown at 216 and 217 respectively (see Fig. 22), to receive this shaft 215. This shaft 215 is circular in cross section throughout most of its circumference but is flattened on the bottom to receive adjacent to each of its ends an arcuate bearing member generally indicated at 218. Each of these arcuate bearing members 218 comprises a flat plate 219 screwed as at 220 to the bottom flat face of the shaft 215 and a bearing member 221 having a lower arcuate face 222 that has the same radius of curvature as the radius of the corresponding cylindrical bore 216 or 217. The bearing member 221 has an upper flat face 223 and between this flat face and the plate 219 are disposed roller bearings indicated at 224. End abutting plates 225 are secured to the opposite ends of the bearing member 221. Thus the shaft 215 is adapted to move in a longitudinal direction along the bearing members 221. The lower face of each bearing member 221 is arcuately grooved as at 226 and a set screw 227 passes through the corresponding framing member 213 or 214 as the case may be and is provided with a boss 228 on the upper end thereof that projects into arcuate groove 226 to prevent movement of the bearing member 221 in a longitudinal direction with respect to the shaft 215. This bearing member 221, however, can rotate with the shaft 215 in the cylindrical bores 216 and 217. Hold-down blocks 229 are disposed over the shaft 215 to hold the shaft in place.

Figure 22:
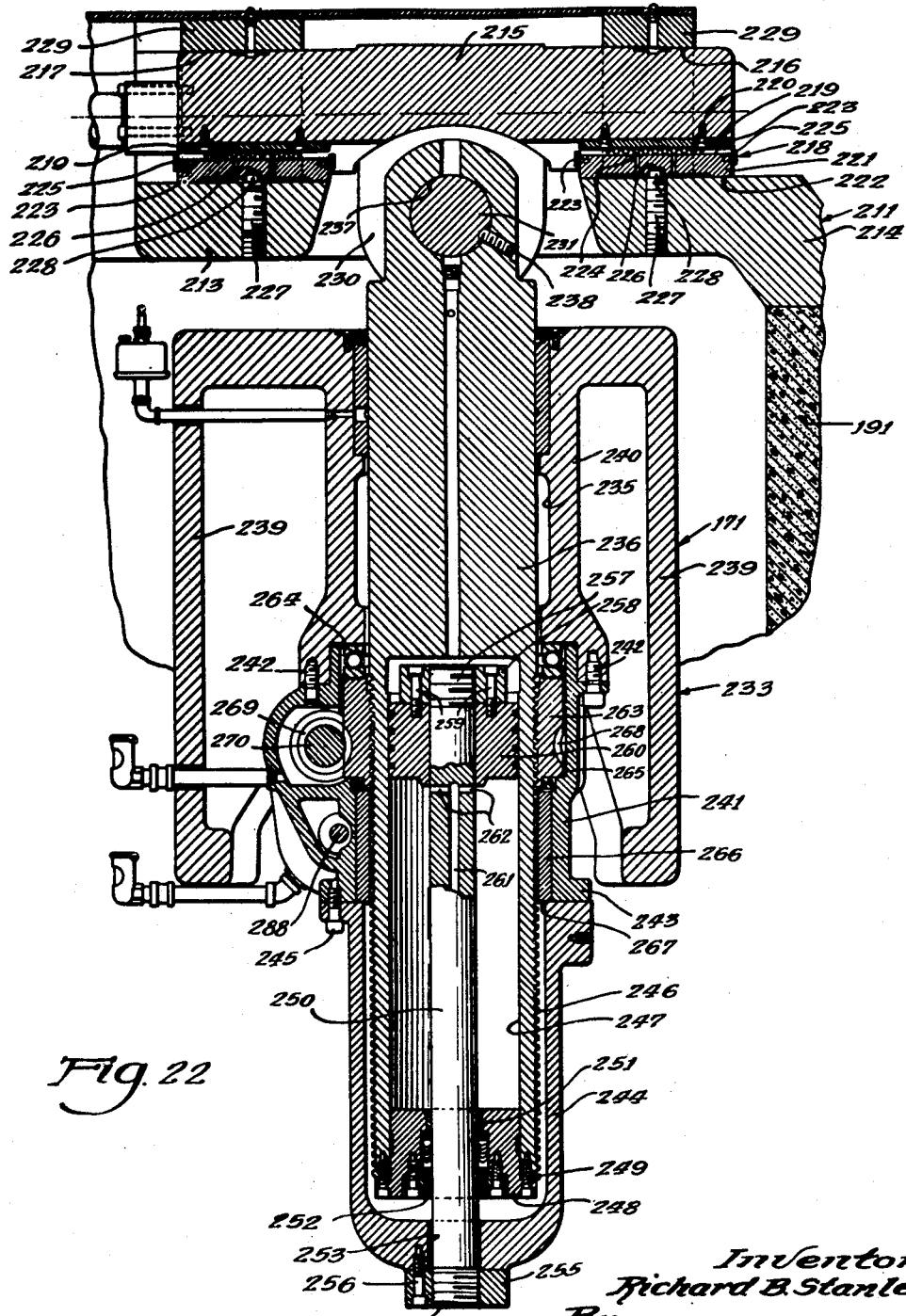
Fig. 22 is an enlarged, fragmentary, vertical, sectional view taken through the truing machine and pit, the view being taken along the line 22—22 of Fig. 13.

Referring now to Figs. 12, 13 and 22 the shaft 215 in the region between its ends is provided with outwardly and downwardly extending arms to form an integral yoke 230 in the arms of which is journalled a shaft 231. This shaft 231 can rotate in the yoke 230 about the longitudinal axis of the shaft.

Referring now to Fig. 13 the truing machine generally indicated at 171 comprises a C-frame generally indicated at 232 that includes a horizontally disposed frame 233 with upwardly extending arms generally indicated at 234 at each end of the horizontal frame 233. This horizontal frame 233 as best shown in Figs. 13 and 22 is vertically apertured at 235 midway between the ends of the horizontal frame to receive a vertical shaft 236 that serves to suspend the machine from the stationary center support generally indicated at 211 in Fig. 12. The upper end of this shaft 236 is apertured as at 237 to receive the shaft 231 and the vertical shaft 236 is fixed to the horizontal shaft 231 by means of a machine screw 238 that enters a suitable slot in the shaft 231. Thus the vertical shaft 236 is suspended from the horizontal shaft 231 and is adapted to swing as a pendulum from this shaft when the latter rotates in the yoke 230.

The horizontal frame 233 of the truing machine 171 comprises outer walls 239 and an inner wall 240 (Fig. 22). The inner wall 240 is provided with the vertical aperture 235. Secured to the bottom of the inner wall 240 over the lower end of the aperture 235 is a cylindrical housing 241 that is secured to the inner wall 240 by means of screws 242. This cylindrical housing 241 is flanged at 243. Mounted against the lower face of this flange 243 is an elongated cap-like housing 244 that is secured as at 245 to the cylindrical housing 241.

The shaft 236 throughout the lower half of its length is externally threaded as at 246. This portion of the shaft is also bored out to provide a cylindrical chamber 247 therein, the lower open end of the chamber 247 being closed by a cap or plug 248 that is screwed in place by means of screws 249. A shaft or piston rod 250 projects through an aperture 251 in the cap or plug 248 and suitable gasket means indicated at 252 is exerted between the piston rod 250 and the walls of the aperture 251 so as to provide a seal around the rod. The lower end of the rod 250 passes through an aperture 253 in the lower end of the elongated cap 244 and is threaded as at 254 into an internally threaded block 255 that is screwed as at 256 to the cap 244. The upper end of the rod 250 is threaded as at 257 into a block 258. To this block 258 is secured by means of screws 259 a piston 260 that is mounted concentrically about the piston rod 250. The piston rod 250 is provided with a passage 261 that extends from its lowermost end in a longitudinal direction through the rod 250 to radial passages 262 that are disposed adjacent to the lowermost edge of the piston 260. The lower open end of the rod 250 is connected to a source (not shown) of hydraulic fluid under pressure.

Mounted concentrically about the vertical shaft 236 is an internally threaded ring gear 263 that is mounted between an annular ball bearing assembly 264 that engages the lower face of the inner wall 240 of horizontal frame 233 and a shoulder 265 that is provided on the inner wall of cylindrical housing member 241. This ring gear 263 is adapted to rotate and its internal teeth mesh with the external worm teeth 246 on the vertical shaft 236. A cylindrical bronze bearing 266 is mounted concentrically about the vertical shaft 236 and is disposed between the lower face of the ring gear 263 and a shoulder 267 that is provided by the upper end of the elongated cap member 244.

The ring gear 263 is provided with annularly disposed gear teeth 268 to mesh with a worm gear 269 that is mounted on a horizontal shaft 270. Referring now to Figs. 22 and 24, this shaft 270 is journalled in the housing 241 in spaced ball bearing assemblies 271 and 272. The shaft 270 is threaded at one end to receive a nut 273 and at the other end projects through the wall of the housing 241 to a position outside the housing. The housing 241 at this last mentioned side is provided with a chamber 274 that is closed by a cover plate 275, screwed to the housing as at 276. Mounted in the chamber 276 and concentrically about the shaft 270 is a gear 277 that is provided with gear teeth 278. This gear 277 has a bushing-like portion 279 that projects through an aperture 280 in the cover plate 275 to a position outside the housing 241. Also mounted concentrically about the projecting end of the shaft 270 is a clutch member 281 that is slidably keyed as at 282 to the shaft and is adapted to slide in a longitudinal direction along the shaft 270. A collar 283 is mounted concentrically on the projecting portion of the shaft 270 and is fixed to the shaft by means of a machine screw 284. Between the collar 283 and the slidable clutch member 281 is a compression spring 285 that constantly urges the slidable clutch member 281 against the adjacent end of the gear 277. The abutting faces of the slidable clutch member 281 and the gear 277 are provided with complementary clutch locking members 281a (see Fig. 28). The gear 277 is rotatably mounted on the shaft 270, there being a roller bearing assembly 286 interposed between the shaft and the gear. When the slidable clutch member 281 is moved in a direction to the left as viewed in Fig. 24 against the force of spring 285, the complementary clutch locking members 281a shown in Fig. 28 become disengaged so that the gear 277 is free to rotate about the shaft 270 while the shaft itself remains stationary. When the sliding clutch member 281 is in its engaged position shown in Fig. 24, rotation of the gear 277 is transmitted through the sliding clutch member 281 and pin 282 to the shaft 270 so as to rotate the shaft. The spring 285 normally holds the slidable clutch member 281 in its clutch engaging position illustrated in Fig. 24. The actuation of sliding clutch member 281 will be described hereinafter.

Referring now to Fig. 30, the gear 277 mounted on the shaft 270 meshes with a gear 287 that is mounted on a shaft 288 that is parallel to shaft 270. The shaft 288 (see Figs. 13 and 25) passes horizontally through the housing member 241 at a position below the shaft 270 and is journalled in this housing 241 by means of journal bearings 289 and 290 (Fig. 25). Between the gear 287 and the shaft 288 is interposed a roller bearing assembly 291 that provides for free rotation of the gear 287 about the shaft 288. This gear 287 also projects through the cover plate 275 and against its projecting end is a slidable clutch member 292 mounted concentrically about the shaft 288 and slidably keyed to the shaft by means of a key 293. This sliding clutch member 292 abuts against the end of the gear 287 and as was the case with slidable clutch member 281 and gear 287 shown in Fig. 24, the sliding clutch member 292 and gear 287 (Fig. 25) are similarly provided with complementary clutch locking members best illustrated in broken lines 292a in Fig. 28. A collar 294 is fixed to the shaft 288 in spaced relationship with respect to the sliding clutch member 292 and a compression spring 295 is interposed between the collar and the sliding clutch member 292. This sliding clutch member 292 operates in exactly the same manner as previously described with respect to the sliding clutch member 281 in Fig. 24. Thus the gear 287 is either free to rotate on the shaft 288, or depending upon the position of the sliding clutch member 292, is keyed to the shaft through the sliding clutch member so as to impart rotary motion to the shaft 288.

Again referring to Fig. 25 a hydraulic motor 296 is mounted on the housing 241 and this motor is provided with a motor driven shaft 297 that projects into the chamber 274 in the housing. Keyed as at 298 to the shaft 297 is a gear 299 having teeth 300 meshing with the teeth of gear 287. Suitable fluid ports 301 are provided to supply the motor 296 with the necessary actuating hydraulic fluid. Thus the power for driving both shafts 288 and 270 is derived from the hydraulic or fluid motor 296.

A device for actuating the slidable clutch members 281 and 292 is best illustrated in Fig. 28. There are two such clutch actuating members illustrated, one at 302 and the other at 303 but since they are both identical, the details of one only are shown. Mounted above the shaft 270 is the clutch actuator 302 that comprises generally an electromagnetic solenoid 304 that is adapted to be energized through electric wires 305 from a source of electric current (not shown). This solenoid 304 is doughnut-like in shape and a plunger 306 is adapted to move back and forth through the solenoid. This plunger 306 is provided with a suitable laminated core 307 adjacent to one end thereof that is held together by rivets 308. Projecting beyond the other end of the laminated core 307 is an arm 309 to the free end of which is secured a plunger head 310.

Mounted below the solenoid assembly is a shaft 311 that is fixed to the machine frame generally indicated at 171 in Fig. 28. Slidably mounted on this shaft 311 is a sleeve 312 that is provided at its outer end with an upstanding abutment 313 that is normally spaced from the plunger head 310 but is disposed in the path of the plunger head when the plunger 306 is pulled into the solenoid 304. When the plunger head 310 engages the upstanding abutment 313 further movement of the plunger 306 into the solenoid 304 slides the sleeve 312 in a direction from right to left as viewed in Fig. 28 on the shaft 311. A connecting lug 314 is secured to the sleeve 312 and projects downwardly into an annular groove 315 that is formed about the periphery of the sliding clutch member 281. Thus as the sleeve 312 is moved to the left along shaft 311 the sliding clutch member 281 is likewise moved to the left to disengage the complementary clutch locking portions 281a. This is all accomplished when the solenoid 304 is energized. When the solenoid 304 is again deenergized compression spring 285 returns the sliding clutch member 281 to its clutch locking position illustrated in Fig. 28 and carries with it the sleeve 312. This return movement also forces the plunger 306 back through the solenoid 304 where the greater part of the laminated core 307 again assumes its position outside the solenoid. Suitable spring means may also be provided to normally hold the plunger 306 in the position illustrated in Fig. 28.

Thus as the hydraulic motor 296 is operated, either or both of the shafts 270 and 288 may be rotated depending upon the position of the clutch members 281 and 292 actuated by their respective clutch actuating devices 302 and 303.

As best shown in Figs. 13 and 25 the shaft 288 is made up of a plurality of shaft segments coupled together by universal joints 316. This shaft extends in both directions from the center of the horizontal frame 233 of the truing machine out toward the upstanding arms 234 disposed at both ends of the horizontal frame 233.

Each of the upstanding arms 234 comprises a vertically cylindrical housing 317 best shown in Fig. 21 that is open at the top and at the bottom. The bottom of the housing 317 is closed by a gear case member 318 that is screwed to the housing 317 as at 319. Journalled in the gear case 318 in roller bearings 320 and 321 is an upstanding shaft 322 that projects upwardly in the housing 317 and is threaded as at 323 through the major portion of its length. On the lower end of the shaft 322 is keyed as at 324 a gear 325. This gear 325 is held onto the shaft 322 by means of a nut 326 that is threaded onto the end of the shaft.

As best shown in Figs. 13 and 21 the horizontal shaft 288 projects through the wall and into the gear box 318 that is located at the bottom of each of the vertical arms 234 of the truing machine and is journalled in the wall in some suitable manner. Mounted on the end of this shaft is a worm gear 327 that meshes with the gear 325.

Again referring to Fig. 21 a cylindrical sleeve 328 is telescoped inside the housing 317 and is free to slide vertically in this housing. Mounted on top of the sleeve 328 is a center housing member generally indicated at 329 that is screwed as at 330 to the sleeve 328 that includes a horizontally disposed cylinder generally indicated at 331 in Fig. 14 and an offset housing portion 332 (Figs. 14, 15 and 21). This offset housing portion 332 is hollow and is provided with a bottom wall 333 apertured at 334 to receive a thimble-like sleeve 335. This thimble-like sleeve 335 is flanged at the top as at 336 and is screwed at 337 to the wall 333 of the housing 332. The bottom wall 338 of the thimble-like sleeve 335 is apertured at 339 to receive the threaded portion 323 of the shaft 322. This shaft 322 projects entirely through the thimble-like sleeve 335 and into the interior of the housing 332. The top of the housing 332 is apertured as at 340 and a bushing 341 passes through this aperture and is screwed in place at 342. The bushing 341 is apertured to receive the upper end of a sleeve 343 that projects downwardly through the housing 332 and into the thimble-like sleeve 335. This sleeve 343 terminates at its lower end at a position above the bottom wall 338 of the thimble-like sleeve 335 and a pair of internally threaded nuts 344 and 345. These nuts 344 and 345 are threaded onto the threaded portion 323 of shaft 322. The lower end of sleeve 343 and the two nuts 344 and 345 are all keyed together by means of a key 346. The upper end of the aperture through the bushing 341 is threaded to receive a threaded plug 347 and a lock nut 348 locks this plug 347 in place.

The sleeve 343 is adapted to rotate in the bushing 341 and in the thimble-like sleeve 335 and carry with it the two nuts 344 and 345 by virtue of the fact that these two members are keyed together at 346. This rotation of sleeve 343 is effected by means of a hand crank (not shown) that is mounted on a shaft 349, the rotation of this shaft being transmitted to the sleeve 343 by means of a worm gear 350 that meshes with a gear 351 that is keyed as at 352 to the sleeve 343. This hand crank is provided for the purpose of making fine adjustment of the height of the center cylinder housing member 329. Normal adjustment of the height of the center housing member 329 is effected through rotation of shaft 288 (see Figs. 13 and 21) which in turn rotates shaft 322 (Fig. 21) through the worm and gear 327 and 325. This rotation of shaft 322 causes nuts 344 and 345 to move up or down along the threaded shaft 323, thereby moving the sleeve 343 up or down. This vertical movement of sleeve 343 imparts similar movement to the cylindrical sleeve 328 in the housing 317. As best shown in Fig. 21 an outwardly projecting housing portion 353 is disposed on one side of the housing 317 and a platform 354 is provided on the top of this projecting housing portion 353. Mounted on this platform 354 and secured thereto by screws 355 is an upstanding pin assembly generally indicated at 356 that includes a base 357 and an upstanding pin 358. The center housing member 329 is provided with a laterally extending projection 359 that is apertured at 360 to receive a cylindrical sleeve 361 in which is slidably mounted the pin 358. Thus as the center housing member 359 is moved up and down in the housing 317 it is guided and reinforced in its movement by the pin support 358.

Referring now to Figs. 13, 14 and 26, the center housing member 329 just described with respect to the showing in Fig. 21 includes the horizontally disposed cylinder 331. This cylinder 331 comprises a forward cylinder portion 362 and a rear cylinder portion 363 that are joined together in some suitable manner at 364. The forward cylinder portion 362 is open at both ends and has the same internal diameter throughout its length. The rear cylinder portion 363 is bell shape so as to be closed at one end, except for an axially disposed apertured 365. Slidably mounted in the cylinder 331 is a center supporting arbor 366 that is provided with an inwardly tapering aperture 367 at its forward end to receive the shank 368 of a center unit 369. The centering projection 370 of the center 369 is offset from the longitudinal line of the center member 369 so that the center can engage the center of a car axle (see Fig. 13) indicated in broken lines at 371 while projecting through the journal box 372 of the car.

The opposite end of the slidable center arbor 366 is provided with an open cylinder indicated at 373 that is closed by means of a bushing 374 and cap 375 screwed to the bushing at 376. This cap 375 is apertured as is the bushing 374 to receive a hollow shaft 377 that projects through the aperture 365 in the rear cylinder member 363 and is threaded on its free end at 378 to receive a nut 379. A suitable gasket 380 surrounds the shaft 377 and is disposed between the shaft and the sleeve 374 and the cap 375. Mounted on the other end of the shaft 377 is a piston 381 that is held in place between a shoulder 382 on the shaft 377 and a nut 383 that is threaded onto the end of the shaft. The shaft 377 is rigidly held in place against a shoulder 384 that is provided in the rear cylinder portion 363.

The shaft 377 is hollow throughout its length and extending throughout the length of this hollow shaft 377 is a tube 385. The tube 385 opens out at one end at the face of the piston 381 and is surrounded by a gasket ring 387 that is interposed between the wall of the tube 385 and the inner wall of the hollow shaft 377. A similar gasket ring 388 surrounds the tube 385 at its other end and is interposed between the two and the inner wall of the hollow shaft 377. The diameter of tube 385 is less than the inside diameter of the shaft 377 so as to leave therebetween an annular chamber 389. An inlet tube 390 communicates with this annular passage 389 and supplies hydraulic fluid from a source (not shown). Radial ports 391 are also provided in the wall of shaft 377 providing communication to the annular chamber 389. These radial ports 391 discharge into the interior of cylinder 373 on the rear side of the piston 381. The tube 385 is hollow throughout its length to provide a passage 392 therethrough that connects with the interior of the cylinder 373 on the forward side of the piston 381. The tube 385 is connected to a source of hydraulic fluid (not shown).

As best shown in Figs. 26 and 27, the outer face of the arbor 366 is longitudinally grooved or slotted as at 393 for a portion of its length on the diametrically opposite sides of the arbor and the remainder of the circumference of the arbor 366 throughout the length of the grooved portion is provided with threads 394.

A lock nut 395 surrounds the arbor 366 and throughout most of its circumference has an inner diameter greater than the outside diameter of the threads 394 on the arbor 366. Inwardly projecting toothed or thread segments 396 are disposed on diametrically opposite sides of the nut 394, the width of these teeth being slightly less than the width of the longitudinal grooves 393 in the arbor 366 and being disposed in a corresponding position as shown in Fig. 27 so that when the nut 395 is arranged as shown in Fig. 27, the toothed segments 396 project into the slots 393 and are entirely free of the threads 394 on the arbor. The arbor 366 is then free to slide back and forth in a longitudinal direction in the cylinder 331, this sliding movement being guided by a guide member 397 that projects into one of the longitudinal slots 393 and prevents rotation of the arbor 366 in the cylinder 331. When the position of the arbor 366 has been properly selected the nut 395 is rotated by means of force exerted on arms 398 (Fig. 27) so as to move the toothed segments 396 of the nut 395 into the threads 394 of the arbor 366.

Thus there is provided an effective breach lock for locking the arbor 366 in place.

When hydraulic fluid is introduced through tube 390 into annular chamber 389 and hence into the cylinder 373 on the rear side of piston 381, the arbor 366 is moved to the left as viewed in Fig. 26 so as to draw the arbor 366 into the cylinder 331. When hydraulic fluid is introduced through tube 385 into the cylinder 373 on the front side of the piston 381 the force is exerted in the opposite direction on the arbor 366 so as to move the arbor to the right as viewed in Fig. 26 so as to project the arbor outwardly from the cylinder 331. Suitable gaskets are provided where necessary to properly seal the cylinders and the piston.

Referring now to Figs. 15, 21 and 23, the outwardly projecting housing portion 353 on the cylindrical housing 317 also provides a horizontally disposed cylinder 399 that is disposed directly below and parallel to the cylinder 331. This cylinder is flanged at one end as shown at 400 and a cover member 401 is secured against this flange 400 so as to form therein a chamber 402.

Mounted in the cylinder 399 is a rotatable spindle 403 that operates in roller bearing units 404 and 405 at the opposite ends thereof. The forward end of the spindle 403 is apertured so as to provide a chamber 406 that flares outwardly at 407 and disposed in this flared portion 407 of the chamber 406 is an arbor 408 about which is concentrically mounted a bushing 409 whose outer face is complementally flared to properly engage the flared portion 407 of chamber 406. This bushing 409 is annularly flanged at 410 and is screwed as at 411 to the end of the spindle 403. The other end of the spindle 403 projects into the chamber 402 provided in the cover member 401 and lock nuts 412 are threaded onto the projecting portion of spindle 403 and cooperate with a sleeve 413 surrounding the spindle 403 to take up end play of the spindle. A washer-like closure plate 414 surrounds the sleeve 413 and is screwed to the cylinder 399 at 415. The opposite end of the spindle 403 is threaded to receive a nut 416 that complements the action of lock nuts 412 in preventing end play of the spindle 403. A suitable cover plate 417 screwed at 418 to the front end of the cylinder 399 closes the cylinder.

The spindle 403 is apertured at 419 through the remainder of its length from the chamber 406 to the rear end of the spindle and a draw bar 420 passes through this aperture 419 and through the chamber 406 to the arbor 408. This draw bar is threaded at 421 on its free end and is adapted to be secured in a correspondingly threaded bore in the end of the arbor 408. The opposite end of the draw bar 420 projects through a plate 422 that closes an aperture 423 in the vertical wall of cover member 401, and on the free end of draw bar 420 is a nut 420a. This plate 422 is secured in place by screws 423.

Keyed to the shaft at 425 and mounted in the chamber 402 is a gear 426 and a plate 427 screwed to the shaft and the gear at 428 and 429 respectively, holds this gear on the shaft. Below the gear 426 is a shaft 430 that is journalled as at 431 in the cover 401 and this shaft projects into the chamber 402 and has disposed thereon a gear 432. The innermost end of the shaft 430 is journalled on a ball bearing unit 433. The shaft 430 projects outside the chamber 402 through a removable cover plate 434 and its free end is provided with a pulley wheel 435. As best shown in Figs. 13, 14 and 15 this pulley wheel 435 is belt driven by means of a belt 436 from a suitable electric motor or the like 437.

Between the gear 426 and gear 432 (Fig. 23) there is disposed an idler gear assembly 438 that comprises a pair of spaced circular wall members 439 and 440 that are rotatably mounted in the cover member 401. A pair of fixed shafts 441 and 442 are disposed in spaced parallel relationship between the circular wall members 439 and 440 and are fixed to these walls to serve as spacers for holding the walls in their proper relationships. These shafts 441 and 442 also serve as axles upon which are mounted idler gears 443 and 444 that are mounted on roller bearing units as shown. These two idler gears 443 and 444 have teeth that mesh as illustrated in Fig. 23 and concentrically mounted about the gear 444 and keyed thereto as at 445 is a gear 446. A shaft 447 fixed to the wall 440 projects outwardly through an aperture in the flange 400 and its free end is provided with an arm or manipulating handle 448. Thus by rotating the shaft 447 by manipulation of handle 448 the idler gear assembly 438 is rotated so as to change the positions of gears 443 and 446 with respect to gears 432 and 426. In other words, as shown in Fig. 23 gear 426 is driven from pulley wheel 435 through gears 432 and idler gears 443, 444 and 446. To change the relationship or speed of the drive the idler gear assembly 438 is rotated as previously mentioned so that idler gear 446 engages the gear 432 and idler gear 443 engages gear 426 so as to change the speed relationship through the idler gear assembly 438. Thus the spindle 403 is rotated to rotate arbor 408.

Mounted on the end of arbor 408 is a cutter tool shaft 449 that is supported on its outer end on a bearing indicated at 450. This bearing 450 is provided with a base 451 that is secured by screws 452 onto a platform 453 formed by the machine frame. Mounted on the cutter tool shaft 449 is a cutter tool more or less diagrammatically indicated at 454.

Figure 31:
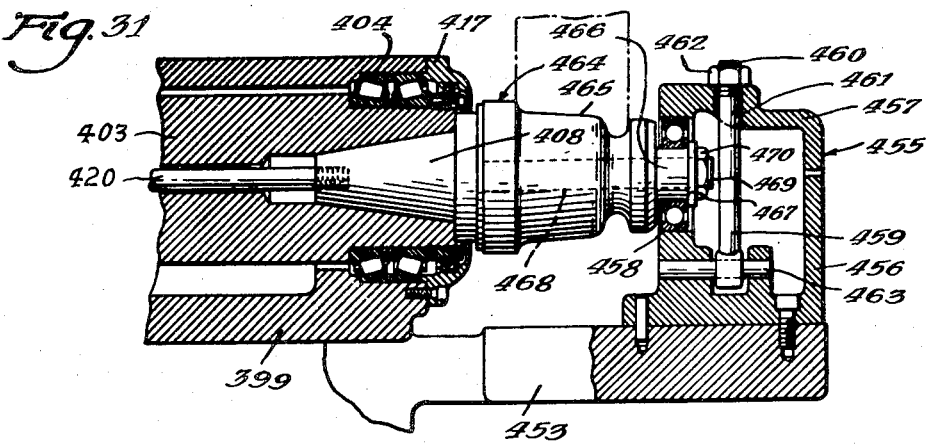
Fig. 31 is a fragmentary, vertical, sectional view corresponding to Fig. 23 but illustrating a modified bearing arrangement for the cutter tool.
Figure 32:
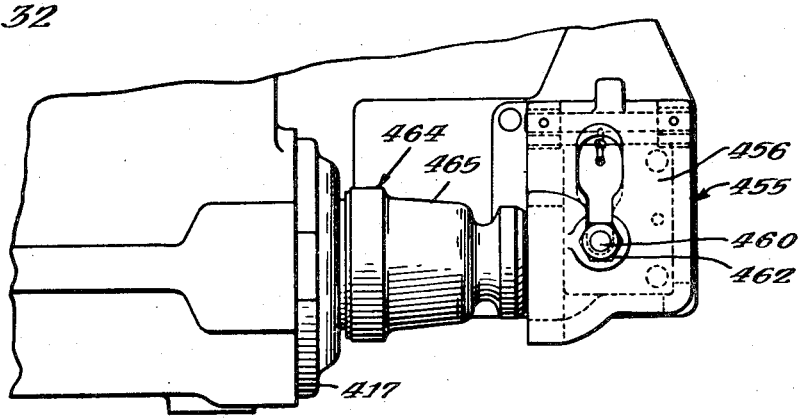
Fig. 32 is a plan view of the bearing arrangement illustrated in Fig. 31.
Figure 33:
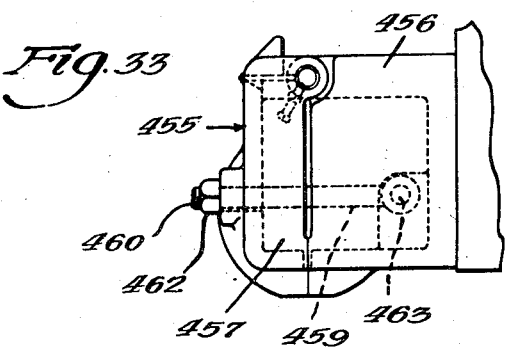
Fig. 33 is an end elevational view of the device illustrated in Fig. 32.

Referring now to Figs. 31 to 33 inclusive, a modified form of the arbor 408 and bearing 450 is shown wherein the outboard bearing indicated at 455 for the free end of the cutter tool shaft is shown. This outboard bearing comprises a box housing 456 having a hinged or removable lid 457. Mounted on the housing 456 is a ball bearing member 458 that fits between the box housing 456 and the cover. 457 when the latter is closed. A draw-down bar 459 threaded at its upper end at 460 projects through an aperture 461 in the cover 457 and a nut 462 is threaded onto this threaded portion 460. The other end of the draw-down bar 459 is concentrically mounted about a horizontal pin or shaft 463 that is rigidly held in the frame of the box housing 456. In this instance the cutter tool assembly is generally indicated at 464 and this includes a cutter tool unit diagrammatically indicated at 465 that has extending from its forward face a boss-like projection 466. On the free end of the boss-like projection 466 is a radially extending flange 467. The ball bearing unit 458 is in the form of a ring that surrounds the boss-like projection 466 and is held between the end of the cutter tool 465 and the flange 467. This entire assembly is apertured throughout its length as indicated in broken lines 468 in Fig. 31 to fit on a shaft 469 that projects outwardly from the arbor 408. The free end of the shaft 469 is threaded to receive a nut 470.

The ball bearing unit 458 is grasped in jaw-like fashion between the wall of the box housing 456 and the cover 455, the clamping action being effected by drawing down the nut 462 on the drawn-down bar 459.

For purposes of describing the operation of this second embodiment of the present invention, let it first be assumed that sliding rails 183 shown in Fig. 12 are in their closed positions so as to form a continuous set of tracks across the pit. The car or train of cars having wheels to be trued is then brought on rails 180 from either direction, across the pit and is brought to rest with the wheels in question disposed adjacent to the supporting and rotating wheels 187, in such a manner as to allow the supporting and rotating wheels 187 to be freely raised. At this time the rotating wheels 187 are in their lowered position, so as to be entirely below the upper surface of the rails. Then the supporting and rotating wheels 187 are moved to their elevated position and the entire car is moved toward the rotating wheels 187 until the wheels to be trued contact said rotating wheels 187. Then the clamps and wheel blocks illustrated at 471 and 472, respectively, in Fig. 16 are applied to the opposite truck wheels, and the rail members 182, together with the clamps and wheel blocks 471 and 472, moved to force the wheels to be trued up onto the supporting and rotating wheels 187 so that the sliding rails 183 are free. The sliding rails 183 are then moved to their open position illustrated in Fig. 12 so as to provide an opening in the track assembly 181 on each side thereof under the car wheels in question. The truing machine 171, which during all of this time has been disposed at its lowermost position in the pit 172, is now raised and brought into operating position with respect to the car wheels in question.

Referring to Figs. 13 and 25 the hydraulic motor 296 is operated so as to rotate the shaft 288. This rotation of the shaft is accomplished when the clutch 292 shown in Fig. 25, is in its clutching or locked position illustrated in the figure. The center housing members 329 on both sides of the machine are thus raised through the mechanism illustrated and previously described in connection with Fig. 21 of the drawings and this is continued until the center projections 370 are located at the level of the centers of the car axle 371 (Fig. 13). The lids of the car journal boxes 372 are now opened, if they had not previously been opened, and then the center arbors 366 are moved out of their respective cylinders 331 until the center members 370 enter the center notches in the ends of the car axle. The breechblock described with respect to Figs. 26 and 27 is then tightened by manipulation of the arms 398 so as to lock the arbor 366 in this position.

It is now necessary to move the cutter tools 454, each of which is now disposed below its respective car wheel and directly vertically below the center of the wheel. This is accomplished by clutching or locking the clutch 281 shown in Fig. 24 into driving relationship with the shaft 270 and then operating the hydraulic motor 296 so as to rotate shaft 270 (see Fig. 24) to raise the C-frame 232 of the machine with respect to its stationary central support 211. During the time the machine is being raised the shaft 288 must likewise be operated to maintain the center members 370 in the ends of the car axle for otherwise these center members would move upwardly along with the machine C-frame. When the cutting tools 454 (or 465 in the case of the embodiment shown in Fig. 31) engage the tread of the car wheels 194 the operation of the hydraulic motor 296 is discontinued and the next operation is to adjust the depth of cut to be taken by the cutting tools.

The cutting tools 454 are next rotated by motor 437 shown in Fig. 12 and then the hydraulic motor 296 is again placed into operation, either to raise the C-frame by operation of shaft 270 (Fig. 24) or to tilt the whole machine by operation of shaft 288, the latter of which in effect pulls downwardly on the centers 370 causing the cutting tools 454 to bite into the treads and flanges of the car wheels in question. When the depth of cut has thus been adjusted the car wheels are slowly rotated by rotation of the supporting and rotating wheels 187, thereby effecting the treads and flanges of the two car wheels into the rotating cutter tools 454. After one complete revolution of the car wheels a further cut can be made if desired by again feeding the cutter tools 454 further into the treads and flanges of the car wheels, so that the truing operation can either be effected in one cut if the depth of cut is not too great, or the operation can be effected by a series of cuts.

When the operation is thus completed the machine is returned to its initial position at the bottom of the pit by reversing the sequence of operation of steps just described and the car wheels just trued can be returned to the tracks after the track members 183 are closed and the car can then move over the pit so as to bring another pair of wheels in position for truing or entirely away in case no further truing operations are required.

In order to compensate for different sizes in vehicle wheels on which the truing operation is to be performed, it is necessary to adjust the position of the machine in a longitudinal direction with respect to the track assembly 181. This requires movement of the entire machine in this longitudinal direction and this is provided by mounting the shaft 215 (see Figs. 16 and 22) on the roller bearings 224. An hydraulic cylinder 473 (see Fig. 16) is secured to one end of the shaft 215 and slidably mounted in this cylinder 473 is a plunger 474 that is fixed by means of a rod 475 to the adjacent cross frame member 213 by means of nuts 476 and 477. Since plunger 474 is stationary with respect to the cross frame member 213, the introduction of hydraulic fluid into the cylinder 473 in any well known manner, actually moves the cylinder in a longitudinal direction with respect to the track assembly 181, thereby moving with it the shaft 215 and hence the truing machine 171.

Referring now to Fig. 16 it is to be noted that the cutting tool 454 is disposed vertically below the center of the wheel 194. The supporting and rotating wheel 187 is offset from this vertical radius of the wheel 194 on one side of the radius, whereas the shaft 231 from which the truing machine 171 is suspended is disposed on the other side of the vertical radius of wheel 194. The cutting tool 454 is always able to be brought into engagement with the bottom of the vehicle wheel 194 inasmuch as this portion of the wheel is at all times accessible. Thus it is not necessary to remove equipment from the vehicle in order to make the wheels accessible for application of the truing machine. All of the weight of the machine is supported from the pin 231 shown in Fig. 16 and the centers engaging the centers of the vehicle axle merely maintain at all times the proper spaced relationship between the center of the wheels and the tools 454 so as to guarantee roundness in the finished wheels irrespective of the initial condition of the wheels prior to the completion of the truing operation.

Still another embodiment of the present invention is illustrated in Figs. 34 to 48 inclusive. Referring to Fig. 34, the truing machine 171 as before is situated in the pit 172 beneath a track assembly which this time is referred to by the reference character 478. As before this track assembly 478 extends across the pit 172 and located at both ends of the track assembly 478 are the track rails 180.

The truing machine 171 is identical with the machine bearing the same reference numeral and described in connection with an earlier embodiment of the invention but the means for mounting the machine in the present embodiment of the invention differs from that previously described. As in the previous embodiment the machine 171 is mounted at one position in the pit 172 and the railroad car 192 possessing the wheels 194 that are to be trued is rolled over the rails 180 and the track assembly 478 to the proper position with respect to the wheel truing machine 171 where the car is brought to rest with the pair of wheels 194 (see Figs. 35 and 36) disposed directly over the machine.

The track assembly 478 comprises a pair of spaced stationary rail segments 479 (see Fig. 34) and a pair of spaced movable rail segments 480. Each of the stationary rail segments 479 extends from the end of one of the track rails 180 to a position over the pit 172 and adjacent the truing machine 171. Each of the movable rail segments 480 is disposed closely adjacent to one of the stationary rail segments 479 but is adapted to move or slide from the position shown in solid lines in Fig. 34 that may be referred to as its open position, to its closed position illustrated in broken lines at 480a where it spans the space across the pit 172.

Mounted between the spaced pairs of fixed and movable rail segments 479 and 480 respectively, is a structure 481 that as shown in Figs. 34, 35 and 42 is provided with an outwardly extending rail supporting member 482 on each side thereof that is disposed directly underneath each of the sliding rails 480. Each sliding rail 480 when in its retracted or open position shown in Fig. 36 is supported throughout its length on this rail supporting member 482. The sliding rail 480 as best shown in Fig. 35 is provided with an offset or ledge portion 480b which as shown in Fig. 36, extends throughout the length of the sliding rail. Fastened down on this ledge portion 480b to each of the sliding rails 480 is a hold-down block 483 that is screwed as at 484 (Figs. 34 and 42) into the rail supporting member 482.

Projecting downwardly from the forward end of the sliding rail 480 is a lug 485 to which is attached one end of a plunger 486 operating in an hydraulic cylinder 487. The rail supporting member 482 is apertured at 488 to receive the hydraulic cylinder 487, the latter being secured as at 489 on its innermost end to the walls of the aperture 488. By suitable passages (not shown) hydraulic fluid from a source (not shown) is introduced into the cylinder 487 to force the piston 486 outwardly from the position shown in Fig. 36 to move the sliding rail 480 in a direction corresponding from right to left in Fig. 36 until this rail spans the opening across the top of the pit 172. A ledge 490 is provided to receive and support the free end of the sliding rail 480 when the latter is disposed in its spanning position shown in Fig. 38. To retract the sliding rail 480 hydraulic fluid is introduced at the opposite end of the hydraulic cylinder 487, causing the piston 486 to be again drawn into the cylinder 487. There are two hydraulic cylinders 487, one being provided for each of the sliding rails 480.

The frame 481 is also provided with a pair of forwardly projecting stationary arms or cradle members 491 in which is rotatably supported a movable cradle member or frame 492 (see Figs. 34 and 37 to 40 inclusive). Between this movable cradle frame 492 and the stationary cradle arms 491 is a Babbitt liner 493 or other type of liner providing a good bearing surface. Suspended from the movable cradle member or frame 492 is the truing machine 171. This suspension is effected by the provision of spaced ears 494 (Figs. 40 and 41), between which is mounted a bifurcated member 495 that is pivotally mounted on a shaft 496 journalled in the ears 494. This bifurcated member 495 in turn is provided with a shaft 497 fixed at its opposite ends in jaws 498 of the bifurcated member 495 and the upper end of the vertical shaft 236 of the truing machine 171 is suspended from this shaft 497. As indicated in Fig. 41 the shaft 497 is disposed at right angles to the shaft 496 so that the suspension of the machine 171 provides substantial universal motion due to the pivot action of the bifurcated member 495 about its shaft 496 and of the machine 171 about shaft 497.

Referring now to Fig. 40 the movable cradle frame 492 forms a housing that encloses and supports a supporting and rotating mechanism that includes a rotatable shaft 499 journalled in bearings 500 adjacent to its opposite ends. Mounted on each end of the shaft 499 is a supporting and rotating wheel 501 that serves the same function as the previously mentioned supporting and rotating wheel 187 described in an earlier embodiment of the invention. The shaft 499 is made up of a central shaft segment 502 that is mounted in a central bearing 503 and is threaded at its opposite ends as at 504. Threaded onto each of the threaded ends 504 is an outer shaft portion 505 that is apertured at 506, this aperture being threaded to fit onto the adjacent end 504 of the central shaft portion 502. The supporting and rotating wheel 501 is fixed to the outer end of the outer shaft segment 505. Mounted on the outer shaft segment 505 of the shaft 499 is a gear 507 that is keyed at 508 to the shaft.

Disposed adjacent to and parallel to the shaft 499 is a shaft 509 that is likewise suitably journalled as at 510 in the movable cradle frame 492. This shaft 509 is connected through suitable gear reduction mechanism generally indicated at 511 at each of its ends to a parallel shaft 512. Each of these shafts 512 in turn has keyed thereon a gear 513 that is disposed in meshing relationship with the adjacent gear 507. Mounted on the shaft 509 and keyed thereto as at 514 (see Fig. 41) is a worm gear 515 that is disposed in meshing relationship with a worm 516, the latter of which is mounted on a shaft 517 that is journalled at its opposite ends as at 518 in the cradle frame 492. The shaft 517 projects through the wall of the cradle frame 492 and has mounted on its projecting end a pulley 519. This pulley 519 in turn is belt driven by means of a belt 520 that operates around pulley 521 that is disposed on a shaft 522 of a motor 523. This motor 523 is suitably mounted on platforms 524. The motor is shown in place in Fig. 41 but has been removed in Fig. 40 so as to expose the platforms 524 and other mechanisms to be described hereinafter.

Again referring to Figs. 40 and 41 the shaft segment 502 has mounted thereon a wheel 525 keyed as at 526 to the shaft segment and disposed in the periphery of this wheel 525 is a lined socket 527. As shown in Fig. 41 a plunger device generally indicated at 528 is mounted in the movable cradle frame 492 adjacent to the wheel 525. This plunger device 528 includes a solenoid housing 529 that is provided with a suitable electromagnetic solenoid (not shown) and extending inwardly from this solenoid housing 529 is a sleeve or passage member 531 that has operating therein a movable plunger 532. The free end of the plunger 532 is tapered as at 532a to enter the socket 527. The electromagnetic solenoid in the solenoid housing 529 can be alternatively energized and deenergized so as to move the plunger 532 in or out of the socket 527 of wheel 525 when the socket 527 is in proper alignment with the plunger 532. Thus shaft 502 can be locked and thus prevented from rotating.

In response to the operation of the motor 523 the shaft 512 shown in Fig. 40 is caused to rotate, carrying with it gear 513. This in turn rotates gear 507 and consequently the adjacent outer shaft section 505. If the wheel 525 is free to rotate by virtue of the fact that the plunger 532 shown in Fig. 41 is in its withdrawn position out of the socket 527, then the central shaft portion 502 is also rotated along with the outer shaft sections 505. It is to be understood that there are two gears 513 meshing with two gears 507, these gears 507 in turn being mounted on each of the two outer shaft sections 505 that support one of the two supporting and rotating wheels 501.

Under certain circumstances it may be desirable to move the supporting and rotating wheels 501 inwardly or outwardly in a linear direction with respect to shaft 502 and this can be done by simply locking the wheel 525 by insertion of socket 532 (see Fig. 41) in socket 527 and then upon continued rotation of gear 513 (see Fig. 40) from the motor 523, the outer shaft sections 505 are threaded in one direction or the other on the threaded portions 504 of the central shaft 502. During this movement of the outer shaft portions or sections 505 the gear 507 moves transversely along the gears 503, the latter being wider in dimension than gear 507 to permit this transverse or lateral movement of gear 507. One of the shaft ends 504 of the central shaft segment 502 is provided with a right hand thread, whereas the other threaded portion 504 is provided with a left hand thread so that when the motor 523 operates in one direction and the wheel 525 is held in fixed position, the supporting and rotating wheels 501 are moved toward each other so as in effect to shorten the length of the shaft 499. When the motor 523 is operated in the reverse direction the supporting and rotating wheels 501 move away from each other so as in effect to lengthen the shaft 499. The reason for this adjustment of the supporting and rotating wheels 501 will be described hereinafter.

As best shown in Figs. 36, 37 and 41, a pair of spaced ears 533 projects outwardly from the movable cradle member 492. On the ends of these ears 533 are the platforms 524 upon which the motor 523 is mounted. Pivotally attached as at 534 to these ears 533 is one end of a piston 535. This piston 535 in turn (see Figs. 36 and 37) operates in a cylinder 536 of an hydraulic mechanism, the lower end of which cylinder 536 is pivotally attached as at 537 onto a stationary or anchoring bracket 538. By operation of an hydraulic fluid in a manner not shown, the piston 535 can be raised or lowered in the cylinder 536 so as to raise or lower the ear 533 to rotate or rock the movable cradle member 492 on the stationary cradle arms 491. The rocking movement of the movable cradle member 492 carries with it the shaft 499 and the bifurcated member 495 that supports the truing machine 171.

As is best shown in Figs. 36 to 39 inclusive, the truing machine 171 is suspended from one side of the movable cradle member 492 so that the weight of the machine tends to rotate the cradle member 492 in a counterclockwise direction as viewed in Fig. 38. In order to counterbalance this weight, a pull-down force is applied by the piston 535 operating in the cylinder 536, thereby exerting a force on the movable cradle member 492 tending to rotate the latter in a clockwise direction as viewed in Fig. 38. At the outset let it be assumed that the piston 535 has rotated the movable cradle member 492 to the position shown in Fig. 38 where the supporting and rotating wheels 501 are disposed out of the way of a vehicle wheel 194 upon which the truing operation is to be performed. Let it also be assumed that the supporting and rotating wheels 501 have been pulled toward each other as explained in connection with Fig. 40 of the drawings so that when a railway car or like vehicle is brought over the pit 172, each of the supporting and rotating wheels 501 is disposed to one side of the adjacent car wheel 194 as shown in Fig. 48. At this time let it also be assumed that the sliding track rails 480 are in their closed or spanning condition shown in Fig. 48 so that the car or train of cars can be rolled over the pit 172 and brought to rest with the specific wheels illustrated at 194 in Fig. 38, in proper position with respect to the truing machine 171 and the supporting and rotating wheels 501. At this time it must also be assumed that the truing machine 171 has its centers 369 disposed in their retracted position and the entire machine is located in its lowered position out of the way in the pit 172. As soon as the train of cars or the like has assumed the proper position the wheel blocks 472 previously described are placed against the wheels at the opposite end of the truck as shown in Fig. 36, and the hold-down clamps 471 are applied. The cylinder 536 is next brought into operation on introducing therein a suitable hydraulic fluid so as to move the piston 535 in an upward direction as viewed in Fig. 38, thereby rotating the movable cradle member 492 in a clockwise direction to bring the supporting and rotating wheels 501 into engagement with the vehicle wheels 194. This general upward movement of the supporting and rotating wheels 501 is continued until the vehicle wheels 194 are raised slightly off the sliding rails 480. As shown in Fig. 39 the sliding rails 480 are then retracted to the position shown in Fig. 36. The truing machine 171 can now be brought into proper position with respect to the vehicle wheels 194 in the manner previously described in connection with the earlier embodiment of the invention and the truing operation can be performed.

In the present embodiment of the invention it will be noted particularly with respect to Figs. 40 and 43 to 46 inclusive, that the supporting and rotating wheels 501 are each provided with a relatively smooth peripheral portion 501a and a knurled peripheral portion 501b. In Fig. 44 the vehicle wheel 194 is shown supported and riding on the knurled portion 501b of the supporting and rotating wheel 501, whereas in Fig. 46 the vehicle wheel 194 is supported on the smooth portion 501a of the supporting and rotating wheel 501. The selection of these portions of the supporting and rotating wheels 501 can be effected by linear movement of the supporting and rotating wheels in the manner previously described with respect to Fig. 40 where the shaft 499 is in effect shortened or lengthened. When the vehicle wheel 194 is supported on the knurled portion 501b of the supporting and rotating wheel 501, a relatively great amount of traction force is provided because of the roughness of the supporting and rotating wheel and the fact that the knurling is actually imprinted into the flange portion 194a of the vehicle wheel. This imprint is illustrated at 539 in Fig. 43.

When the truing operation is to commence the vehicle wheels are supported on the knurled portions 501b of the supporting and rotating wheels 501 in order to provide the greatest amount of traction at the beginning of the cutting operation. The vehicle wheel 194 is then rotated as earlier described and the rotating cutter 454 is brought into the tread and flange portion of the vehicle wheel until the desired depth of cut is reached. This condition is illustrated in Fig. 43 and during this time the vehicle wheel 194 riding as it is on the knurled portion 501b of the supporting and rotating wheel 501 has imprinted on the periphery of its flange 194a the knurled imprint 539. The vehicle wheel 194 is rotated slowly while both the tread and the flange are being trued and at the time when the entire periphery of the vehicle wheel has been trued except for the small distance between the supporting and rotating wheels 501 and the cutter 454 (this condition is illustrated in Fig. 45), the supporting and rotating wheels 501 are moved by manipulation of the mechanism shown and described in connection with Fig. 40 until the flanges 194a are supported on the smooth portions 501a of the supporting and rotating wheels 501. During the remainder of the cutting operation the knurled portion 501b of each supporting and rotating wheel is disposed as shown in Fig. 46 out of engagement of the flange portion 194a of vehicle wheel 194 so that there is no longer any scarring of the wheel flange by the supporting and rotating wheel 501. This additional traction provided by the knurled portion 501b is not needed during the last portion of the cutting operation because of the relatively small amounts of material that is being removed.

When the cutting operation has been completed the supporting and rotating wheels 501 are moved inwardly in the manner previously described to the position illustrated in Fig. 48 and then by reversing the operations previously described the truing machine is moved out of the way, sliding rails 400 are again closed, the trued car wheels are lowered onto these rails, and the blocks and clamps are removed to permit the car to be moved away.

In the numerous embodiments illustrated thus far, the cutting operation has been performed by a milling cutter. It is recognized that equally satisfactory results can be obtained with a lathe tool type of cutter and such a device is illustrated in another embodiment of the invention shown in Figs. 49 to 54 inclusive. In this form of the invention the machine as before is in the form of a C-frame 540 having upstanding arms 541 on the upper ends of which are disposed the center assemblies 542. The structure and operation of this part of the truing machine is identical with that previously described and the machine as before is supported from a central supporting assembly 543 that can take the same form as that described in the preceding embodiment of the invention. The center assemblies 542 include centers 544, each of which may be retracted away from or moved toward the ends of the car axle, which in this instance is illustrated at 545. When the machine is properly aligned with the car axle 545 the centers 544 can be inserted into the opposite ends of the axle in the manner previously described in connection with earlier embodiments.

In the present form of the invention a lathe tool assembly generally indicated at 546 is employed instead of the milling cutter and spindle assembly previously described. As shown in Fig. 49 there are two lathe tool assemblies 546, each of which rests on the C-frame 540. Each of the lathe tool assemblies 546 comprises a base frame 547 (see Figs. 51 and 53) that has mounted on the upper end thereof a horizontally slidable feed assembly generally indicated at 548. Upper and lower track members 549 and 550 respectively, are fixed to the upper end of the frame 547 and mounted between these track members 549 and 550 is a sliding carriage 551. A horizontally disposed cylinder 552 is also mounted at the upper end of the frame 547 and this cylinder operates a plunger 553 that is secured at its free end to the horizontally movable carriage 551. Suitable inlet and outlet ports in the cylinder 552 are indicated at 554 in Fig. 52. Referring now to Fig. 53, the horizontally movable carriage 551 comprises a travelling block 555 that is adapted to travel between the tracks 549 and 550. This block 555 is bored as at 556 to form a cylinder that is closed at its opposite ends by means of caps 557 and 558. A piston 559 is mounted in the cylinder 552 and is provided with a piston rod or plunger 560 that projects through an aperture in the end cap 558. The opposite end cap 557 is apertured to provide a passage 561 to which is attached a hose 562 that is secured at its other end to a supply of hydraulic fluid (not shown).

Suitably mounted on the block 555 is a profile follower 563 that is vertically slidable between tracks indicated at 564 in Fig. 51. These tracks 564 are fixed by suitable screws 565 to the block 555. The profile follower 563 projects below the block 555 and is provided with an inwardly turned arm 566 that is apertured at 567 to receive the free end of the plunger 560. A nut 568 may be threaded onto the free end of the plunger 560. Thus as the plunger 560 is moved back and forth with the piston 559 it carries with it the profile follower 563.

Fixed to the profile follower 563 is a lathe tool chuck member 569 that is apertured at 570 to receive a lathe tool cutter 571. The depth of the cutter 571 in the chuck can be adjusted by means of a machine screw 572 that is threaded into an aperture 573 at the lower end of the chuck member 569. After adjustment the lathe tool cutter 571 may be fixed in the chuck by means of screws 574.

The frame 547 is provided with a pair of upstanding spaced frame members 575 in which is mounted a horizontally disposed shaft 576 as best shown in Fig. 51. This shaft 576 passes through apertures in the upstanding frame members 575 and projects on both sides beyond the framing members. An adjusting knob 577 is threaded onto each end of the shaft 576. The shaft 576 is slotted as at 578 in a longitudinal direction and through this slot passes a pin 579 that is fixed to one of the upstanding framing members 575. Thus the shaft 576 is prevented from turning or rotating about its longitudinal axis but is permitted to slide longitudinally within the limits of the slot 578.

Pivotally mounted on shaft 576 is a contour plate 580 that is held between spaced collars 581 that are fixed by machine screws 582 to the shaft 576. This contour plate 580 as best shown in Fig. 53 can pivot from the solid line position shown in Fig. 53 to the broken line position indicated at 580a. Behind the contour plate 580 when in its operative solid line position shown in Fig. 53 is disposed an abutment member 583 that extends upwardly from the frame 547.

Referring to Fig. 51 the contour plate 580 is provided across its top edge with a cammed or contour surface 584 and when this contour plate 580 is disposed in its solid line operative position shown in Fig. 53, the profile follower 563 is adapted to rest against this contour surface 584. By introducing an hydraulic fluid through the hose 562 shown in Fig. 53 into cylinder 556, the pressure against the piston 559 urges the plunger 560 and hence the profile follower 563 firmly against the profiled edge of the contour plate 580.

As shown in Fig. 53, the lathe tool cutter 571 is adapted to move transversely across the car wheel indicated at 585, this transverse movement being effected by the controlled flow of the hydraulic fluid into the cylinder 552. At the same time the profile follower 563 is being urged downwardly by the piston 559 so that as the lathe tool cutter 571 is moved from right to left as viewed in Fig. 51 the profile follower 563 moves from right to left along the contour surface 584. At the outset the upper end of the cutter 571 will be disposed at approximately the position shown at 571a in Fig. 51 with its left hand cutting edge indicated at A in position to cut the metal from the wheel 585. At this time the profile follower is disposed at the position indicated by broken lines 563a. As the cutter moves toward the left the follower 563 rides down the contour surface 584 carrying with it the cutter 571 to follow the contour of the wheel tread and ultimately the flange portion. When the cutter reaches the position indicated by the broken lines 571b the profile follower assumes the position indicated by broken lines 463b and at this time the opposite cutting edge indicated at B is performing the cutting operation on the flange of the wheel. The proper relationship between the contour plate 580 and the wheel to be cut can be adjusted by manipulation of the knobs 577 so as to shift the shaft 576 back and forth to the proper position. This shifting of the shaft 576 carries with it the contour profile plate 580.

The car wheel 585 is supported in exactly the same manner as previously described in earlier embodiments of the invention and is caused to rotate by the supporting and rotating wheel 501 (see Fig. 54). When truing the wheel 585 the first operation is to place the lathe tool cutters 571 in the position shown in solid lines in Fig. 51 and adjust the depth of cut by manipulation of the truing machine. At this time the cutting edge of the tool 571 being utilized is the linear edge between the end points identified by the references A and B. The ultimate depth of cut is taken about the entire periphery of the wheel flange and then the lathe tool cutter 571 is moved to the position indicated at 571a and is fed slowly from right to left as viewed in Fig. 51 while the car wheel 585 is being rotated.

The reason for removing the metal from the flange portion of the wheel at the outset during the time the tool is gradually being fed to the proper depth of cut is because the car wheel 585 is supported by means of its flange on the supporting and rotating wheel 501. No difficulties are encountered by virtue of the gradual change of radius that takes place in the car wheel 585 if the cutting operation is performed in this manner.

I claim:

1. In a device for truing wheels mounted on opposite ends of a vehicle axle, a frame having arms adapted to be disposed on opposite sides of a vehicle adjacent to the ends of an axle, a support for the frame including a joint providing substantially universal motion of the frame with respect to the axle, centering means on each arm adapted to be disposed on the center axis of the adjacent wheel, a finishing tool holder mounted on each arm, means adjusting the position of each tool holder relative to the wheel center, and means synchronizing the last mentioned adjusting means so that the spacing of both tools from their adjacent wheel center is the same.

2. In a railway car wheel truing device, a C-frame having its arms extending generally upwardly, a pair of wheels rotatably mounted on the frame and disposed adjacent to the lower ends of the arms adapted to support at least a portion of the weight of the C-frame, a wheel rotatably mounted on the frame between the arms and above the lower portion of the C-frame, said last named wheel including a joint providing substantially universal motion of the frame with respect to the car, a centering member adjacent to the free end of each arm adapted to fix the frame relative to the car wheel centers, tool supporting means, and means adjusting the position of the tool supporting means relative to the centering members.

3. A device for truing wheels of a railway car while the wheels are mounted on said car and on rails comprising means for supporting a finishing tool in cutting position with respect to each of a plurality of wheels, the distance of all tools from the centers of the wheels being at all times the same, a tool in each of said means, means rotating the tools, and means moving the car so as to rotate the wheels.

4. A device for truing wheels of a railway car while the wheels are mounted on said car and on rails comprising means for supporting a finishing tool in cutting position with respect to each of a plurality of wheels, the distance of all tools from the centers of the wheels being at all times the same, a tool in each of said means, means rotating the tools, and means moving the car so as to rotate the wheels, and means moving the machine tools supporting means linearly with the car.

5. A device for truing wheels of a railway car comprising a C-frame having upwardly extending arms, a supporting wheel disposed in the space between the arms, a supporting wheel adjacent to the lower end of each arm, a finishing tool supporting means adjacent to the upper end of each arm, and a finishing tool held by each tool supporting means.

6. A device for truing wheels of a railway car comprising a C-frame having upwardly extending arms, a supporting wheel disposed in the space between the arms, a spring loaded supporting wheel adjacent to the lower end of each arm, a finishing tool supporting means adjacent to the upper end of each arm, and a finishing tool held by each tool supporting means.

7. A device for truing wheels of a railway car comprising a C-frame having upwardly extending arms, a supporting wheel disposed in the space between the arms, a spring loaded supporting wheel adjacent to the lower end of each arm, means for positively positioning the C-frame with respect to the center of the car wheels, a finishing tool supporting means adjacent to the upper end of each arm, and a finishing tool held by each tool supporting means.

8. A device for truing wheels of a railway car comprising a C-frame having upwardly extending spaced arms, means disposed between the arms for supporting at least part of the weight of the C-frame, a finishing tool support adjacent to the upper end of each arm, a finishing tool held by each tool support, power means on said C-frame for rotating the tools, and adjustable means adjacent to the upper end of each arm for positively centering the C-frame with respect to the wheels.

9. In combination a pair of spaced rails, a pit below the rails, a central supporting member disposed parallel to and below the pair of rails, a wheel truing device disposed at least partially in the pit and including a frame comprising upwardly disposed spaced arms, a supporting wheel mounted on the frame in the area between the arms adapted to be supported on the central rail, and means adjacent to the lower ends of the arms for supporting at least a portion of the weight of the C-frame.

10. In combination a pair of spaced rails, a pit below the rails, a wheel truing device disposed at least partially in the pit, means disposed between the rails for supporting at least some of the weight of the truing device, the truing device including spaced parallel arms, and means adjacent to the end of each arm for supporting another portion of the weight of the device.

11. In combination a pair of spaced rails, a pit below the rails, a wheel truing device disposed at least partially in the pit, means disposed between the rails for supporting at least some of the weight of the truing device, said means providing lateral movement of the truing device relative to the support, the truing device including spaced parallel arms, and means adjacent to the end of each arm for supporting another portion of the weight of the device.

12. In combination a pair of spaced rails, a pit below the rails, a wheel truing device disposed at least partially in the pit, means disposed between the rails for supporting at least some of the weight of the truing device, said means providing substantially universal movement of the truing device, the truing device including spaced parallel arms, and means adjacent to the end of each arm for supporting another portion of the weight of the device.

13. In a device for truing wheels mounted on opposite ends of a vehicle axle, a frame, means on the frame for supporting a pair of finishing tools in spaced relationship on a common axis, means for adjusting the spacing of the tools with respect to the wheel centers while maintaining the tools on the common axis, and a support on the frame for supporting at least part of the weight of the device including a joint movably mounted on the frame and providing substantially universal movement of the frame with respect to a vehicle axle.

14. In a wheel truing device, a C-frame adapted to be disposed with its arms adjacent to the opposite sides of wheeled axles, means fixing the frame with respect to the centers of the wheels, means on each arm of the frame for supporting a finishing tool, and supporting means for the C-frame disposed between the arms and comprising a carriage-like member adapted to travel in a transverse direction between the arms, and a spherical-like seat providing substantially universal motion of the C-frame on the support.

15. In a device for truing wheels mounted on the opposite ends of a vehicle axle; a frame having horizontally spaced upright arms adapted to be disposed on opposite ends of wheeled axles, means on the arms fixing the frame with respect to the centers of the wheels, tool holding means on each arm for supporting a finishing tool, means adjusting the position of the tool holding means with respect to the wheel centers, and a support for the frame including a joint providing substantially universal motion of the frame with respect to a vehicle axle.

16. In a wheel truing device, a frame having horizontally spaced arms disposed generally in an up and down direction, centering means on each arm for fixing the frame with respect to the wheel centers, holding means on each arm for supporting a finishing tool, and supporting means on the frame including rotatable supporting members providing for movement of the frame in a lengthwise direction with respect to the vehicle, and bearing means providing substantially universal movement of the frame with respect to the car.

17. In combination a pair of spaced rails, a pit below the rails, a wheel truing device disposed at least partially in the pit, and means disposed between the rails for supporting at least the majority of the weight of the truing device, said means providing rocking movement of the truing device about parallel and transverse axes with respect to the rails, the truing device including spaced parallel arms.

18. In a device for truing wheels of a wheeled vehicle that is mounted on rails, a C-frame having arms adapted to straddle the vehicle, supporting means for the frame including a support fixed with respect to the rails, means on the frame mounting the frame on the fixed support, and intermediate means between the fixed support and the mounting means providing substantially universal motion of the frame with respect to the rails, and a finishing tool support adjacent to the upper end of each arm adapted to support a tool.

19. In a device for truing wheels of a wheeled vehicle that is mounted on rails, a C-frame having arms adapted to straddle the vehicle, supporting means for the frame including a support disposed in the region between the rails and fixed with respect to the rails, means on the frame and disposed between the arms for mounting the frame on the fixed support, intermediate means between the fixed support and the mounting means providing substantially universal motion of the frame with respect to the rails, and a finishing tool support adjacent to the upper end of each arm adapted to support a tool.

20. In a wheel truing device, a C-frame adapted to be disposed with its arms adjacent to the opposite sides of wheeled axles, means fixing the frame with respect to the centers of the wheels, means on each arm of the frame for supporting a finishing tool, and supporting means for the C-frame disposed between the arms and comprising a fixed support, and hanger means on the C-frame for suspending the C-frame from the fixed support.

21. In a wheel truing device, a C-frame adapted to be disposed with its arms adjacent to the opposite sides of wheeled axles, means fixing the frame with respect to the centers of the wheels, means on each arm of the frame for supporting a finishing tool, and supporting means for the C-frame disposed between the arms and comprising a fixed support, and hanger means on the C-frame for suspending the C-frame from the fixed support, and means between the fixed support and the hanger means providing substantially universal motion therebetween.

22. In a device for truing wheels mounted on the opposite ends of a vehicle axle, a C-frame including a frame member having spaced apart arms extending from said frame member, a support disposed in the space between the arms for supporting the C-frame including a joint providing substantially universal motion, a center support on each arm, and a tool supporting member on each arm.

23. In a wheel truing machine, a C-frame having a frame member and spaced arms, means disposed in the space between said arms for supporting the C-frame including a supporting member providing substantially universal motion, and a supporting arm connected to the frame member, means associated with said supporting means for moving the C-frame toward or away from the wheel to be trued, a center support associated with each arm adapted to engage the axis of the wheel to be trued, said center support being movable to and parallel with the axis of the work, and a tool support on each arm between the frame member and the center support.

24. In a device for truing wheels of a railway car, the combination of a C-frame having upwardly extending arms, a support providing substantially universal motion disposed in the space between the arms, the C-frame being suspended from said support, finishing tool supporting means adjacent to the upper end of each arm and adapted to hold a finishing tool.

25. In a wheel truing device that is adapted to be suspended from a support, a C-frame adapted to be disposed with its arms adjacent to the opposite sides of wheeled axles, means fixing the frame with respect to the centers of the wheels, means adjacent to each arm of the frame for supporting a finishing tool, and supporting means for the C-frame disposed between the arms and comprising hanger means on the frame for suspending the C-frame from the support.

26. In a device for truing wheels of a railway car comprising a C-frame having upwardly extending arms, a support for the machine comprising a stationary cradle member and a movable cradle member on the stationary cradle member, means suspending the machine from one side of the movable cradle member, and means operating on the movable cradle member counterbalancing the machine weight.

27. In a device for truing wheels of a railway car comprising a C-frame having upwardly extending arms, a support for the machine comprising a stationary cradle member and a movable cradle member on the stationary cradle member, means suspending the machine from one side of the movable cradle member, and means operating on the movable cradle member counterbalancing the machine weight, the suspending means providing substantially universal motion of the machine about the support.

28. For use in truing wheels mounted on the opposite ends of a vehicle axle, a supporting and rotating wheel under each vehicle wheel adapted to rotate the vehicle wheels, a frame having upstanding arms adapted to be disposed at the opposite ends of the axle, a center member adjacent to the upper end of each upstanding arm and having a center adapted to engage the end of the vehicle axle at the center thereof, a tool support on each arm disposed substantially vertically below each center member, a cradle member having rocking movement about an axis disposed parallel to the vehicle axle, means mounting the supporting and rotating wheels on the cradle member on one side of the axis thereof, and means suspending the frame from the cradle member on the other side of the axis.

29. In a device for truing wheels of a railway car, the combination of a C-frame having upwardly extending arms, a support providing substantially universal motion disposed in the space between the arms, the C-frame being suspended from said support, finishing tool supporting means adjacent to the upper end of each arm, said finishing tool supporting means comprising lathe tool chuck means, a horizontal movable support for the chuck means, and means transmitting horizontal movement to the chuck means.

30. In a device for truing wheels of a railway car, the combination of a C-frame having upwardly extending arms, a support providing substantially universal motion disposed in the space between the arms, the C-frame being suspended from said support, finishing tool supporting means adjacent to the upper end of each arm, said finishing tool supporting means comprising lathe tool chuck means, a horizontal movable support for the chuck means, means mounting the chuck means for vertical movement with respect to the support, means transmitting horizontal movement to the chuck means, and cam means regulating the vertical movement of the chuck means.

31. The combination of a pit, a wheel truing device disposed in the pit, spaced apart track rails disposed over the pit, and means supporting the truing device including a supporting frame fixed between the rails and over the pit, a horizontal shaft supported on the frame, yoke means suspended from the shaft, and a second shaft disposed below and at right angles to the first shaft and mounted on the yoke means, the truing device being suspended from the second shaft.

32. The combination of a pit, a pair of parallel, horizontally spaced track rails disposed over the pit, each track rail comprising rail segments arranged in end to end relationship, supporting means for the rail segments, one of said rail segments being slidable on the supporting means in a longitudinal direction with respect to the rail length so that the rail segments may be separated to provide a region above the pit that is unobstructed by the tracks, and a supporting wheel rotatably mounted about a horizontal axis and disposed adjacent to each track rail where the rail segments adjoin, the top of each supporting wheel being adjacent to the top of the corresponding rail, each supporting wheel being provided with two peripheral surfaces disposed side by side, one being substantially smooth and the other being rough, and mounting means for the supporting wheels providing movement of the supporting wheels linearly toward and away from each other.

33. In a wheel truing machine, a C-frame having a horizontal frame member and upwardly extending arms, means disposed in the space between the arms for supporting the C-frame including a supporting member providing substantially universal motion and a vertically disposed supporting arm connected to the horizontal frame member between the ends thereof, means associated with the supporting arm for moving the C-frame vertically, a center support adjacent to the upper end of each arm, and a tool supporting member on each arm.

34. In a wheel truing machine, a C-frame having a horizontal frame member and upwardly extending arms, means disposed in the space between the arms for supporting the C-frame including a supporting member providing substantially universal motion and a vertically disposed supporting arm connected to the horizontal frame member between the ends thereof, means associated with the supporting arm for moving the C-frame vertically, a vertically movable center support adjacent to the upper end of each arm, and a fixed tool supporting member on each arm.

35. In a wheel truing machine, a C-frame having a horizontal frame member and upwardly extending arms, means disposed in the space between the arms for supporting the C-frame including a supporting member providing substantially universal motion and a vertically disposed supporting arm connected to the horizontal frame member between the ends thereof, means associated with the supporting arm for moving the C-frame vertically, a center support adjacent to the upper end of each arm, means providing vertical movement of the center supports with respect to the C-frame, and a tool supporting member on each arm.

36. In a wheel truing machine, a C-frame having a horizontal frame member and upwardly extending arms, means disposed in the space between the arms for supporting the C-frame including a supporting member providing substantially universal motion and a vertically disposed supporting arm connected to the horizontal frame member between the ends thereof, means associated with the supporting arm for moving the C-frame vertically, a center support adjacent to the upper end of each arm, means providing vertical movement of the center supports with respect to the C-frame, and a tool supporting member on each arm disposed below the adjacent center support.

37. In a wheel truing machine, a C-frame having a horizontal frame member and upwardly extending arms, means disposed in the space between the arms for supporting the C-frame including a supporting member providing substantially universal motion and a vertically disposed supporting arm connected to the horizontal frame member between the ends thereof, means associated with the supporting arm for moving the C-frame vertically, a vertically movable center support adjacent to the upper end of each arm, means providing horizontal movement of each center support toward and away from each other, and a tool supporting member on each arm disposed below the adjacent center support.

38. In a wheel truing machine, a C-frame having a horizontal frame member and upwardly extending arms, means disposed in the space between the arms for supporting the C-frame including a supporting member providing substantially universal motion and a vertically disposed supporting arm connected to the horizontal frame member between the ends thereof, means associated with the supporting arm for moving the C-frame vertically including a vertical screw, a center support adjacent to the upper end of each arm, and a tool supporting member on each arm.

39. In a wheel truing machine, a C-frame having a horizontal frame member and upwardly extending arms, means disposed in the space between the arms for supporting the C-frame including a supporting member providing substantially universal motion and a vertically disposed supporting arm connected to the horizontal frame member between the ends thereof, means associated with the supporting arm for moving the C-frame vertically including a vertically screw and counter-balancing means independent of the screw for supporting the greater part of the machine weight, a center support adjacent to the upper end of each arm, and a tool supporting member on each arm.

40. In a wheel truing machine, a C-frame having a horizontal frame member and upwardly extending arms, means disposed in the space between the arms for supporting the C-frame including a supporting member providing substantially universal motion and a vertically disposed supporting arm connected to the horizontal frame member between the ends thereof, means associated with the supporting arm for moving the C-frame vertically including a vertical screw, hydraulic counter-balancing means independent of the screw for supporting the greater part of the machine weight, a center support adjacent to the upper end of each arm, and a tool supporting member on each arm.

41. In a truing machine, a frame having horizontally spaced upstanding arms, means mounting the frame and providing substantially universal motion, a center support adjacent to the top of each arm, means providing simultaneous vertical movement of both center supports, means providing horizontal movement of the center supports toward and away from each other, a rotatable tool support below each center support, and means providing vertical movement of the tool supports while the center supports remain at a constant height.

42. In a truing machine, a frame having horizontally spaced upstanding arms, means mounting the frame and providing substantially universal motion, a center support adjacent to the top of each arm, means providing simultaneous vertical movement of both center supports, means providing horizontal movement of the center supports toward and away from each other, a rotatable tool support fixed to each arm below the adjacent center support, and means providing vertical movement of the upstanding arms.

43. For use in truing wheels mounted on the opposite ends of a vehicle axle, the combination of a frame having upstanding arms adapted to be disposed at opposite ends of the axle, a center member adjacent to the upper end of each upstanding arm and having a center adapted to engage the end of the vehicle axle at the center thereof, a tool support on each arm disposed substantially vertically below each center member, a support for the frame disposed in the space between the arms but to one side of the vertical plane through the central axis of the vehicle axle, and means suspending the frame from the support.

44. For use in truing wheels mounted on the opposite ends of a vehicle axle, a supporting and rotating wheel under each vehicle wheel adapted to rotate the vehicle wheels, a frame having upstanding arms adapted to be disposed at the opposite ends of the axle, a center member adjacent to the upper end of each upstanding arm and having a center adapted to engage the end of the vehicle axle at the center thereof, a tool support on each arm disposed substantially vertically below each center member, the supporting and rotating wheels engaging the vehicle wheels at positions disposed to one side of the vertical plane through the central axis of the vehicle axle, and a support for the frame disposed in the space between the arms but disposed on the other side of the said vertical plane.

45. In a device for truing wheels of a metal wheeled vehicle, a frame having arms adapted to be disposed on opposite sides of the vehicle adjacent to the ends of the axles of the wheeled vehicle, a center support for the frame including a fixed frame, movable supporting means mounted on the fixed frame providing substantially universal movement of the frame, and a vertically disposed lifting member secured at one end to the supporting means and at the other end to the frame.

46. A device for truing wheels mounted on an axle comprising a pair of horizontally spaced upstanding arms, a horizontally disposed cylinder adjacent to the upper end of each arm and being linearly arranged with respect to each other, means supporting the arms so as to provide relative vertical movement of the arms with respect to the axle so as to maintain the cylinders in parallel relationship with the axle, a center unit in each cylinder having a center projection extending toward the other cylinder, means moving the cylinders in synchronism and telescopically in said arms in an upward or downward direction, and a fixed, rotatable tool supporting member adjacent to each arm below the adjacent cylinder.

47. In a device for truing wheels that are mounted on an axle of a wheeled vehicle, a pair of horizontally spaced, upstanding arms, horizontally disposed centers telescopically mounted on said arms in linear relationship with respect to each other, a rotatable tool supporting member adjacent to and fixed with respect to each arm and disposed parallel to the adjacent center, the centers being adapted to engage the opposite ends of the axle, and means supporting the arms so as to provide relative vertical movement of the arms in synchronism with like vertical movement of the axle so as to maintain the centers at all times in engagement with the ends of the axle and at the same time maintain a constant distance between the centers and the corresponding tool supporting members.

RICHARD B. STANLEY.

REFERENCES CITED

The following references are of record in the file of this patent:

UNITED STATES PATENTS

| Number | Name | Date |
|---|---|---|
| 436,295 | Abbott | Sept. 9, 1890 |
| 573,694 | Pedrick | Dec. 22, 1896 |
| 578,676 | Murphy | Mar. 9, 1897 |
| 810,903 | Blechschmidt | Jan. 30, 1906 |
| 1,000,898 | Cushing | Aug. 15, 1911 |
| 1,171,812 | Vial | Feb. 15, 1916 |
| 1,627,074 | Blair | May 3, 1927 |
| 2,014,768 | Klingele | Sept. 17, 1935 |
| 2,180,529 | Kaseberg | Nov. 21, 1939 |

FOREIGN PATENTS

| Number | Country | Date |
|---|---|---|
| 618,537 | Germany | Sept. 10, 1935 |

---

Certificate of Correction

Patented December 23, 1952

Patent No. 2,622,374

RICHARD B. STANLEY

It is hereby certified that it appears that mistakes have been made in the above numbered patent and a showing has been made that such mistakes occurred in good faith and were not the fault of the Patent Office, said mistakes requiring correction as follows:

Column 33, line 40, for "rail" read *supporting member*; line 42, for "C-frame" read *frame*.

The said patent should be read as though corrected as specified.
Signed and sealed this 19th day of May, A. D. 1953.

[SEAL]

THOMAS F. MURPHY,
*Assistant Commissioner of Patents.*